United States Patent
Hasegawa et al.

(10) Patent No.: US 11,711,595 B2
(45) Date of Patent: Jul. 25, 2023

(54) IMAGING APPARATUS, IMAGE DATA PROCESSING METHOD OF IMAGING APPARATUS, AND PROGRAM

(71) Applicant: FUJIFILM CORPORATION, Tokyo (JP)

(72) Inventors: Ryo Hasegawa, Saitama (JP); Tomoyuki Kawai, Saitama (JP); Makoto Kobayashi, Saitama (JP); Hitoshi Sakurabu, Saitama (JP); Kazufumi Sugawara, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 62 days.

(21) Appl. No.: 17/400,132

(22) Filed: Aug. 12, 2021

(65) Prior Publication Data
US 2021/0377430 A1     Dec. 2, 2021

Related U.S. Application Data

(63) Continuation of application No. PCT/JP2020/002929, filed on Jan. 28, 2020.

(30) Foreign Application Priority Data

Feb. 27, 2019   (JP) ................. 2019-034708

(51) Int. Cl.
*H04N 23/45*     (2023.01)
*H04N 5/04*      (2006.01)
(Continued)

(52) U.S. Cl.
CPC .............. *H04N 23/45* (2023.01); *H04N 5/04* (2013.01); *H04N 5/265* (2013.01); *H04N 5/772* (2013.01);
(Continued)

(58) Field of Classification Search
CPC .... H04N 5/2258; H04N 5/04; H04N 5/23227; H04N 5/23229; H04N 5/23293;
(Continued)

(56) References Cited

U.S. PATENT DOCUMENTS

2007/0292048 A1  12/2007 Choe et al.
2009/0135245 A1   5/2009 Luo et al.
(Continued)

FOREIGN PATENT DOCUMENTS

CN    103581568 A    2/2014
CN    103699861 A    4/2014
(Continued)

OTHER PUBLICATIONS

Machine English Translation of JP 2008-079142 A, Ota, Apr. 3, 2008 (Year: 2008).*
(Continued)

*Primary Examiner* — Nelson D. Hernández Hernández
(74) *Attorney, Agent, or Firm* — Solaris Intellectual Property Group, PLLC

(57) ABSTRACT

An imaging apparatus includes a plurality of imaging elements, at least one signal processing circuit, and a transfer path, in which each of the plurality of imaging elements includes a memory that is incorporated in the imaging element and stores image data obtained by imaging a subject, and a communication interface that is incorporated in the imaging element and outputs output image data based on the image data stored in the memory, the transfer path connects the plurality of imaging elements and a single signal processing circuit in series, and the communication interface of each of the plurality of imaging elements outputs the output image data to an imaging element in a rear stage or the signal processing circuit through the transfer path.

17 Claims, 39 Drawing Sheets

(51) Int. Cl.
H04N 23/80 (2023.01)
H04N 23/60 (2023.01)
H04N 5/265 (2006.01)
H04N 5/77 (2006.01)
H04N 23/63 (2023.01)

(52) U.S. Cl.
CPC ........... H04N 23/63 (2023.01); H04N 23/665 (2023.01); H04N 23/80 (2023.01)

(58) Field of Classification Search
CPC ...... H04N 5/265; H04N 5/772; H04N 5/2353; H04N 5/378; H04N 23/45; H04N 23/63; H04N 23/665; H04N 23/80; H04N 23/73; H04N 23/75
See application file for complete search history.

(56) References Cited

U.S. PATENT DOCUMENTS

| | | | |
|---|---|---|---|
| 2010/0276572 A1* | 11/2010 | Iwabuchi | H01L 23/481 257/443 |
| 2012/0113303 A1* | 5/2012 | Choe | H04N 5/23277 348/E5.037 |
| 2014/0028851 A1 | 1/2014 | Shan et al. | |
| 2014/0152773 A1 | 6/2014 | Ohba et al. | |
| 2014/0166755 A1 | 6/2014 | Liu et al. | |
| 2017/0214832 A1 | 7/2017 | Sidar | |
| 2020/0007733 A1 | 1/2020 | Shimizu et al. | |

FOREIGN PATENT DOCUMENTS

| | | |
|---|---|---|
| EP | 1763224 A2 | 3/2007 |
| JP | 2007-336561 A | 12/2007 |
| JP | 2008-079142 A | 4/2008 |
| JP | 2008079142 A * | 4/2008 |
| JP | 2010-219940 A | 9/2010 |
| JP | 2013-026978 A | 2/2013 |
| JP | 2016-143915 A | 8/2016 |
| JP | 2018-137592 A | 8/2018 |
| JP | 2018-164136 A | 10/2018 |
| JP | 2019-009783 A | 1/2019 |
| WO | 2018/003124 A1 | 1/2018 |

OTHER PUBLICATIONS

International Search Report issued in International Application No. PCT/JP2020/002929 dated Mar. 24, 2020.
Written Opinion of the ISA issued in International Application No. PCT/JP2020/002929 dated Mar. 24, 2020.
English language translation of the following: Office action dated Nov. 9, 2021 from the JPO in a Japanese patent application No. 2021-501768 corresponding to the instant patent application. This office action translation is submitted now in order to supplement the understanding of the cited references which are being disclosed in the instant Information Disclosure Statement.
English language translation of the following: Decision of Refusal dated Mar. 1, 2022 from the JPO in a Japanese patent application No. 2021-501768 corresponding to the instant patent application.
English language translation of the following: Office action dated Sep. 20, 2022 from the SIPO in a Chinese patent application No. 202080016515.4 corresponding to the instant patent application. This office action translation is submitted now in order to supplement the understanding of the cited references which are being disclosed in the instant Information Disclosure Statement.

* cited by examiner

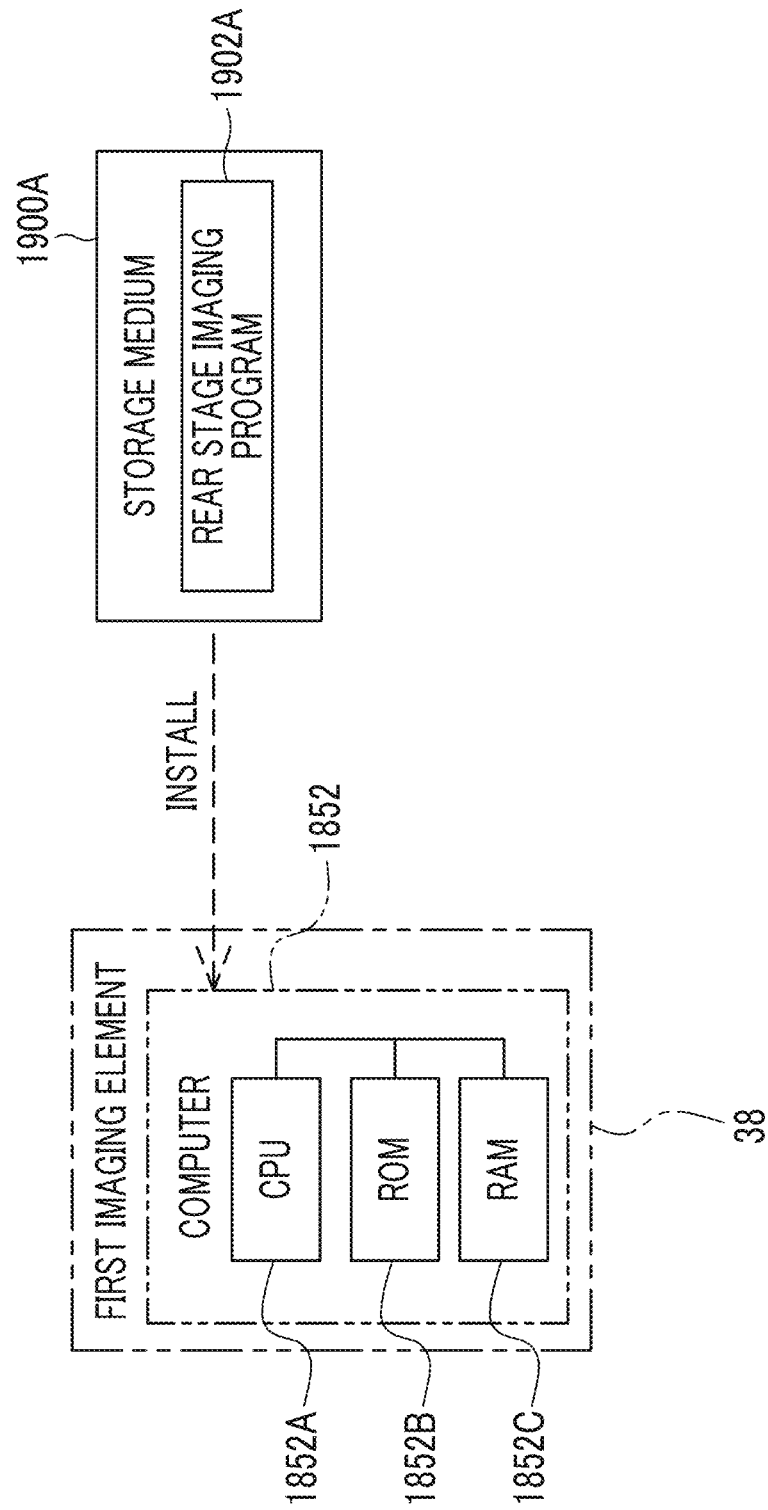

IMAGING APPARATUS, IMAGE DATA PROCESSING METHOD OF IMAGING APPARATUS, AND PROGRAM

CROSS-REFERENCE TO RELATED APPLICATIONS

This application is a continuation application of International Application No. PCT/JP2020/002929, filed Jan. 28, 2020, the disclosure of which is incorporated herein by reference in its entirety. Further, this application claims priority from Japanese Patent Application No. 2019-034708, filed Feb. 27, 2019, the disclosure of which is incorporated herein by reference in its entirety.

BACKGROUND

1. Technical Field

The technology of the present disclosure relates to an imaging apparatus, an image data processing method of an imaging apparatus, and a program.

2. Related Art

In a case where imaging of a plurality of frames is performed by an imaging apparatus in which only one imaging element such as a complementary metal oxide semiconductor (CMOS) image sensor is mounted, imaging is performed in a time-division manner. Thus, for example, in a case where a plurality of images obtained by performing imaging of the plurality of frames on a continuously moving subject are combined, disorder may occur in the combined image.

Meanwhile, in a case where a plurality of images obtained by imaging the subject by aligning exposure periods by a plurality of CMOS image sensors, the disorder in the combined image is decreased compared to a case where a plurality of images obtained by imaging by a single CMOS image sensor in a time-division manner are combined.

The plurality of CMOS image sensors are connected to a signal processing portion. In the signal processing portion, signal processing is performed on an image obtained by imaging by each of the plurality of CMOS image sensors. Generally, the signal processing portion is positioned on a rear stage of the CMOS image sensors. The following first to third connection methods are known as a method of connecting the plurality of CMOS image sensors to the signal processing portion.

FIG. 36 illustrates a CMOS image sensor 1000A, a CMOS image sensor 1000B, and a large-scale integration (LSI) 1002. The LSI 1002 is a signal processing portion that is positioned on a rear stage of the CMOS image sensor 1000A and the CMOS image sensor 1000B. In the example illustrated in FIG. 36, the CMOS image sensor 1000A and the CMOS image sensor 1000B are connected to the LSI 1002 using the first connection method. Specifically, the CMOS image sensor 1000A is directly connected to the LSI 1002 through a communication line LN1, and the CMOS image sensor 1000B is directly connected to the LSI 1002 through a communication line LN2.

FIG. 37 illustrates the CMOS image sensor 1000A, the CMOS image sensor 1000B, and an LSI unit 1004. The LSI unit 1004 is a signal processing portion that is positioned on the rear stage of the CMOS image sensor 1000A and the CMOS image sensor 1000B. The LSI unit 1004 comprises an LSI 1004A and an LSI 1004B. In the example illustrated in FIG. 37, the CMOS image sensors 1000A and 1000B are connected to the LSI unit 1004 using the second connection method. Specifically, the CMOS image sensor 1000A is directly connected to the LSI 1004A through a communication line LN3, and the CMOS image sensor 1000B is directly connected to the LSI 1004B through a communication line LN4.

The third connection method is disclosed in JP2016-143915A. FIG. 38 illustrates a conceptual diagram schematically illustrating the third connection method disclosed in JP2016-143915A. In the example illustrated in FIG. 38, an LSI unit 1006 is a signal processing portion that is positioned on the rear stage of the CMOS image sensor 1000A and the CMOS image sensor 1000B. The LSI unit 1006 comprises an LSI 1006A and an LSI 1006B. The LSI 1006A, the LSI 1006B, the CMOS image sensor 1000A, and the CMOS image sensor 1000B are connected using the third connection method. Specifically, the CMOS image sensor 1000A is directly connected to the LSI 1006A through a communication line LN5. The CMOS image sensor 1000B is directly connected to the LSI 1006B through a communication line LN6. The LSI 1006A and the LSI 1006B are directly connected through a communication line LN7.

SUMMARY

An embodiment according to the technology of the present disclosure provides an imaging apparatus, an image data processing method of an imaging apparatus, and a program capable of reducing the number of wires required for connecting a plurality of imaging elements to a signal processing portion, compared to a case where a plurality of interfaces corresponding to the plurality of imaging elements are disposed in the signal processing portion in a case of connecting the plurality of imaging element to the signal processing portion.

A first aspect according to the technology of the present disclosure is an imaging apparatus comprising a plurality of imaging elements, at least one signal processing portion, and a transfer path, in which each of the plurality of imaging elements includes a storage portion that is incorporated in the imaging element and stores image data obtained by imaging a subject, and an output portion that is incorporated in the imaging element and outputs output image data based on the image data stored in the storage portion, the transfer path connects the plurality of imaging elements and a single signal processing portion in series, and the output portion of each of the plurality of imaging elements outputs the output image data to an imaging element in a rear stage or the signal processing portion through the transfer path. Accordingly, the number of wires required for connecting the plurality of imaging elements to the signal processing portion can be reduced, compared to a case where a plurality of interfaces corresponding to the plurality of imaging elements are disposed in the signal processing portion in a case of connecting the plurality of imaging element to the signal processing portion.

A second aspect according to the technology of the present disclosure is the imaging apparatus according to the first aspect, in which the output image data output by the output portion of a front stage imaging element that is an imaging element in a front stage among adjacent imaging elements included in the plurality of imaging elements is stored in the storage portion of a rear stage imaging element that is an imaging element in a rear stage among the adjacent imaging elements, and then, is output by the output portion of the imaging element in the rear stage. Accordingly, the rear stage imaging element can output the output image data received from the front stage imaging element at an appropriate output timing, compared to a case of outputting the output image data without storing the output image data in the storage portion of the rear stage imaging element.

A third aspect according to the technology of the present disclosure is the imaging apparatus according to the second aspect, in which the output image data is delivered in order from an imaging element on a side far from the signal processing portion to an imaging element on a side close to the signal processing portion among the plurality of imaging elements, and the output image data delivered to an imaging element in a last stage among the plurality of imaging elements is output to the signal processing portion by the output portion of the imaging element in the last stage. Accordingly, even in a case where all imaging elements are not directly connected to the signal processing portion, the signal processing portion can receive image data obtained by imaging by each imaging element from a single path.

A fourth aspect according to the technology of the present disclosure is the imaging apparatus according to the third aspect, in which the signal processing portion receives each piece of the output image data output by the output portion of each of the plurality of imaging elements in a time-division manner. Accordingly, even in a case where all imaging elements are not directly connected to the signal processing portion, the signal processing portion can receive image data obtained by imaging by each imaging element with a minimum number of wires.

A fifth aspect according to the technology of the present disclosure is the imaging apparatus according to the fourth aspect, in which the signal processing portion receives each piece of the output image data output by the output portion of each of the plurality of imaging elements in a time-division manner in order from the imaging element on the side close to the signal processing portion to the imaging element on the side far from the signal processing portion among the plurality of imaging elements. Accordingly, each piece of image data generated by each of the plurality of imaging elements can be quickly received by the signal processing portion, compared to a case of temporarily gathering each piece of the image data generated by each of the plurality of imaging elements in an imaging element on a side closest to the signal processing portion and then, outputting the image data to the signal processing portion.

A sixth aspect according to the technology of the present disclosure is the imaging apparatus according to the second aspect, in which rear stage image data obtained as the image data by imaging by the rear stage imaging element is stored in the storage portion of the rear stage imaging element, the rear stage imaging element further includes a combining portion that combines front stage image data output to the rear stage imaging element as the output image data by the output portion of the front stage imaging element, and the rear stage image data stored in the storage portion, and the output portion of the rear stage imaging element outputs combined image data obtained by combining the front stage image data and the rear stage image data by the combining portion as the output image data. Accordingly, it is not necessary to combine the front stage image data and the rear stage image data in the signal processing portion.

A seventh aspect according to the technology of the present disclosure is the imaging apparatus according to the second aspect, in which rear stage image data obtained as the image data by imaging by the rear stage imaging element is stored in the storage portion of the rear stage imaging element, the rear stage imaging element further includes a connection portion that connects front stage image data output to the rear stage imaging element as the output image data by the output portion of the front stage imaging element, and the rear stage image data stored in the storage portion, and the output portion of the rear stage imaging element outputs connected image data obtained by connecting the front stage image data and the rear stage image data by the connection portion as the output image data. Accordingly, it is not necessary to connect the front stage image data and the rear stage image data in the signal processing portion.

An eighth aspect according to the technology of the present disclosure is the imaging apparatus according to any one of the second to seventh aspects, in which an exposure time period of the rear stage imaging element is longer than an exposure time period of the front stage imaging element. Accordingly, image data having a larger dynamic range than single image data obtained by imaging by the rear stage imaging element or single image data obtained by imaging by the front stage imaging element can be obtained.

A ninth aspect according to the technology of the present disclosure is the imaging apparatus according to any one of the first to eighth aspects, in which the signal processing portion is positioned on a rear stage of the plurality of imaging elements on the transfer path. Accordingly, the signal processing portion can receive every image data obtained by imaging by the plurality of imaging elements positioned on a front stage of the signal processing portion.

A tenth aspect according to the technology of the present disclosure is the imaging apparatus according to any one of the first to ninth aspects, in which each of the output portions of the plurality of imaging elements outputs the output image data in synchronization with each other. Accordingly, staying of image data in one imaging element of the plurality of imaging elements can be avoided.

An eleventh aspect according to the technology of the present disclosure is the imaging apparatus according to any one of the first to tenth aspects, in which at least a photoelectric conversion element and the storage portion are formed in one chip. Accordingly, portability of the imaging element is increased, compared to an imaging element in which the photoelectric conversion element and the storage portion are not formed in one chip.

A twelfth aspect according to the technology of the present disclosure is the imaging apparatus according to the eleventh aspect, in which the imaging element is a laminated imaging element in which the photoelectric conversion element is laminated with the storage portion. Accordingly, since a wire that connects the photoelectric conversion element to the storage portion can be shortened, a wire delay can be reduced. Consequently, a transfer speed of the image data from the photoelectric conversion element to the storage portion can be increased, compared to a case where the photoelectric conversion element and the storage portion are not laminated.

A thirteenth aspect according to the technology of the present disclosure is the imaging apparatus according to any one of the first to twelfth aspects, further comprising a display control portion that performs a control for displaying an image based on the output image data input into the signal processing portion on a display portion. Accordingly, a user can visually recognize the image based on the output image data.

A fourteenth aspect according to the technology of the present disclosure is the imaging apparatus according to any one of the first to thirteenth aspects, further comprising a storage control portion that performs a control for storing the output image data input into the signal processing portion in a storage device. Accordingly, the output image data input into the signal processing portion can be appropriately managed.

A fifteenth aspect according to the technology of the present disclosure is an image data processing method of an imaging apparatus including a plurality of imaging elements, at least one signal processing portion, and a transfer path, each of the plurality of imaging elements including a storage portion that is incorporated in the imaging element and stores image data obtained by imaging a subject, and an output portion that is incorporated in the imaging element and outputs output image data based on the image data stored in the storage portion, the image data processing method comprising connecting the plurality of imaging elements and a single signal processing portion in series through the transfer path, and outputting the output image data to an imaging element in a rear stage or the signal processing portion through the transfer path by the output portion of each of the plurality of imaging elements. Accordingly, the number of wires required for connecting the plurality of imaging elements to the signal processing portion can be reduced, compared to a case where the plurality of interfaces corresponding to the plurality of imaging elements are disposed in the signal processing portion in a case of connecting the plurality of imaging element to the signal processing portion.

A sixteenth aspect according to the technology of the present disclosure is a program causing a computer to function as an output portion included in an imaging apparatus including a plurality of imaging elements, at least one signal processing portion, and a transfer path, each of the plurality of imaging elements including a storage portion that is incorporated in the imaging element and stores image data obtained by imaging a subject, and the output portion that is incorporated in the imaging element and outputs output image data based on the image data stored in the storage portion, in which the plurality of imaging elements and a single signal processing portion are connected in series through the transfer path, and the output portion of each of the plurality of imaging elements outputs the output image data to an imaging element in a rear stage or the signal processing portion through the transfer path. Accordingly, the number of wires required for connecting the plurality of imaging elements to the signal processing portion can be reduced, compared to a case where the plurality of interfaces corresponding to the plurality of imaging elements are disposed in the signal processing portion in a case of connecting the plurality of imaging element to the signal processing portion.

A seventeenth aspect according to the technology of the present disclosure is an imaging apparatus comprising a plurality of imaging elements, at least one signal processing portion, and a transfer path, in which each of the plurality of imaging elements includes a memory that is incorporated in the imaging element and stores image data obtained by imaging a subject, and a processor that is incorporated in the imaging element and configured to output output image data based on the image data stored in the memory, the transfer path connects the plurality of imaging elements and a single signal processing portion in series, and the processor of each of the plurality of imaging elements outputs the output image data to an imaging element in a rear stage or the signal processing portion through the transfer path.

BRIEF DESCRIPTION OF THE DRAWINGS

Exemplary embodiments of the technology of the disclosure will be described in detail based on the following figures, wherein:

FIG. 35A is a conceptual diagram illustrating an example of an aspect in which a rear stage imaging program is installed on a computer within the first imaging element from a storage medium storing the rear stage imaging program;

DETAILED DESCRIPTION

Hereinafter, an example of embodiments of an imaging apparatus according to the embodiments of the technology of the present disclosure will be described in accordance with the appended drawings.

First, words used in the following description will be described.

The abbreviation CPU stands for "Central Processing Unit". The abbreviation RAM stands for "Random Access Memory". The abbreviation ROM stands for "Read Only Memory". The abbreviation DRAM stands for "Dynamic Random Access Memory". The abbreviation SRAM stands for "Static Random Access Memory".

The abbreviation LSI stands for "Large-Scale Integration". The abbreviation ASIC stands for "Application Specific Integrated Circuit". The abbreviation PLD stands for "Programmable Logic Device". The abbreviation FPGA stands for "Field-Programmable Gate Array".

The abbreviation SSD stands for "Solid State Drive". The abbreviation DVD-ROM stands for "Digital Versatile Disc Read Only Memory". The abbreviation USB stands for "Universal Serial Bus". The abbreviation HDD stands for "Hard Disk Drive". The abbreviation EEPROM stands for "Electrically Erasable and Programmable Read Only Memory".

The abbreviation CCD stands for "Charge Coupled Device". The abbreviation CMOS stands for "Complementary Metal Oxide Semiconductor". The abbreviation EL stands for "Electro-Luminescence". The abbreviation A/D stands for "Analog/Digital". The abbreviation I/F stands for "Interface". The abbreviation UI stands for "User Interface".

The abbreviation LVDS stands for "Low Voltage Differential Signaling". The abbreviation PCI-e stands for "Peripheral Component Interconnect Express". The abbreviation SATA stands for "Serial Advanced Technology Attachment". The abbreviation SLVS-EC stands for "Scalable Low Signaling with Embedded Clock". The abbreviation MIPI stands for "Mobile Industry Processor Interface".

First Embodiment

Figure 1:
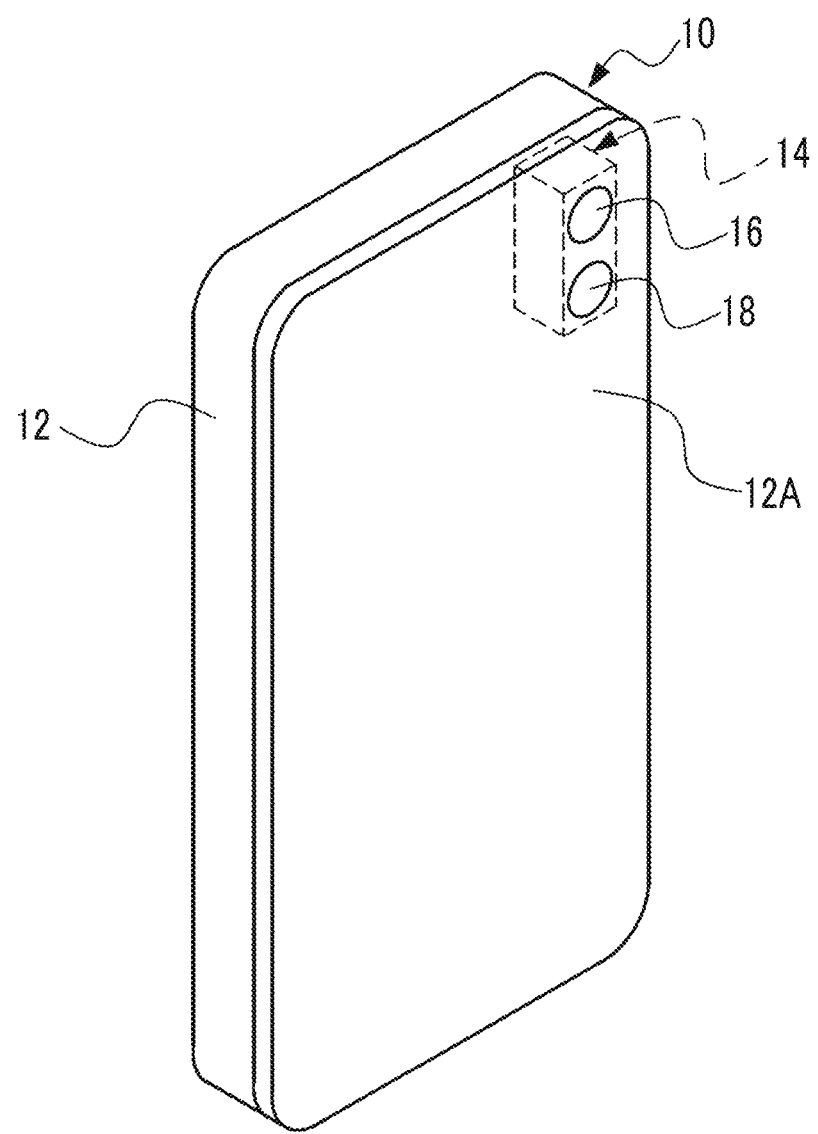
FIG. 1 is a rear perspective view illustrating an example of an exterior on a rear surface side of a smart device according to a first embodiment.

As illustrated in FIG. 1 as an example, a smart device 10 comprises a casing 12, and an imaging apparatus 14 is accommodated in the casing 12. The imaging apparatus 14 comprises a first imaging lens 16 and a second imaging lens 18. In an upper right portion of a rear surface 12A of the casing 12 in a state where the smart device 10 is vertically placed, the first imaging lens 16 and the second imaging lens 18 are arranged at a predetermined interval (for example, an interval of a few millimeters) in a vertical direction and exposed from the rear surface 12A.

Figure 2:
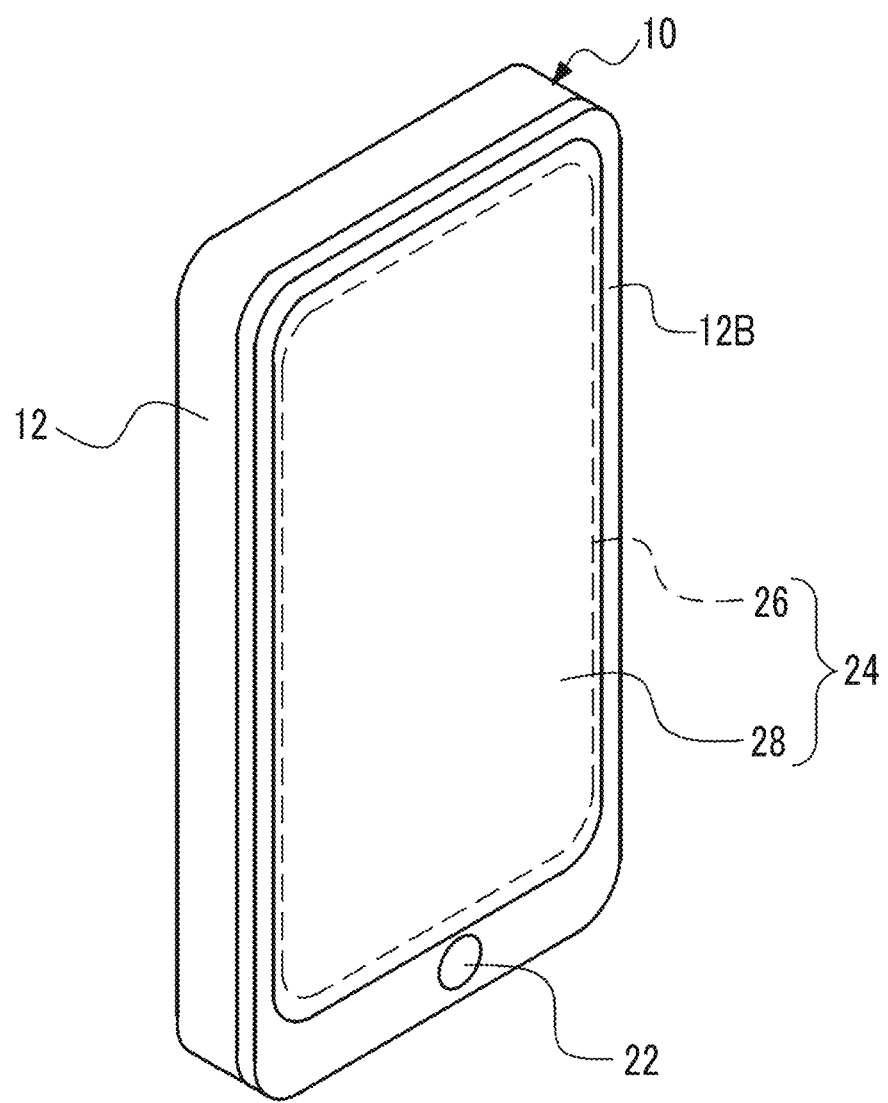
FIG. 2 is a front perspective view illustrating an example of the exterior on a front surface side of the smart device illustrated in FIG. 1.

As illustrated in FIG. 2 as an example, an instruction key 22 and a touch panel display 24 are disposed on a front surface 12B of the casing 12. In a lower portion of the front surface 12B in a state where the smart device 10 is vertically placed, the instruction key 22 is arranged, and the touch panel display 24 is arranged above the instruction key 22.

The instruction key 22 receives various instructions. For example, the "various instructions" here refer to an instruction to display a lock release reception screen, an instruction to display a menu screen on which various menus can be selected, an instruction to select one or a plurality of menus, an instruction to confirm a selected content, and an instruction to delete the selected content. The lock release reception screen refers to a screen on which a code for releasing a lock of the smart device 10 is received.

Figure 5:
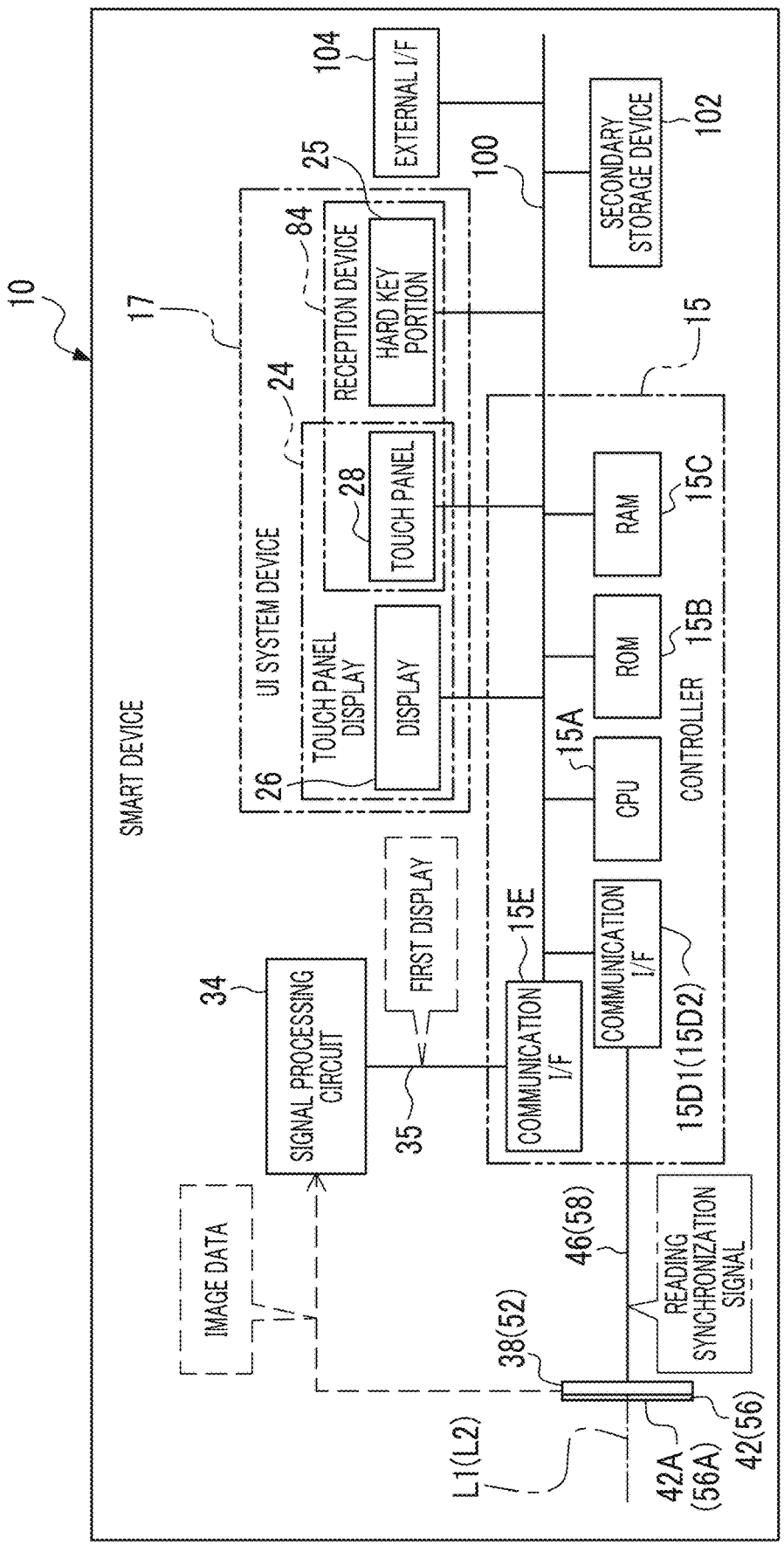
FIG. 5 is a block diagram illustrating an example of a configuration of a controller, a UI system device, and a peripheral electric system included in the smart device according to the first embodiment.

The touch panel display 24 comprises a display 26 and a touch panel 28 (refer to FIG. 5). A liquid crystal display is exemplified as an example of the display 26. The display 26 may not be the liquid crystal display, and other displays such as an organic EL display may be used. The display 26 is an example of a "display portion (display)" according to the embodiments of the technology of the present disclosure.

The display 26 displays images, text information, and the like. The display 26 is used for displaying a live view image obtained by consecutive imaging in a case where the imaging apparatus 14 is in an imaging mode. In addition, the display 26 is used for displaying a still picture image obtained by imaging in a case where a still picture image capturing instruction is provided. Furthermore, the display 26 is used for displaying a playback image and displaying a menu screen and the like in a case where the imaging apparatus 14 is in a playback mode.

The touch panel 28 is a transmissive touch panel and is overlaid on a surface of a display region of the display 26. The touch panel 28 receives an instruction from a user by detecting a contact of an instruction object such as a finger or a stylus pen.

Figure 3:
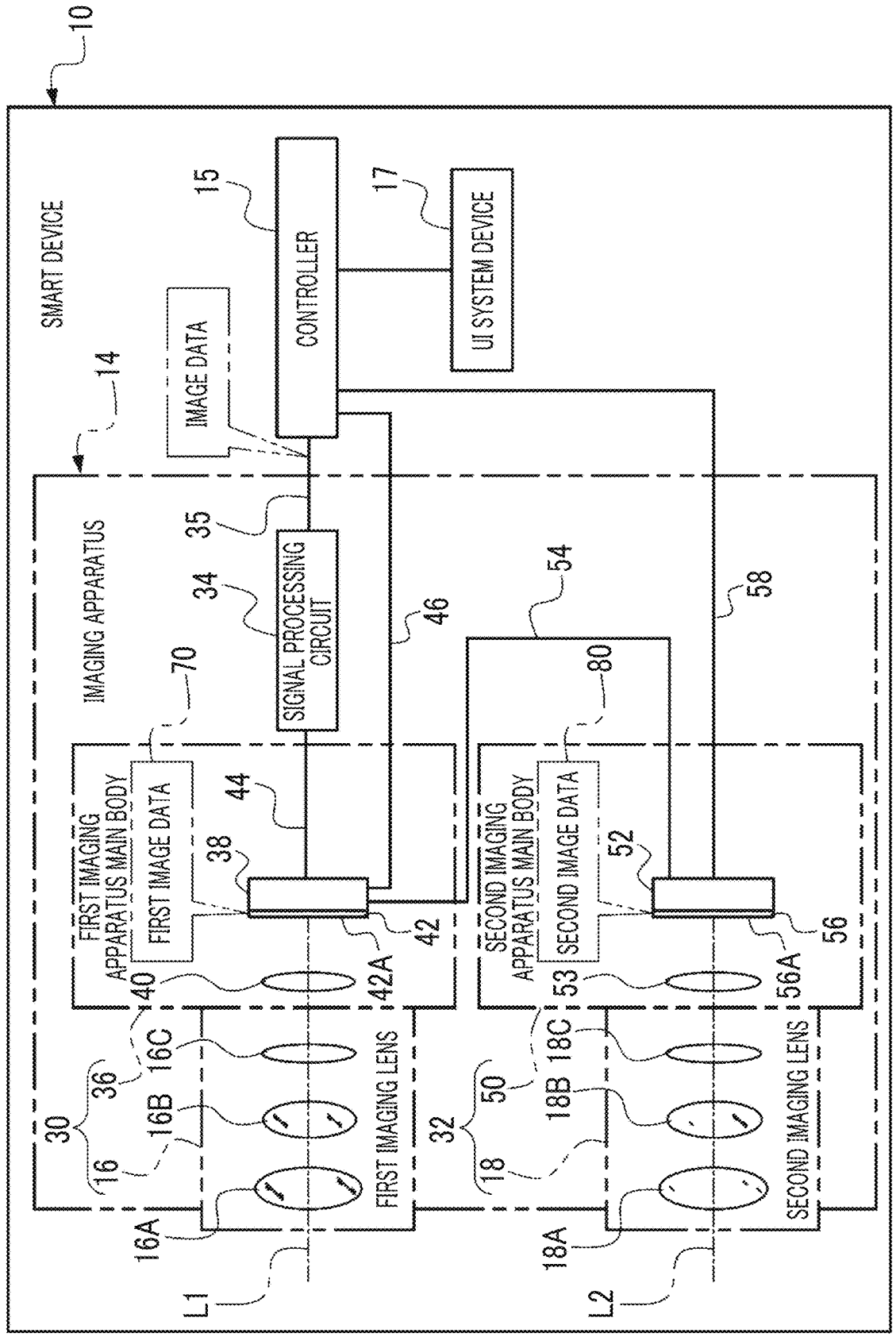
FIG. 3 is a block diagram illustrating an example of a configuration of the smart device according to the first embodiment.

As illustrated in FIG. 3 as an example, the smart device 10 comprises a controller 15 and a UI system device 17 in addition to the imaging apparatus 14. The controller 15 controls an electric system of the smart device 10. The controller 15 is connected to the imaging apparatus 14 and the UI system device 17. The UI system device 17 is a device that receives an instruction from the user or displays various types of information to the user. The controller 15 acquires various instructions received by the UI system device 17 and controls the UI system device 17.

The imaging apparatus 14 generates image data indicating an image of a subject by imaging the subject and outputs the generated image data to the controller 15. The controller 15 displays the image based on the image data input from the imaging apparatus 14 on the UI system device 17.

The imaging apparatus 14 comprises a first imaging apparatus 30, a second imaging apparatus 32, and a signal processing circuit 34. The signal processing circuit 34 is an electric circuit that is positioned on a rear stage of the imaging apparatus 14. Specifically, the signal processing circuit 34 is an electric circuit that is positioned on a rear stage of the first imaging apparatus 30. The signal processing circuit 34 is connected to the controller 15 through a communication line 35.

The first imaging apparatus 30 comprises the first imaging lens 16 and a first imaging apparatus main body 36. The first imaging lens 16 comprises an objective lens 16A, a focus lens 16B, and a stop 16C. The objective lens 16A, the focus lens 16B, and the stop 16C are arranged in an order of the objective lens 16A, the focus lens 16B, and the stop 16C along an optical axis L1 from a subject side to a first imaging apparatus main body 36 side. The focus lens 16B and the stop 16C operate by receiving motive power from a driving source (not illustrated) such as a motor. That is, the focus lens 16B and the stop 16C move along the optical axis L1 in response to the provided motive power. In addition, the stop 16C adjusts exposure by operating in response to the provided motive power.

The first imaging apparatus main body 36 comprises a first imaging element 38 and a mechanical shutter 40. The first imaging element 38 is an imaging element that is adjacent to a second imaging element 52, described later, and is closer to a rear stage side than the second imaging element 52. The first imaging element 38 is an example of an imaging element included in a "plurality of imaging elements" according to the embodiments of the technology of the present disclosure and is an example of an "imaging element in a rear stage" and a "rear stage imaging element" according to the embodiments of the technology of the present disclosure.

The mechanical shutter 40 operates by receiving motive power from a driving source (not illustrated) such as a motor. The first imaging element 38 comprises a photoelectric conversion element 42 having a light receiving surface 42A. Subject light showing the subject is transmitted through the first imaging lens 16, and an image of the subject light is formed on the light receiving surface 42A of the first imaging element 38 through the mechanical shutter 40. The photoelectric conversion element 42 generates first image data 70 indicating the image of the subject by photoelectrically converting the subject light of which the image is formed on the light receiving surface 42A.

The first imaging element 38 is connected to the signal processing circuit 34 through a communication line 44. In addition, the first imaging element 38 is connected to the controller 15 through a communication line 46. The first imaging element 38 is controlled by the controller 15 through the communication line 46. The first imaging element 38 images the subject under control of the controller 15. In addition, the first imaging element 38 outputs the first image data 70 obtained by imaging the subject to the signal processing circuit 34 through the communication line 44. The communication line 44 is an example of a "transfer path" according to the embodiments of the technology of the present disclosure.

The second imaging apparatus 32 comprises the second imaging lens 18 and a second imaging apparatus main body 50. The second imaging lens 18 comprises an objective lens 18A, a focus lens 18B, and a stop 18C. The objective lens 18A, the focus lens 18B, and the stop 18C are arranged in an order of the objective lens 18A, the focus lens 18B, and the stop 18C along an optical axis L2 from the subject side to a second imaging apparatus main body 50 side. The objective lens 18A, the focus lens 18B, and the stop 18C have the same functions as the objective lens 16A, the focus lens 16B, and the stop 16C on the optical axis L2. The focus lens 18B and the stop 18C operate in the same manner as the focus lens 16B and the stop 16C on the optical axis L2.

The second imaging apparatus main body 50 comprises the second imaging element 52 and a mechanical shutter 53. The second imaging element 52 is an imaging element that is adjacent to the first imaging element 38 and is on a front stage of the first imaging element 38. The first imaging element 38 and the second imaging element 52 are an example of the "plurality of imaging elements" according to the embodiments of the technology of the present disclosure, and the second imaging element 52 is an example of the imaging element included in the "plurality of imaging elements" according to the embodiments of the technology of the present disclosure. In addition, the first imaging element 38 and the second imaging element 52 are an example of "adjacent imaging elements" according to the embodiments of the technology of the present disclosure. In addition, in a positional relationship between the first imaging element 38 and the second imaging element 52, the second imaging element 52 is an example of a "front stage imaging element" according to the embodiments of the technology of the present disclosure. The mechanical shutter 53 has the same function as the mechanical shutter 40 and operates in the same manner as the mechanical shutter 40.

The second imaging element 52 comprises a photoelectric conversion element 56 having a light receiving surface 56A. The subject light showing the subject is transmitted through the second imaging lens 18, and the image of the subject light is formed on the light receiving surface 56A of the second imaging element 52 through the mechanical shutter 53. The photoelectric conversion element 56 generates second image data 80 indicating the image of the subject by photoelectrically converting the subject light of which the image is formed on the light receiving surface 56A.

The second imaging element 52 is connected to the first imaging element 38 through a communication line 54. In addition, the second imaging element 52 is connected to the controller 15 through a communication line 58. The second imaging element 52 is controlled by the controller 15 through the communication line 58. The second imaging element 52 images the subject under control of the controller 15. In addition, the second imaging element 52 outputs the second image data 80 obtained by imaging the subject to the first imaging element 38 through the communication line 54. The communication line 54 is an example of the "transfer path" according to the embodiments of the technology of the present disclosure.

In such a manner, the first imaging element 38 is positioned on a rear stage of the second imaging element 52, and the signal processing circuit 34 is positioned on a rear stage of the first imaging element 38. The second imaging element 52 is connected to the first imaging element 38 through the communication line 54, and the first imaging element 38 is connected to the signal processing circuit 34 through the communication line 44. That is, the first imaging element 38, the second imaging element 52, and the signal processing circuit 34 are connected in series through the communication lines 44 and 54.

Figure 4:
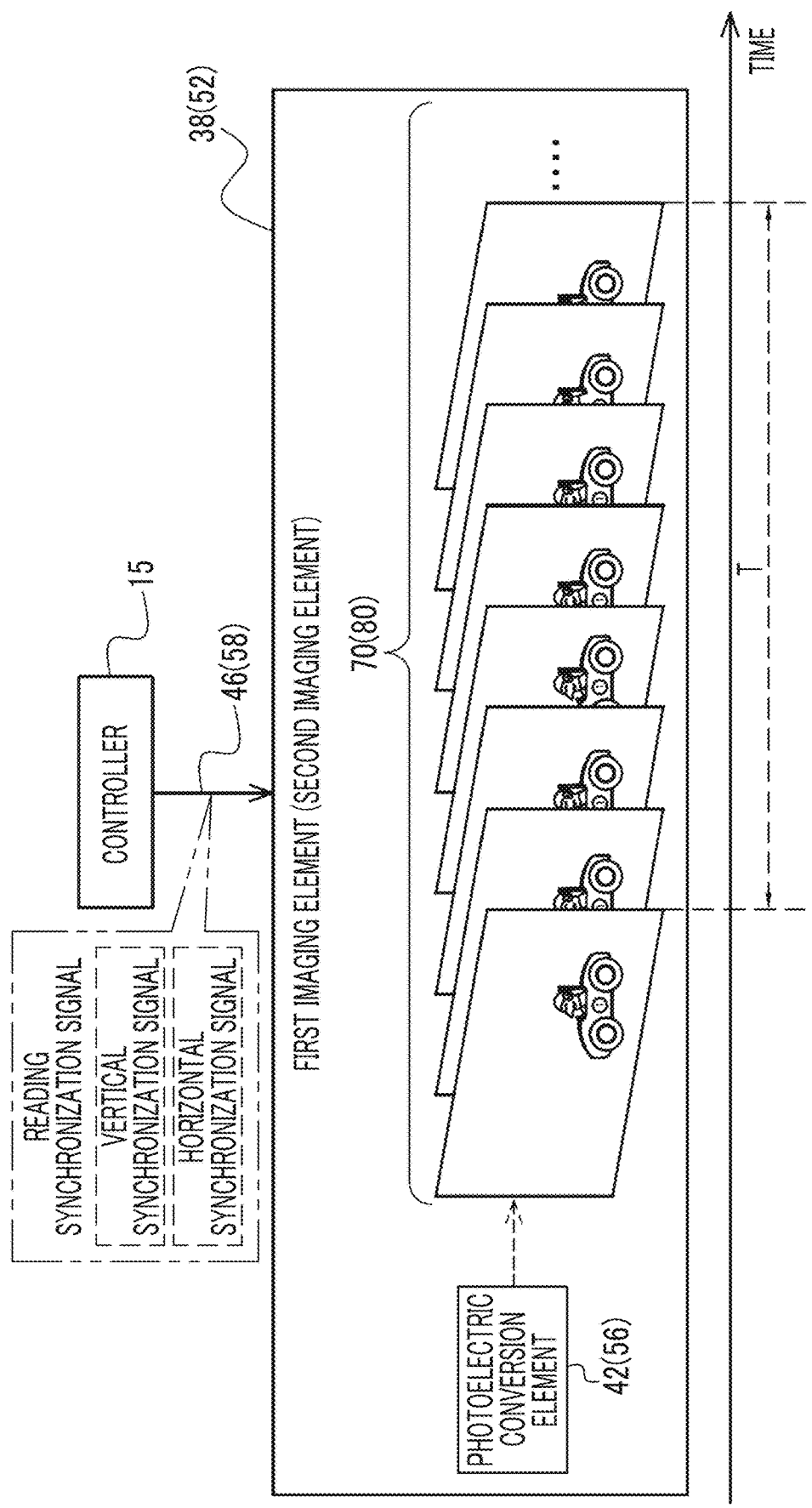
FIG. 4 is a conceptual diagram for describing a frame rate of an imaging element included in an imaging apparatus of the smart device according to the first embodiment.

As illustrated in FIG. 4 as an example, a reading synchronization signal is input into the first imaging element 38 from the controller 15 through the communication line 46. The reading synchronization signal includes a vertical synchronization signal and a horizontal synchronization signal. The vertical synchronization signal is a synchronization signal for defining a start timing of reading of the first image data 70 for each frame from the photoelectric conversion element 42. The horizontal synchronization signal is a synchronization signal for defining a start timing of reading of the first image data 70 for each horizontal line from the photoelectric conversion element 42. In the first imaging element 38, the first image data 70 is read out from the photoelectric conversion element 42 in accordance with a frame rate that is decided depending on the vertical synchronization signal input from the controller 15 through the communication line 46.

Meanwhile, the reading synchronization signal is input into the second imaging element 52 from the controller 15 through the communication line 58. The vertical synchronization signal is a synchronization signal for defining a start timing of reading of the second image data 80 for each frame from the photoelectric conversion element 56. The horizontal synchronization signal is a synchronization signal for defining a start timing of reading of the second image data 80 for each horizontal line from the photoelectric conversion element 56. In the second imaging element 52, the second image data 80 is read out from the photoelectric conversion element 56 in accordance with a frame rate that is decided depending on the vertical synchronization signal input from the controller 15 through the communication line 58.

In the example illustrated in FIG. 4, a frame rate at which eight frames are read out from each of the photoelectric conversion elements 42 and 56 within a period T is illustrated as frame rates of both of the first imaging element 38 and the second imaging element 52. Here, 120 frames per second (fps) is exemplified as a specific example of the frame rates. However, the technology of the present disclosure is not limited thereto. A frame rate exceeding 120 fps may be used, or a frame rate less than 120 fps may be used.

As illustrated in FIG. 5 as an example, the controller 15 comprises a CPU 15A, a ROM 15B, a RAM 15C, and communication I/Fs 15D1, 15D2, and 15E. The CPU 15A, the ROM 15B, the RAM 15C, and the communication I/Fs 15D1, 15D2, and 15E are connected to each other through a busline 100. The CPU 15A is an example of a "display control portion (display processor)" and a "storage control portion (storage processor)" according to the embodiments of the technology of the present disclosure.

The ROM 15B stores various programs. The CPU 15A reads out the various programs from the ROM 15B and loads the read various programs into the RAM 15C. The CPU 15A controls the entire smart device 10 in accordance with the various programs loaded in the RAM 15C.

Each of the communication I/Fs 15D1, 15D2, and 15E is a communication device including an FPGA. Here, the communication device including the FPGA is employed as each of the communication I/Fs 15D1, 15D2, and 15E but is merely an example. Each of the communication I/Fs 15D1, 15D2, and 15E may be a device including an ASIC, an FPGA, and/or a PLD. In addition, each of the communication I/Fs 15D1, 15D2, and 15E may be a computer including a CPU, a ROM, and a RAM. The number of CPUs may be singular or plural. In addition, each of the communication I/Fs 15D1, 15D2, and 15E may be implemented by a combination of a hardware configuration and a software configuration.

The communication I/F 15D1 is connected to the first imaging element 38 through the communication line 46. The CPU 15A controls the first imaging element 38 through the communication I/F 15D1. For example, the CPU 15A controls a reading timing of the first image data 70 from the photoelectric conversion element 42 by supplying the reading synchronization signal to the first imaging element 38 through the communication I/F 15D1.

The communication I/F 15D2 is connected to the second imaging element 52 through the communication line 58. The CPU 15A controls the second imaging element 52 through the communication I/F 15D2. For example, the CPU 15A controls a reading timing of the second image data 80 from the photoelectric conversion element 56 by supplying the reading synchronization signal to the second imaging element 52 through the communication I/F 15D2.

The communication I/F 15E is connected to the signal processing circuit 34 through the communication line 35. The CPU 15A exchanges various types of information with the signal processing circuit 34 through the communication I/F 15E. The signal processing circuit 34 is an example of a "single signal processing portion (single signal processing circuit)" according to the embodiments of the technology of the present disclosure.

The signal processing circuit 34 is an LSI, specifically, a device including an ASIC. Here, the device including the ASIC is employed as the signal processing circuit 34 but is merely an example. The signal processing circuit 34 may be a device including an ASIC, an FPGA, and/or a PLD. In addition, the signal processing circuit 34 may be a computer including a CPU, a ROM, and a RAM. The number of CPUs may be singular or plural. In addition, the signal processing circuit 34 may be implemented by a combination of a hardware configuration and a software configuration.

As will be described in detail later, image data is input into the signal processing circuit 34 from the first imaging element 38. The signal processing circuit 34 performs various types of signal processing (described in detail later) on the image data input from the first imaging element 38. The signal processing circuit 34 outputs the image data on which the various types of signal processing are performed, to the communication I/F 15E through the communication line 35. The image data input into the communication I/F 15E from the signal processing circuit 34 is transferred to the CPU 15A by the communication I/F 15E.

A secondary storage device 102 and an external I/F 104 are connected to the busline 100. The secondary storage device 102 is a non-volatile memory such as a flash memory, an SSD, an HDD, or an EEPROM. The CPU 15A reads out and writes various types of information in the secondary storage device 102. The secondary storage device 102 is an example of a "storage device" according to the embodiments of the technology of the present disclosure.

The external I/F 104 is a communication device including an FPGA. Here, the device including the FPGA is employed as the external I/F 104 but is merely an example. The external I/F 104 may be a device including an ASIC, an FPGA, and/or a PLD. In addition, the external I/F 104 may be implemented by a combination of a hardware configuration and a software configuration.

An external apparatus (not illustrated) such as a USB memory and a memory card is connected to the external I/F 104. The external I/F 104 controls exchange of various types of information between the CPU 15A and the external apparatus. The external apparatus such as a USB memory and a memory card is an example of the "storage device" according to the embodiments of the technology of the present disclosure.

The UI system device 17 comprises the touch panel display 24 and a reception device 84. The display 26 and the touch panel 28 are connected to the busline 100. Accordingly, the CPU 15A displays various types of information on the display 26 and operates in accordance with various instructions received by the touch panel 28.

The reception device 84 comprises a hard key portion 25. The hard key portion 25 includes a plurality of hard keys and includes the instruction key 22 (refer to FIG. 2). The hard key portion 25 is connected to the busline 100, and the CPU 15A acquires various instructions received by the hard key portion 25 and operates in accordance with the acquired instructions.

Figure 6:
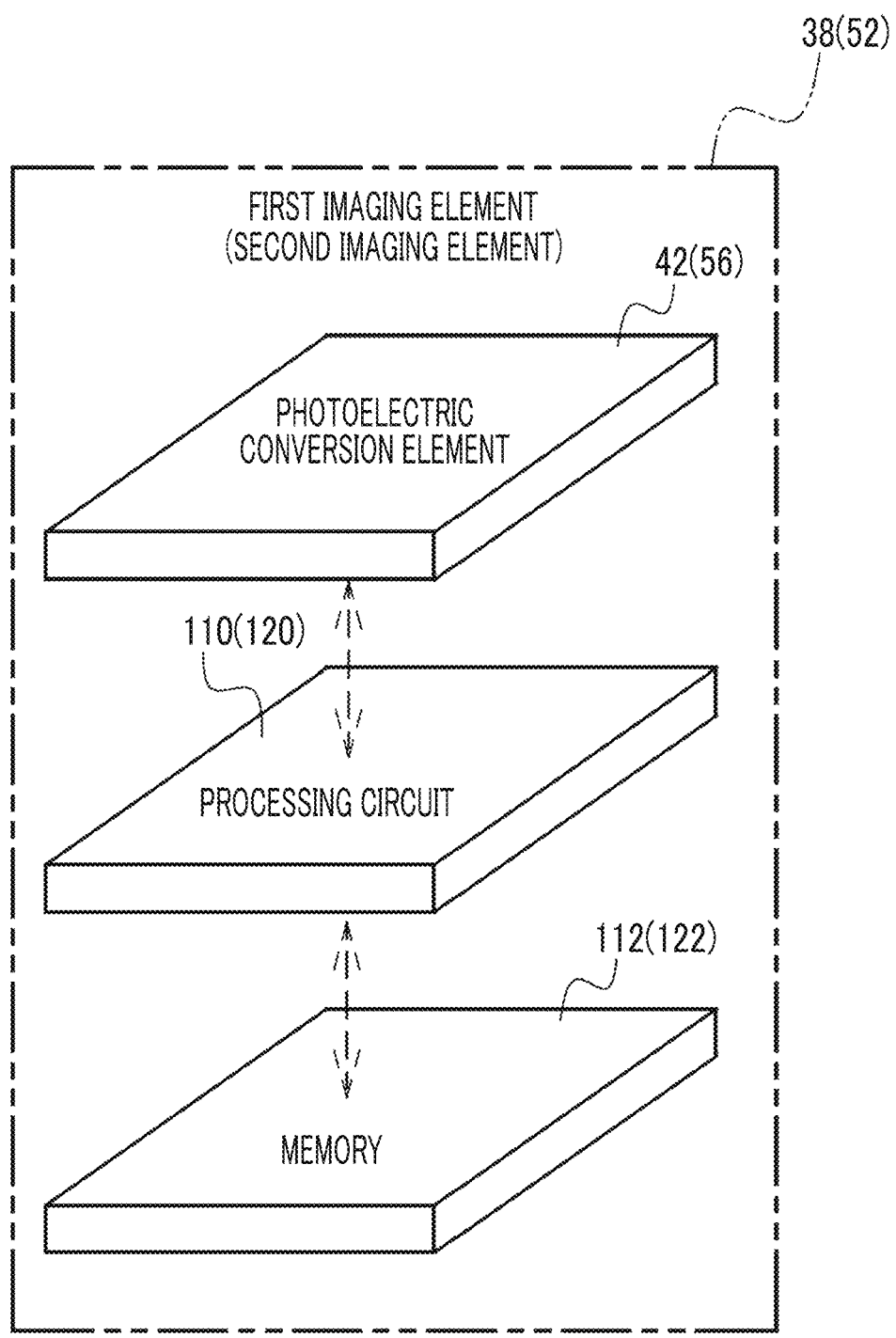
FIG. 6 is a conceptual diagram illustrating an example of a laminated structure of each of a first imaging element and a second imaging element according to the first embodiment.

As illustrated in FIG. 6 as an example, the first imaging element 38 incorporates the photoelectric conversion element 42, a processing circuit 110, and a memory 112. The second imaging element 52 incorporates the photoelectric conversion element 56, a processing circuit 120, and a memory 122. In the second imaging element 52, the photoelectric conversion element 56 is a device having the same function as the photoelectric conversion element 42. The processing circuit 120 is a device having the same function as the processing circuit 110. The memory 122 is a device having the same function as the memory 112. Thus, hereinafter, the first imaging element 38 will be illustratively described for description of the example illustrated in FIG. 6, and the second imaging element 52 will not be described.

The first imaging element 38 is an imaging element in which the photoelectric conversion element 42, the processing circuit 110, and the memory 112 are formed in one chip. That is, the photoelectric conversion element 42, the processing circuit 110, and the memory 112 are formed in one package. In the first imaging element 38, the photoelectric conversion element 42 is laminated with the processing circuit 110 and the memory 112. Specifically, the photoelectric conversion element 42 and the processing circuit 110 are electrically connected to each other by a bump (not illustrated) of copper or the like having conductivity. The processing circuit 110 and the memory 112 are also electrically connected to each other by a bump (not illustrated) of copper or the like having conductivity. While a three-layer structure of the photoelectric conversion element 42, the processing circuit 110, and the memory 112 is illustrated here, the technology of the present disclosure is not limited thereto. A two-layer structure of the photoelectric conversion element 42 and a memory layer in which the processing circuit 110 and the memory 112 are formed in one layer may be used.

For example, the processing circuit 110 is an LSI. The memory 112 is a memory of which a writing timing and a reading timing are different. Here, a DRAM is employed as an example of the memory 112.

The processing circuit 110 is a device including an ASIC and an FPGA and controls the entire first imaging element 38 in accordance with an instruction of the controller 15. While an example of implementing the processing circuit 110 by the device including the ASIC and the FPGA is exemplified here, the technology of the present disclosure is not limited thereto. For example, a device including an ASIC, an FPGA, and/or a PLD may be used. In addition, a computer including a CPU, a ROM, and a RAM may be employed as the processing circuit 110. The number of CPUs may be singular or plural. In addition, the processing circuit 110 may be implemented by a combination of a hardware configuration and a software configuration.

The photoelectric conversion element 42 includes a plurality of photodiodes arranged in a matrix form. Photodiodes of "4896×3265" pixels are illustrated as an example of the plurality of photodiodes.

Color filters are arranged in each photodiode included in the photoelectric conversion element 42. The color filters include a G filter corresponding to green (G) that most contributes to obtaining a brightness signal, an R filter corresponding to red (R), and a B filter corresponding to blue (B). The photoelectric conversion element 42 includes R pixels, G pixels, and B pixels.

The R pixels are pixels corresponding to photodiodes in which the R filter is arranged. The G pixels are pixels corresponding to photodiodes in which the G filter is arranged. The B pixels are pixels corresponding to photodiodes in which the B filter is arranged. The R pixels, the G pixels, and the B pixels are arranged with predetermined periodicity in each of a row direction (horizontal direction) and a column direction (vertical direction). In the present embodiment, the R pixels, the G pixels, and the B pixels are arranged with periodicity corresponding to X-Trans (registered trademark) arrangement. While the X-Trans arrangement is illustrated here, the technology of the present disclosure is not limited thereto. Arrangement of the R pixels, the G pixels, and the B pixels may be Bayer arrangement or honeycomb arrangement.

Figure 7:
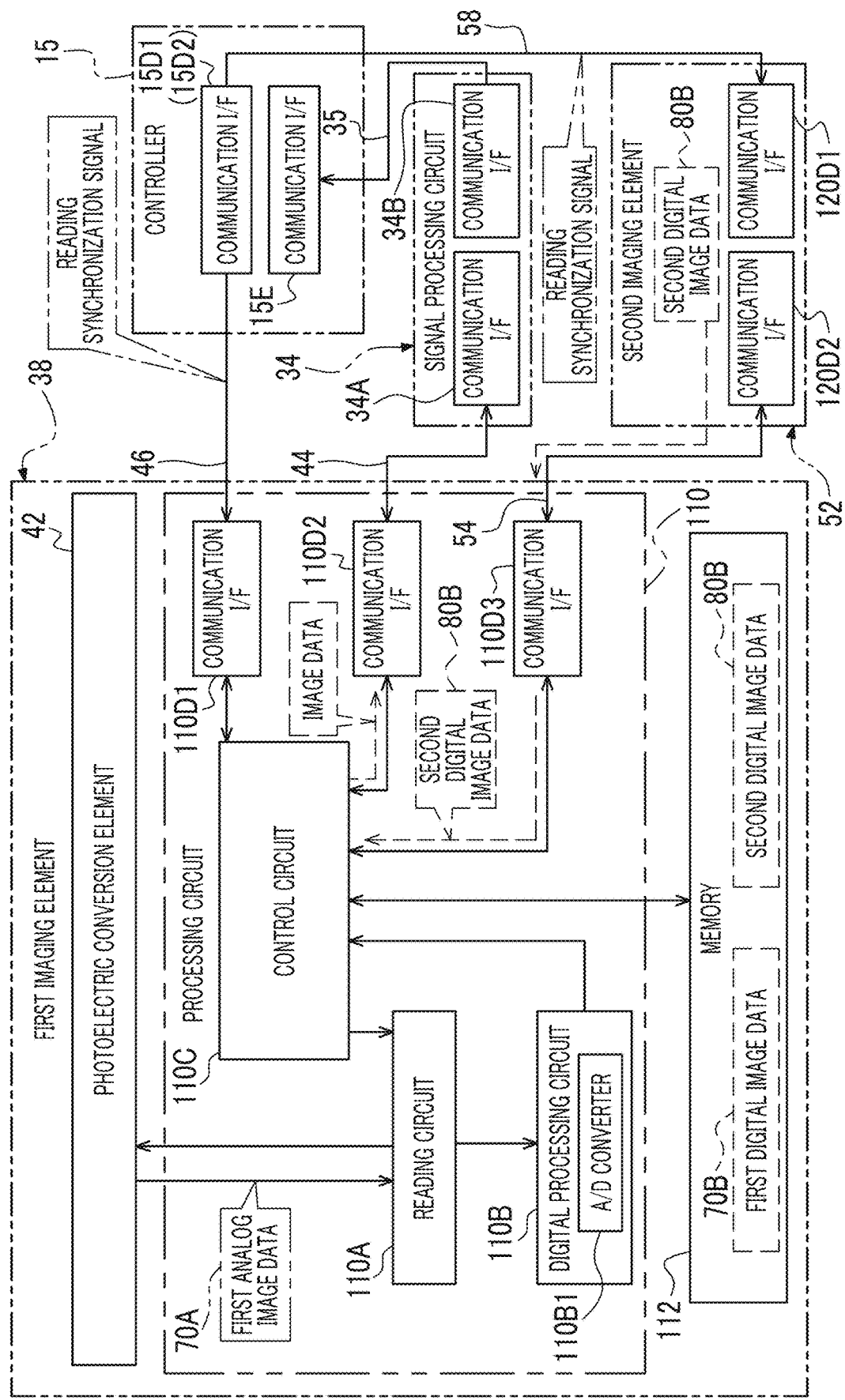
FIG. 7 is a block diagram illustrating an example of a configuration of the first imaging element and a periphery according to the first embodiment.

The first imaging element 38 has a so-called electronic shutter function and controls an electric charge accumulation time period of each photodiode in the photoelectric conversion element 42 by performing the electronic shutter function under control of the controller 15 (refer to FIG. 5 and FIG. 7). The electric charge accumulation time period refers to a so-called shutter speed.

In the first imaging apparatus 30 (refer to FIG. 3), imaging for the still picture image and imaging for the live view image are performed using a rolling shutter method. The imaging for the still picture image is implemented by performing the electronic shutter function and operating the mechanical shutter 40 (refer to FIG. 3). The imaging for the live view image is implemented by performing the electronic shutter function without operating the mechanical shutter 40. While the rolling shutter method is illustrated here, the technology of the present disclosure is not limited thereto. A global shutter method may be applied instead of the rolling shutter method.

Each of the memories 112 and 122 is an example of a "storage portion" according to the embodiments of the technology of the present disclosure. While the DRAM is employed as the memories 112 and 122 in the present embodiment, the technology of the present disclosure is not limited thereto. The technology of the present disclosure is also established in a case where the memories 112 and 122 are SRAMs. In addition, each of the first imaging element 38 and the second imaging element 52 is an example of a "laminated imaging element" according to the embodiments of the technology of the present disclosure. In the present embodiment, each of the first imaging element 38 and the second imaging element 52 is a CMOS image sensor. In addition, while the CMOS image sensor is illustrated here as the first imaging element 38 and the second imaging element 52, the technology of the present disclosure is not limited thereto. For example, the technology of the present disclosure is also established in a case where the first imaging element 38 and the second imaging element 52 are CCD image sensors.

As illustrated in FIG. 7 as an example, the signal processing circuit 34 comprises communication I/Fs 34A and 34B. As will be described in detail later, the communication I/F 34A is connected to the processing circuit 110 of the first imaging element 38 through the communication line 44, and the signal processing circuit 34 communicates with the processing circuit 110 of the first imaging element 38 through the communication I/F 34A. For example, the communication I/F 34A receives the image data output from the first imaging element 38.

The communication I/F 34B is connected to the communication I/F 15E of the controller 15 through the communication line 35, and the signal processing circuit 34 communicates with the controller 15 through the communication I/Fs 34B and 15E. For example, the communication I/F 34B outputs the image data obtained by performing the various types of signal processing (described in detail later) by the signal processing circuit 34 to the communication I/F 15E of the controller 15 through the communication line 35.

The second imaging element 52 comprises communication I/Fs 120D1 and 120D2. The communication I/F 120D2 is an example of an "output portion (communication interface)" according to the embodiments of the technology of the present disclosure. The communication I/F 120D1 is connected to the communication I/F 15D2 of the controller 15 through the communication line 58, and the second imaging element 52 communicates with the controller 15 through the communication I/Fs 15D2 and 120D1. For example, the second imaging element 52 receives, by the communication I/F 120D1, the reading synchronization signal which is output from the communication I/F 15D2 of the controller 15 through the communication line 58.

As will be described in detail later, the communication I/F 120D2 is connected to the processing circuit 110 of the first imaging element 38 through the communication line 54, and the second imaging element 52 communicates with the processing circuit 110 of the first imaging element 38 through the communication I/F 120D2. For example, the second imaging element 52 outputs the second image data 80 obtained by imaging the subject to the processing circuit 110 from the communication I/F 120D2 through the communication line 54.

In the first imaging element 38, the processing circuit 110 comprises a reading circuit 110A, a digital processing circuit 110B, a control circuit 110C, and communication I/Fs 110D1, 110D2, and 110D3. The communication I/F 110D2 is an example of the "output portion (communication interface)" according to the embodiments of the technology of the present disclosure.

The reading circuit 110A is connected to each of the photoelectric conversion element 42, the digital processing circuit 110B, and the control circuit 110C. The digital processing circuit 110B is connected to the control circuit 110C. The control circuit 110C is connected to each of the memory 112 and the communication I/Fs 110D1, 110D2, and 110D3.

As illustrated in FIG. 7 as an example, the first image data 70 is broadly divided into first analog image data 70A and first digital image data 70B. Hereinafter, for convenience of description, the first analog image data 70A and the first digital image data 70B will be referred to as the "first image data 70" unless otherwise necessary to distinguish therebetween.

The communication I/F 110D1 is a communication device including an FPGA and is connected to the communication I/F 15D1 of the controller 15 through the communication line 46. The processing circuit 110 and the controller 15 are connected in accordance with a PCI-e connection standard by the communication I/Fs 15D1 and 110D1 through the communication line 46.

The communication I/F 110D1 receives the reading synchronization signal which is output from the communication I/F 15D1 of the controller 15 through the communication line 46, and outputs the received reading synchronization signal to the control circuit 110C.

The communication I/F 110D2 is a communication device including an FPGA and is connected to the communication I/F 34A of the signal processing circuit 34 in accordance with the PCI-e connection standard through the communication line 44. The communication I/F 110D2 controls communication between the signal processing circuit 34 and the control circuit 110C. Here, the communication device including the FPGA is employed as the communication I/F 110D2 but is merely an example. The communication I/F 110D2 may be a device including an ASIC, an FPGA, and/or a PLD. In addition, the communication I/F 110D2 may be a computer including a CPU, a ROM, and a RAM. The number of CPUs may be singular or plural. In addition, the communication I/F 110D2 may be implemented by a combination of a hardware configuration and a software configuration.

The communication I/F 110D3 is a communication device including an FPGA and is connected to the communication I/F 120D2 of the second imaging element 52 in accordance with the PCI-e connection standard through the communication line 54. The communication I/F 110D3 controls communication between the second imaging element 52 and the control circuit 110C. Here, the communication device including the FPGA is employed as the communication I/F 110D3 but is merely an example. The communication I/F 110D3 may be a device including an ASIC, an FPGA, and/or a PLD. In addition, the communication I/F 110D3 may be a computer including a CPU, a ROM, and a RAM. The number of CPUs may be singular or plural. In addition, the communication I/F 110D3 may be implemented by a combination of a hardware configuration and a software configuration.

The reading circuit 110A controls the photoelectric conversion element 42 and reads out the first analog image data 70A from the photoelectric conversion element 42 under control of the control circuit 110C. Reading of the first analog image data 70A from the photoelectric conversion element 42 is performed in accordance with the reading synchronization signal which is input into the processing circuit 110 from the controller 15.

Specifically, first, the communication I/F 110D1 receives the reading synchronization signal from the controller 15 and outputs the received reading synchronization signal to the control circuit 110C. Next, the control circuit 110C transfers the reading synchronization signal input from the communication I/F 110D1 to the reading circuit 110A. That is, the vertical synchronization signal and the horizontal synchronization signal are transferred to the reading circuit 110A. The reading circuit 110A starts reading out the first analog image data 70A in units of frames from the photoelectric conversion element 42 in accordance with the vertical synchronization signal transferred from the control circuit 110C. In addition, the reading circuit 110A starts reading out the first analog image data 70A in units of horizontal lines in accordance with the horizontal synchronization signal transferred from the control circuit 110C.

The reading circuit 110A performs analog signal processing on the first analog image data 70A read out from the photoelectric conversion element 42. The analog signal processing includes well-known processing such as noise cancellation processing and analog gain processing. The noise cancellation processing is processing of canceling a noise caused by variations in characteristics between pixels included in the photoelectric conversion element 42. The analog gain processing is processing of applying a gain to the first analog image data 70A. The first analog image data 70A on which the analog signal processing is performed in such a manner is output to the digital processing circuit 110B by the reading circuit 110A.

The digital processing circuit 110B comprises an A/D converter 110B1. The A/D converter 110B1 performs A/D conversion on the first analog image data 70A.

The digital processing circuit 110B performs digital signal processing on the first analog image data 70A input from the reading circuit 110A. For example, the digital signal processing includes correlative double sampling processing, the A/D conversion performed by the A/D converter 110B1, and digital gain processing.

The correlative double sampling processing is performed on the first analog image data 70A by the digital processing circuit 110B. The A/D converter 110B1 performs the A/D conversion on the first analog image data 70A on which signal processing of the correlative double sampling processing is performed. Accordingly, the first analog image data 70A is digitized, and the first digital image data 70B is obtained as RAW data. The digital gain processing is performed on the first digital image data 70B by the digital processing circuit 110B. The digital gain processing refers to processing of applying a gain to the first digital image data 70B. The first digital image data 70B obtained by performing the digital signal processing in such a manner is output to the control circuit 110C by the digital processing circuit 110B.

Meanwhile, as will be described in detail later, in the second imaging element 52, second digital image data 80B that indicates the image of the subject is generated using the same method as the first imaging element 38. The second digital image data 80B generated by the second imaging element 52 is output to the communication I/F 110D3 of the processing circuit 110 through the communication line 54 by the communication I/F 120D2 of the second imaging element 52. The second digital image data 80B output by the communication I/F 120D2 is received by the communication I/F 110D3 and transferred to the control circuit 110C.

In the first embodiment, the first digital image data 70B and the second digital image data 80B will be referred to as the "digital image data" without a reference sign unless otherwise necessary to distinguish therebetween. The "second digital image data 80B" here is an example of "output image data" according to the embodiments of the technology of the present disclosure.

The memory 112 is a memory that can store the digital image data of a plurality of frames. The memory 112 has a storage region (not illustrated) in units of pixels. The digital image data is stored in a corresponding storage region of the memory 112 in units of pixels by the control circuit 110C.

The control circuit 110C stores the first digital image data 70B input from the digital processing circuit 110B in the memory 112. In addition, the control circuit 110C stores the second digital image data 80B input from the communication I/F 110D3 in the memory 112.

The control circuit 110C can randomly access the memory 112 and acquires the digital image data from the memory 112 in response to a request from the signal processing circuit 34 through the communication I/F 110D2. The control circuit 110C outputs image data obtained by performing image processing on the digital image data acquired from the memory 112 to the communication I/F 110D2.

The communication I/F 110D2 outputs the image data input from the control circuit 110C to the signal processing circuit 34 through the communication line 44. In the signal processing circuit 34, the image data output from the communication I/F 110D2 is received by the communication I/F 34A, and various types of signal processing (described in detail later) are performed on the received image data.

Figure 8:
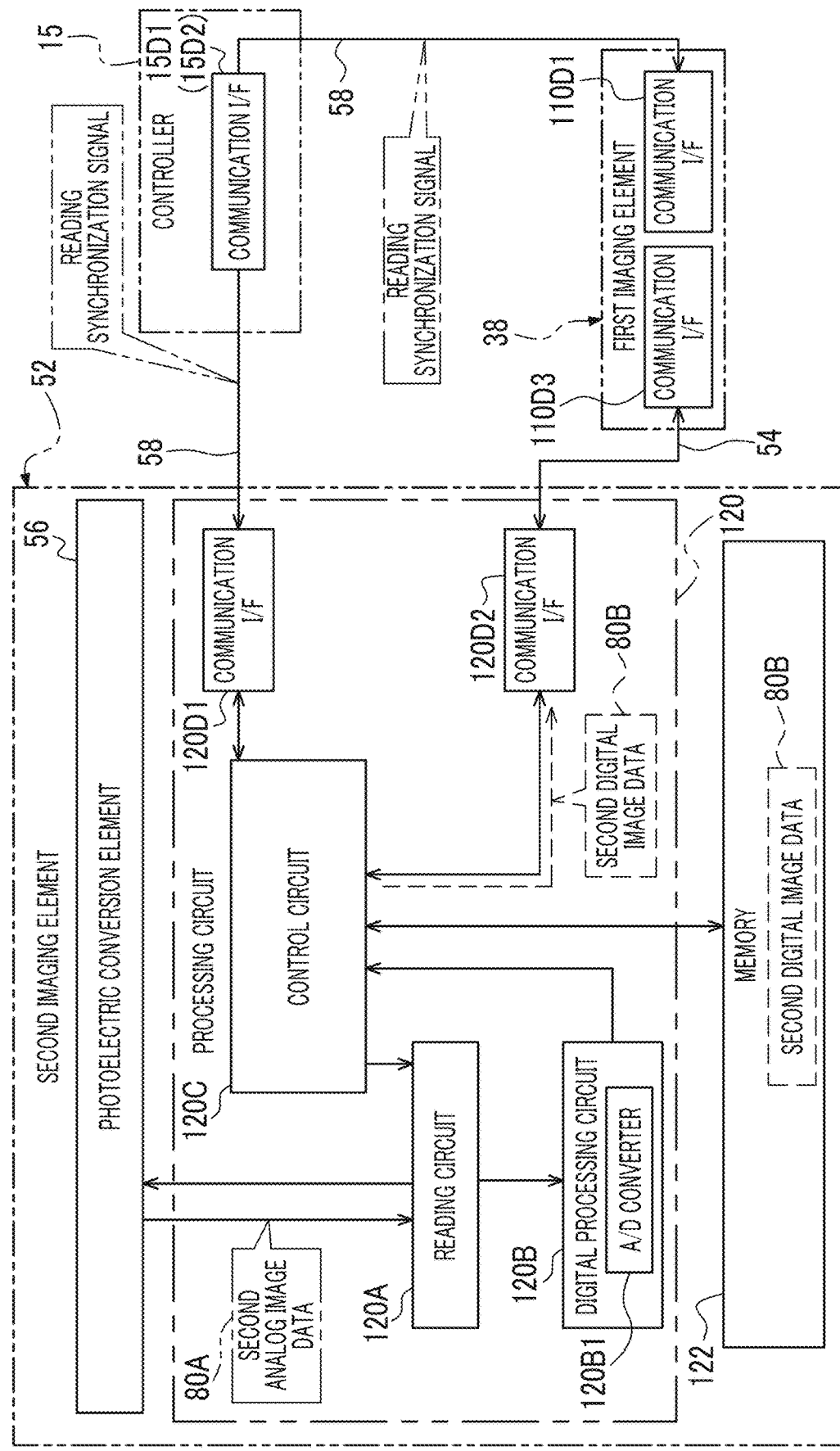
FIG. 8 is a block diagram illustrating an example of a configuration of the second imaging element and a periphery according to the first embodiment.

As illustrated in FIG. 8 as an example, in the second imaging element 52, the processing circuit 120 comprises a reading circuit 120A, a digital processing circuit 120B, a control circuit 120C, and the communication I/Fs 120D1 and 120D2.

The reading circuit 120A is connected to each of the photoelectric conversion element 56, the digital processing circuit 120B, and the control circuit 120C. The digital processing circuit 120B is connected to the control circuit 120C. The control circuit 120C is connected to each of the memory 122 and the communication I/Fs 120D1 and 120D2.

As illustrated in FIG. 8 as an example, the second image data 80 is broadly divided into second analog image data 80A and second digital image data 80B. Hereinafter, for convenience of description, the second analog image data 80A and the second digital image data 80B will be referred to as the "second image data 80" unless otherwise necessary to distinguish therebetween.

The communication I/F 120D1 is a communication device including an FPGA and is connected to the communication I/F 15D2 of the controller 15 through the communication line 58. The processing circuit 120 and the controller 15 are connected in accordance with the PCI-e connection standard by the communication I/Fs 15D2 and 120D1 through the communication line 58.

The communication I/F 120D1 receives the reading synchronization signal which is output from the communication I/F 15D2 of the controller 15 through the communication line 58, and outputs the received reading synchronization signal to the control circuit 120C.

The communication I/F 120D2 is a communication device including an FPGA. Here, the communication device including the FPGA is employed as the communication I/F 120D2 but is merely an example. The communication I/F 120D2 may be a device including an ASIC, an FPGA, and/or a PLD. In addition, the communication I/F 120D2 may be a computer including a CPU, a ROM, and a RAM. The number of CPUs may be singular or plural. In addition, the communication I/F 120D2 may be implemented by a combination of a hardware configuration and a software configuration.

The reading circuit 120A controls the photoelectric conversion element 56 and reads out the second analog image data 80A from the photoelectric conversion element 56 under control of the control circuit 120C. Reading of the second analog image data 80A from the photoelectric conversion element 56 is performed in accordance with the reading synchronization signal which is input into the processing circuit 120 from the controller 15.

Specifically, first, the communication I/F 120D1 receives the reading synchronization signal from the controller 15 and outputs the received reading synchronization signal to the control circuit 120C. Next, the control circuit 120C transfers the reading synchronization signal input from the communication I/F 120D1 to the reading circuit 120A. That is, the vertical synchronization signal and the horizontal synchronization signal are transferred to the reading circuit 120A. The reading circuit 120A starts reading out the second analog image data 80A in units of frames from the photoelectric conversion element 56 in accordance with the vertical synchronization signal transferred from the control circuit 120C. In addition, the reading circuit 120A starts reading out the second analog image data 80A in units of horizontal lines in accordance with the horizontal synchronization signal transferred from the control circuit 120C.

The reading circuit 120A performs the analog signal processing on the second analog image data 80A read out from the photoelectric conversion element 56. The second analog image data 80A on which the analog signal processing is performed in such a manner is output to the digital processing circuit 120B by the reading circuit 120A.

The digital processing circuit 120B comprises an A/D converter 120B1. The A/D converter 120B1 performs the A/D conversion on the second analog image data 80A.

The digital processing circuit 120B performs the digital signal processing on the second analog image data 80A input from the reading circuit 120A. The digital signal processing for the second analog image data 80A is different from the digital signal processing for the first analog image data 70A in that the A/D conversion by the A/D converter 120B1 is included instead of the A/D conversion by the A/D converter 110B1.

The A/D converter 120B1 performs the A/D conversion on the second analog image data 80A on which signal processing of the correlative double sampling processing is performed. Accordingly, the second analog image data 80A is digitized, and the second digital image data 80B is obtained as the RAW data. The second digital image data 80B obtained by performing the digital signal processing is output to the control circuit 120C by the digital processing circuit 120B.

The memory 122 is a memory that can store the second digital image data 80B of a plurality of frames. The memory 122 has a storage region (not illustrated) in units of pixels. The second digital image data 80B is stored in a corresponding storage region of the memory 122 in units of pixels by the control circuit 120C. The control circuit 120C stores the second digital image data 80B input from the digital processing circuit 120B in the memory 122.

The control circuit 120C can randomly access the memory 122 and acquires the second digital image data 80B from the memory 122. The control circuit 120C outputs the second digital image data 80B acquired from the memory 122 to the communication I/F 120D2. The communication I/F 120D2 outputs the second digital image data 80B input from the control circuit 120C to the communication I/F 110D3 of the first imaging element 38 through the communication line 54.

Here, an example of a transfer path and a processing method of the image data will be described with reference to FIG. 9 and FIG. 10.

Figure 9:
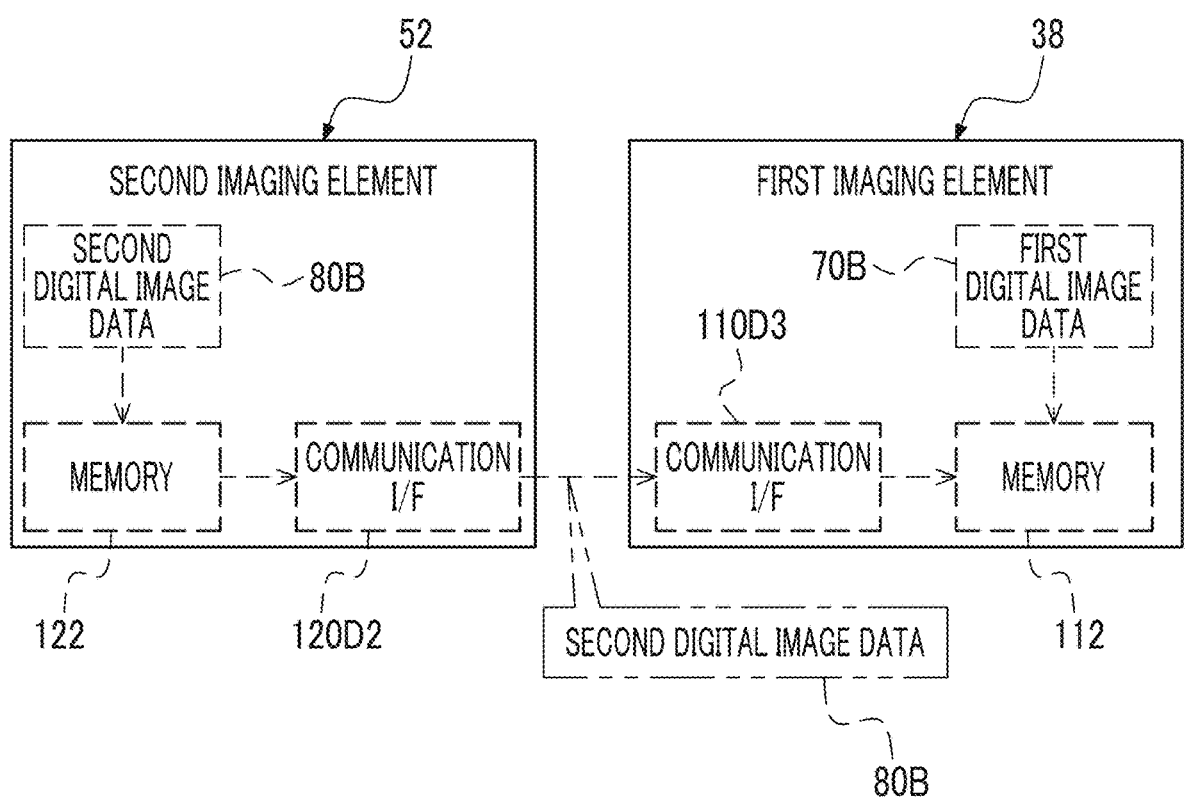
FIG. 9 is a conceptual diagram illustrating an example of a flow of image data between the first imaging element and the second imaging element included in the imaging apparatus according to the first embodiment.

As illustrated in FIG. 9 as an example, the second digital image data 80B obtained by imaging the subject by the second imaging element 52 is stored in the memory 122 and then, is output to the first imaging element 38 through the communication line 54. That is, the first imaging element 38 and the second imaging element 52 are adjacent imaging elements, and the second digital image data 80B is output by the communication I/F 120D2 of the second imaging element 52 that is an imaging element in a front stage out of the adjacent imaging elements. The second digital image data 80B output by the communication I/F 120D2 is received by the communication I/F 110D3 of the first imaging element 38 that is an imaging element in a rear stage out of the adjacent imaging elements, and the received second digital image data 80B is stored in the memory 112. In addition, the first digital image data 70B obtained by imaging by the first imaging element 38 is stored in the memory 112.

The first digital image data 70B is an example of "rear stage image data" according to the embodiments of the technology of the present disclosure. In addition, the second digital image data 80B is an example of "front stage image data" according to the embodiments of the technology of the present disclosure.

Figure 10:
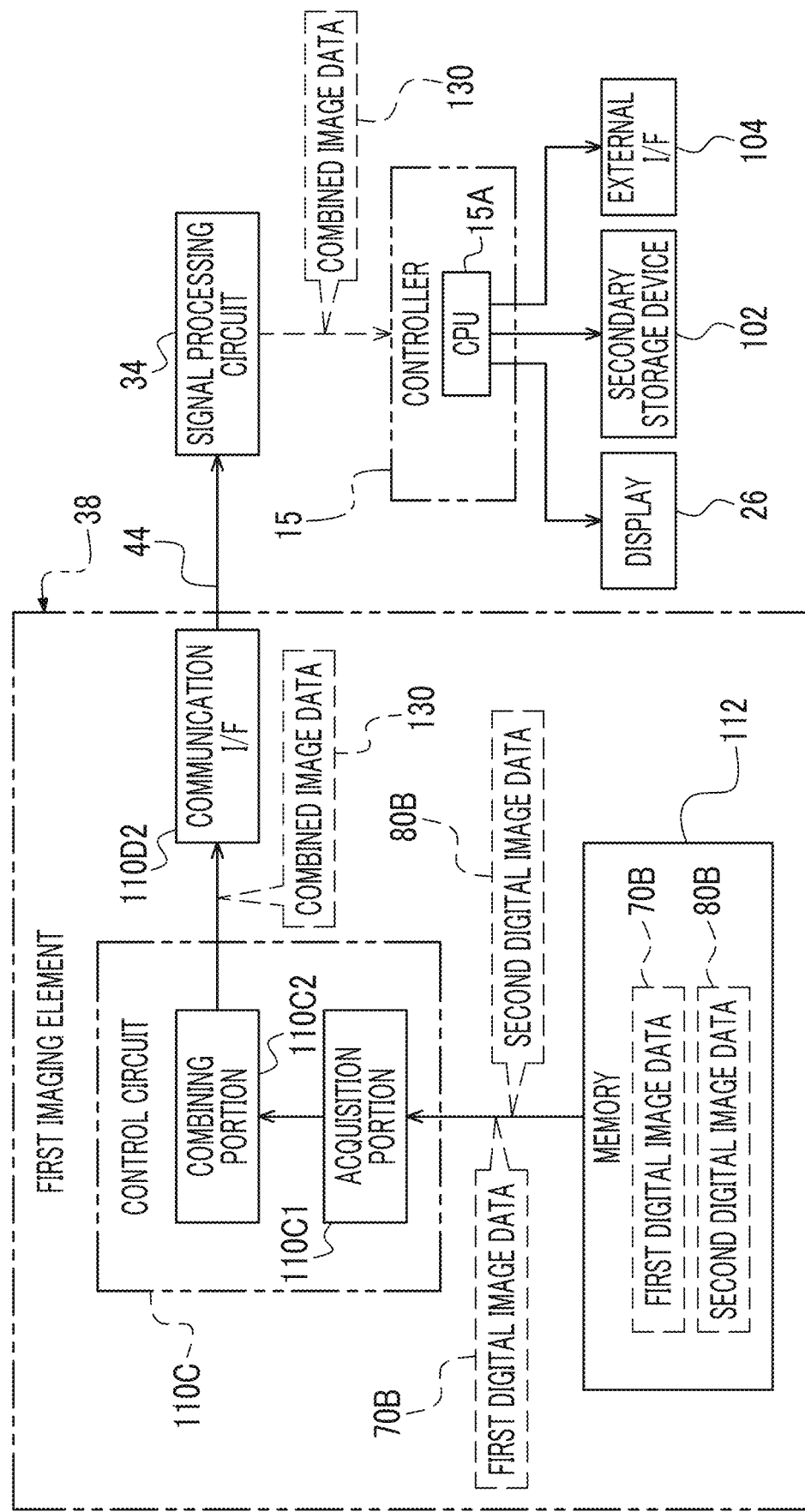
FIG. 10 is a conceptual diagram illustrating an example of a flow of image data among the first imaging element, a signal processing circuit, and the controller included in the imaging apparatus according to the first embodiment.

As illustrated in FIG. 10 as an example, in the first imaging element 38, the control circuit 110C includes an acquisition portion 110C1 and a combining portion 110C2. The combining portion 110C2 is an example of a "combining circuit" according to the embodiments of the technology of the present disclosure. The acquisition portion 110C1 acquires the first digital image data 70B and the second digital image data 80B from the memory 112. Here, while an example of a form of temporarily storing the second digital image data 80B in the memory 112 and then, acquiring the second digital image data 80B from the memory 112 by the acquisition portion 110C1 is illustratively described, the technology of the present disclosure is not limited thereto.

The second digital image data 80B may be acquired by the acquisition portion 110C1 without being stored in the memory 112.

The combining portion 110C2 combines the first digital image data 70B and the second digital image data 80B acquired by the acquisition portion 110C1. Specifically, the combining portion 110C2 combines the first digital image data 70B and the second digital image data 80B by calculating an arithmetic mean of the first digital image data 70B and the second digital image data 80B in units of pixels.

Here, while the arithmetic mean is illustratively described as a combining method, the combining method is not limited thereto. For example, alpha blending using the first digital image data 70B and the second digital image data 80B may be performed. In addition, the first digital image data 70B and the second digital image data 80B may be simply added in units of pixels. In such a manner, the technology of the present disclosure is established even in a case where any method of combining the first digital image data 70B and the second digital image data 80B is used.

The combining portion 110C2 outputs combined image data 130 obtained by combining the first digital image data 70B and the second digital image data 80B to the communication I/F 110D2. The communication I/F 110D2 outputs the combined image data 130 input from the combining portion 110C2 to the signal processing circuit 34 through the communication line 44. The combined image data 130 is an example of the "output image data" according to the embodiments of the technology of the present disclosure.

In the signal processing circuit 34, various types of signal processing are performed on the combined image data 130, and the combined image data 130 on which the various types of signal processing are performed is output to the controller 15. In the controller 15, in a case where the combined image data 130 is input, the combined image data 130 is stored in the secondary storage device 102 by the CPU 15A or stored in the external apparatus (not illustrated) through the external I/F 104. In addition, in the controller 15, in a case where the combined image data 130 is input, an image based on the combined image data 130 is displayed on the display 26 as the still picture image or the live view image by the CPU 15A.

The various types of signal processing performed by the signal processing circuit 34 include well-known signal processing such as demosaicing, digital thinning processing, and digital addition processing.

The demosaicing is processing of calculating every color information for each pixel from a mosaic image corresponding to arrangement of the color filters. For example, in a case of an imaging element consisting of color filters of three colors of R, G, and B, color information on all of R, G, and B for each pixel from a mosaic image consisting of R, G, and B is calculated. The digital thinning processing is processing of thinning out pixels included in the combined image data 130 in units of lines. For example, the units of lines refer to units of horizontal lines and/or units of vertical lines. The digital addition processing is, for example, processing of calculating an arithmetic mean of pixel values for a plurality of pixels included in the combined image data 130.

The various types of signal processing performed by the signal processing circuit 34 may include other well-known signal processing. For example, white balance adjustment, sharpness adjustment, gamma correction, color space conversion processing, and color difference correction are exemplified as the other well-known signal processing. In addition, the various types of signal processing may be performed in a distributed manner by the signal processing circuit 34 and the first imaging element 38. That is, at least a part of the various types of signal processing performed by the signal processing circuit 34 may be performed by the processing circuit 110 of the first imaging element 38.

Figure 11:
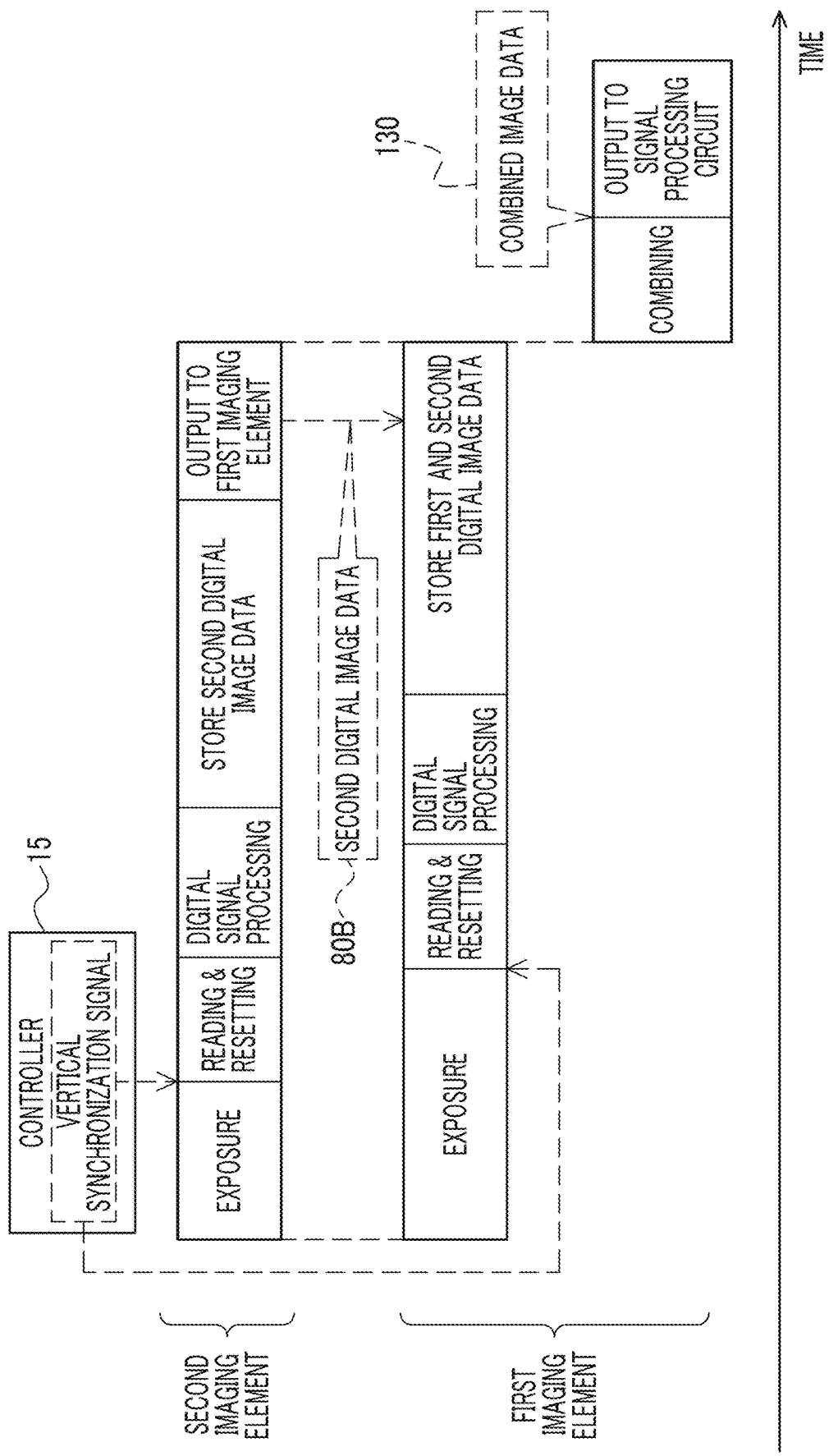
FIG. 11 is a time chart illustrating an example of a processing content in each of the first imaging element and the second imaging element included in the imaging apparatus according to the first embodiment.

As illustrated in FIG. 11 as an example, in the second imaging element 52, the second analog image data 80A is generated by exposing the photoelectric conversion element 56. In a case where the vertical synchronization signal is input, reading of the second analog image data 80A from the photoelectric conversion element 56 and resetting of the photoelectric conversion element 56 are performed. Resetting of the photoelectric conversion element 56 refers to an operation of deleting residual electric charges of each pixel in the photoelectric conversion element 56. Exposure performed by the photoelectric conversion element 56 is performed after previous resetting of the photoelectric conversion element 56 by the reading circuit 120A and before reading.

The second digital image data 80B is generated by performing the digital signal processing on the second analog image data 80A, and the generated second digital image data 80B is stored in the memory 122. The second digital image data 80B stored in the memory 122 is output to the first imaging element 38.

Meanwhile, in the first imaging element 38, the first analog image data 70A is generated by exposing the photoelectric conversion element 42. In a case where the vertical synchronization signal is input, reading of the first analog image data 70A from the photoelectric conversion element 42 and resetting of the photoelectric conversion element 42 are performed. Resetting of the photoelectric conversion element 42 refers to an operation of deleting residual electric charges of each pixel in the photoelectric conversion element 42. Exposure performed by the photoelectric conversion element 42 is performed after previous resetting of the photoelectric conversion element 42 by the reading circuit 110A and before reading.

The first digital image data 70B is generated by performing the digital signal processing on the first analog image data 70A. The first digital image data 70B is temporarily stored in the memory 112 in order to be synchronized with the second digital image data 80B output from the second imaging element 52. In a case where the second digital image data 80B is stored in the memory 112, the combined image data 130 is generated by combining the first digital image data 70B and the second digital image data 80B stored in the memory 112. The combined image data 130 is output to the signal processing circuit 34.

In addition, in the example illustrated in FIG. 11, an input timing of the vertical synchronization signal input into the first imaging element 38 is later than an input timing of the vertical synchronization signal input into the second imaging element 52. Accordingly, an exposure time period of the photoelectric conversion element 42 in the first imaging element 38 is longer than an exposure time period of the photoelectric conversion element 56 in the second imaging element 52.

Next, actions of parts of the smart device 10 according to the embodiments of the technology of the present disclosure will be described.

First, a flow of front stage imaging processing executed by the processing circuit 120 of the second imaging element 52 will be described with reference to FIG. 12.

Figure 12:
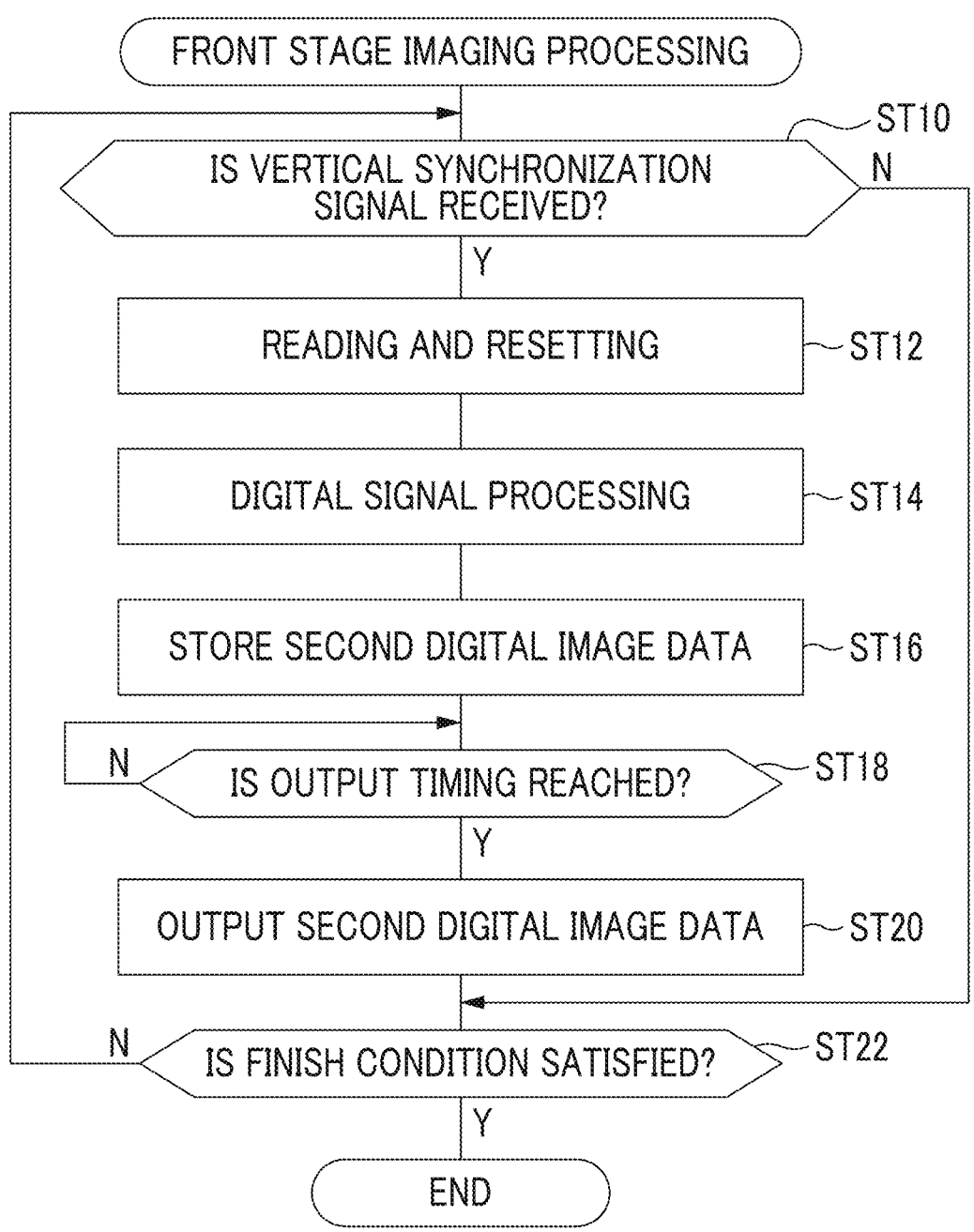
FIG. 12 is a flowchart illustrating an example of a flow of front stage imaging processing according to the first embodiment.

In the front stage imaging processing illustrated in FIG. 12, first, in step ST10, the control circuit 120C determines whether or not the vertical synchronization signal from the controller 15 is received by the communication I/F 120D1.

In step ST10, in a case where the vertical synchronization signal from the controller 15 is not received by the communication I/F 120D1, a negative determination is made, and the front stage imaging processing transitions to step ST22. In step ST10, in a case where the vertical synchronization signal from the controller 15 is received by the communication I/F 120D1, a positive determination is made, and the front stage imaging processing transitions to step ST12.

In step ST12, the reading circuit 120A reads out the second analog image data 80A and resets the photoelectric conversion element 56. Then, the front stage imaging processing transitions to step ST14.

In step ST14, the digital processing circuit 120B performs the digital signal processing on the second analog image data 80A. Then, the front stage imaging processing transitions to step ST16.

The second digital image data 80B obtained by performing the digital signal processing on the second analog image data 80A in step ST14 is transferred to the control circuit 120C.

In step ST16, the control circuit 120C stores the second digital image data 80B in the memory 122. Then, the front stage imaging processing transitions to step ST18.

In step ST18, the control circuit 120C determines whether or not a timing (output timing) at which the second digital image data 80B is output to the first imaging element 38 is reached. A timing at which the control circuit 120C can read out the second digital image data 80B from the memory 122 is exemplified as an example of the output timing. The memory 122 is the DRAM, and writing and reading in the memory 122 can be performed at the same time. Thus, for example, the timing at which the control circuit 120C can read out the second digital image data 80B from the memory 122 refers to a timing at which storage of the second digital image data 80B of one frame in the memory 122 is completed.

In step ST18, in a case where the output timing is not reached, a negative determination is made, and the determination of step ST18 is performed again. In step ST18, in a case where the output timing is reached, a positive determination is made, and the front stage imaging processing transitions to step ST20.

In step ST20, the control circuit 120C acquires the second digital image data 80B from the memory 122 and outputs the acquired second digital image data 80B to the first imaging element 38 through the communication I/F 120D2. Then, the front stage imaging processing transitions to step ST22.

In step ST22, the control circuit 120C determines whether or not a condition (hereinafter, referred to as a "front stage imaging processing finish condition") under which the front stage imaging processing is finished is satisfied. A condition that an instruction to finish the front stage imaging processing is received by the reception device 84 (refer to FIG. 5) is exemplified as an example of the front stage imaging processing finish condition. In step ST22, in a case where the front stage imaging processing finish condition is not satisfied, a negative determination is made, and the front stage imaging processing transitions to step ST10. In step ST22, in a case where the front stage imaging processing finish condition is satisfied, a positive determination is made, and the front stage imaging processing is finished.

Next, a flow of rear stage imaging processing executed by the processing circuit 110 of the first imaging element 38 will be described with reference to FIG. 13.

Figure 13:
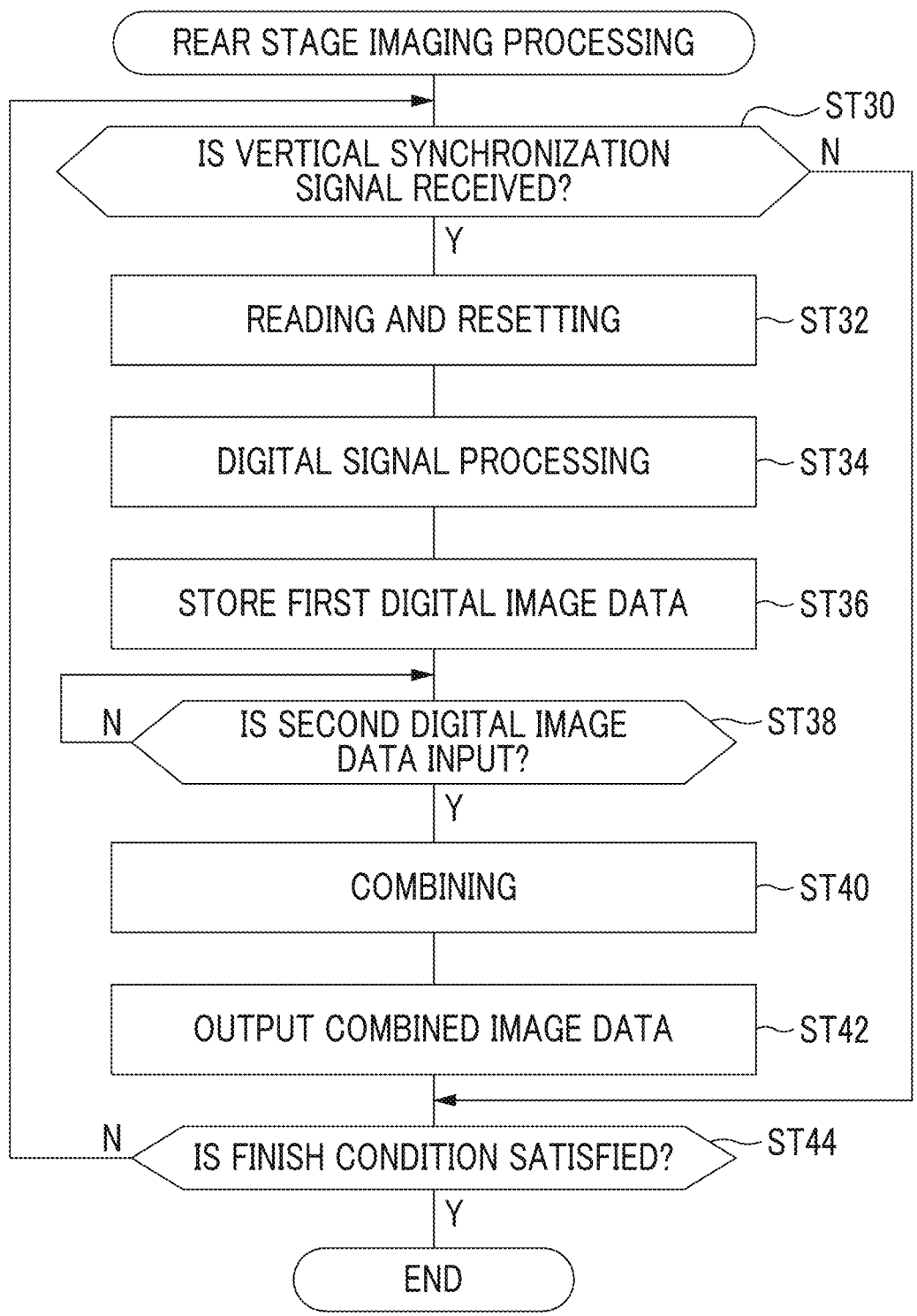
FIG. 13 is a flowchart illustrating an example of a flow of rear stage imaging processing according to the first embodiment.

In the rear stage imaging processing illustrated in FIG. 13, first, in step ST30, the control circuit 110C determines whether or not the vertical synchronization signal from the controller 15 is received by the communication I/F 110D1. In step ST30, in a case where the vertical synchronization signal from the controller 15 is not received by the communication I/F 110D1, a negative determination is made, and the rear stage imaging processing transitions to step ST44. In step ST30, in a case where the vertical synchronization signal from the controller 15 is received by the communication I/F 110D1, a positive determination is made, and the rear stage imaging processing transitions to step ST32.

In step ST32, the reading circuit 110A reads out the first analog image data 70A and resets the photoelectric conversion element 42. Then, the rear stage imaging processing transitions to step ST34.

In step ST34, the digital processing circuit 110B performs the digital signal processing on the first analog image data 70A. Then, the rear stage imaging processing transitions to step ST36.

The first digital image data 70B obtained by performing the digital signal processing on the first analog image data 70A in step ST34 is transferred to the control circuit 110C.

In step ST36, the control circuit 110C stores the first digital image data 70B in the memory 112. Then, the rear stage imaging processing transitions to step ST38.

In step ST38, the control circuit 110C determines whether or not the second digital image data 80B is input from the second imaging element 52. In step ST38, in a case where the second digital image data 80B is not input from the second imaging element 52, a negative determination is made, and the determination of step ST38 is performed again. In step ST38, in a case where the second digital image data 80B is input from the second imaging element 52, a positive determination is made, and the rear stage imaging processing transitions to step ST40.

In step ST40, the control circuit 110C generates the combined image data 130 by combining the first digital image data 70B and the second digital image data 80B. Then, the rear stage imaging processing transitions to step ST42.

In step ST42, the control circuit 110C outputs the combined image data 130 to the signal processing circuit 34 through the communication I/F 110D2. Then, the rear stage imaging processing transitions to step ST44.

In step ST44, the control circuit 110C determines whether or not a condition (hereinafter, referred to as a "rear stage imaging processing finish condition") under which the rear stage imaging processing is finished is satisfied. A condition that an instruction to finish the rear stage imaging processing is received by the reception device 84 (refer to FIG. 5) is exemplified as an example of the rear stage imaging processing finish condition. In step ST44, in a case where the rear stage imaging processing finish condition is not satisfied, a negative determination is made, and the rear stage imaging processing transitions to step ST30. In step ST44, in a case where the rear stage imaging processing finish condition is satisfied, a positive determination is made, and the rear stage imaging processing is finished.

As described above, the signal processing circuit 34, the first imaging element 38, and the second imaging element 52 are disposed in the imaging apparatus 14. The second imaging element 52 is connected to the first imaging element 38 through the communication line 54, and the first imaging element 38 is connected to the signal processing circuit 34 through the communication line 44. That is, the signal processing circuit 34, the first imaging element 38, and the second imaging element 52 are connected in series through the communication lines 44 and 54.

The second digital image data 80B obtained by imaging the subject by the second imaging element 52 is output to the first imaging element 38 through the communication line 54 by the communication I/F 120D2. The first digital image data 70B obtained by imaging the subject by the first imaging element 38 is combined with the second digital image data 80B. The combined image data 130 obtained by combining the first digital image data 70B and the second digital image data 80B is output to the signal processing circuit 34 through the communication line 44 by the communication I/F 110D2. Accordingly, the number of wires required for connecting the first imaging element 38 and the second imaging element 52 to the signal processing circuit 34 can be reduced, compared to a case of directly connecting the first imaging element 38 and the second imaging element 52 to the signal processing circuit 34.

In addition, in the imaging apparatus 14, the first digital image data 70B and the second digital image data 80B are combined by the combining portion 110C2, and the combined image data 130 obtained by combining is output to the signal processing circuit 34 through the communication line 44 by the communication I/F 110D2 of the first imaging element 38. Accordingly, it is not necessary to combine the first digital image data 70B and the second digital image data 80B in the signal processing circuit 34.

In addition, in the imaging apparatus 14, the exposure time period of the photoelectric conversion element 42 in the first imaging element 38 is longer than the exposure time period of the photoelectric conversion element 56 in the second imaging element 52. Accordingly, a dynamic range of the combined image data 130 obtained by combining the first digital image data 70B and the second digital image data 80B is larger than a dynamic range of single digital image data. That is, the combined image data 130 is image data of which brightness can be expressed in more detail than the single digital image data.

In addition, in the imaging apparatus 14, the signal processing circuit 34 is connected in series to the first imaging element 38 and the second imaging element 52 and is positioned in the rear stages of the first imaging element 38 and the second imaging element 52. Specifically, the second imaging element 52 is positioned in a front stage, the first imaging element 38 is positioned in a middle stage, and the signal processing circuit 34 is positioned in a rear stage. Accordingly, the signal processing circuit 34 can receive every image data obtained by imaging by each of the first imaging element 38 and the second imaging element 52.

In addition, in the imaging apparatus 14, the imaging element in which the photoelectric conversion element 42, the processing circuit 110, and the memory 112 are formed in one chip is employed as the first imaging element 38. Accordingly, portability of the first imaging element 38 is increased, compared to an imaging element in which the photoelectric conversion element 42, the processing circuit 110, and the memory 112 are not formed in one chip. In addition, a degree of design freedom can be increased, compared to a case of the imaging element in which the photoelectric conversion element 42, the processing circuit 110, and the memory 112 are not formed in one chip. Furthermore, it is possible to contribute to size reduction of the imaging apparatus 14, compared to a case of the imaging element in which the photoelectric conversion element 42, the processing circuit 110, and the memory 112 are not formed in one chip. The same effect as the first imaging element 38 is also obtained for the second imaging element 52.

In addition, as illustrated in FIG. 6, the laminated imaging element in which the photoelectric conversion element 42 is laminated with the memory 112 is employed as the first imaging element 38. Accordingly, a transfer speed of the image data from the photoelectric conversion element 42 to the memory 112 can be increased, compared to a case of not laminating the photoelectric conversion element 42 and the memory 112. Improving the transfer speed contributes to high-speed processing in the entire processing circuit 110. In addition, the degree of design freedom can be increased, compared to a case of not laminating the photoelectric conversion element 42 and the memory 112. Furthermore, it is possible to contribute to size reduction of the imaging apparatus 14, compared to a case of not laminating the photoelectric conversion element 42 and the memory 112. The same effect as the first imaging element 38 is also obtained for the second imaging element 52.

In addition, in the imaging apparatus 14, the live view image or the like based on the combined image data 130 is displayed on the display 26. Accordingly, the user can visually recognize the image indicated by the combined image data 130.

Furthermore, in the imaging apparatus 14, the combined image data 130 input into the signal processing circuit 34 is stored in the secondary storage device 102, the USB memory, and/or the memory card or the like by the CPU 15A. Accordingly, the combined image data 130 input into the signal processing circuit 34 can be appropriately managed.

Figure 14:
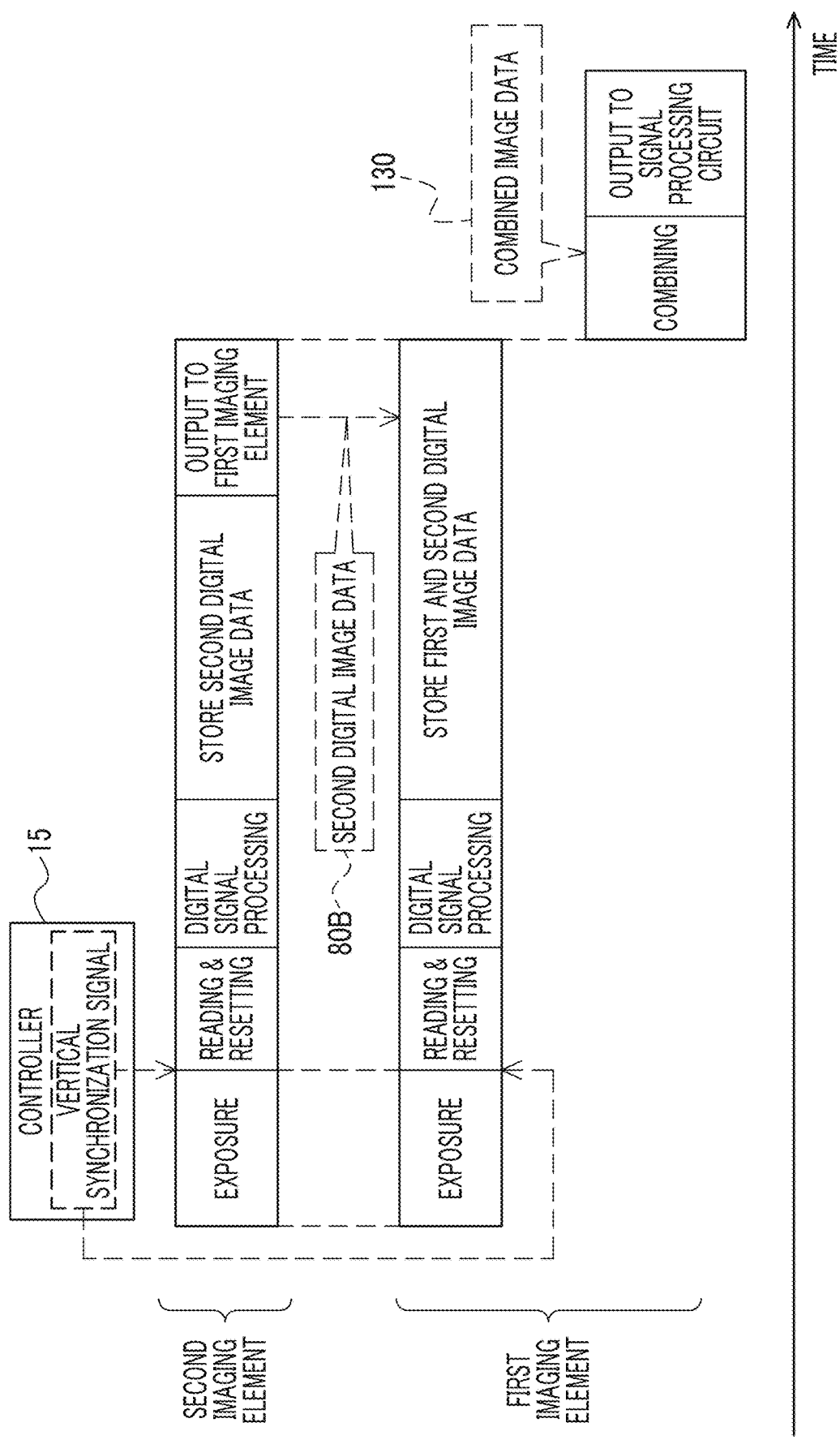
FIG. 14 is a time chart illustrating an example of processing contents in the first imaging element and the second imaging element in a case where an exposure period in the first imaging element and an exposure period in the second imaging element are aligned.

In the first embodiment, while a case where exposure start timings of the first imaging element 38 and the second imaging element 52 are aligned, and where the exposure time period of the first imaging element 38 is longer than the exposure time period of the second imaging element 52 is described, the technology of the present disclosure is not limited thereto. For example, the exposure period of the first imaging element 38 and the exposure period of the second imaging element 52 may be aligned. That is, the exposure start timings of the first imaging element 38 and the second imaging element 52 may be aligned, and the exposure time period of the first imaging element 38 and the exposure time period of the second imaging element 52 may be aligned as illustrated in FIG. 14. In this case, the input timing at which the vertical synchronization signal is input into the first imaging element 38, and the input timing at which the vertical synchronization signal is input into the second imaging element 52 may be aligned.

Figure 15:
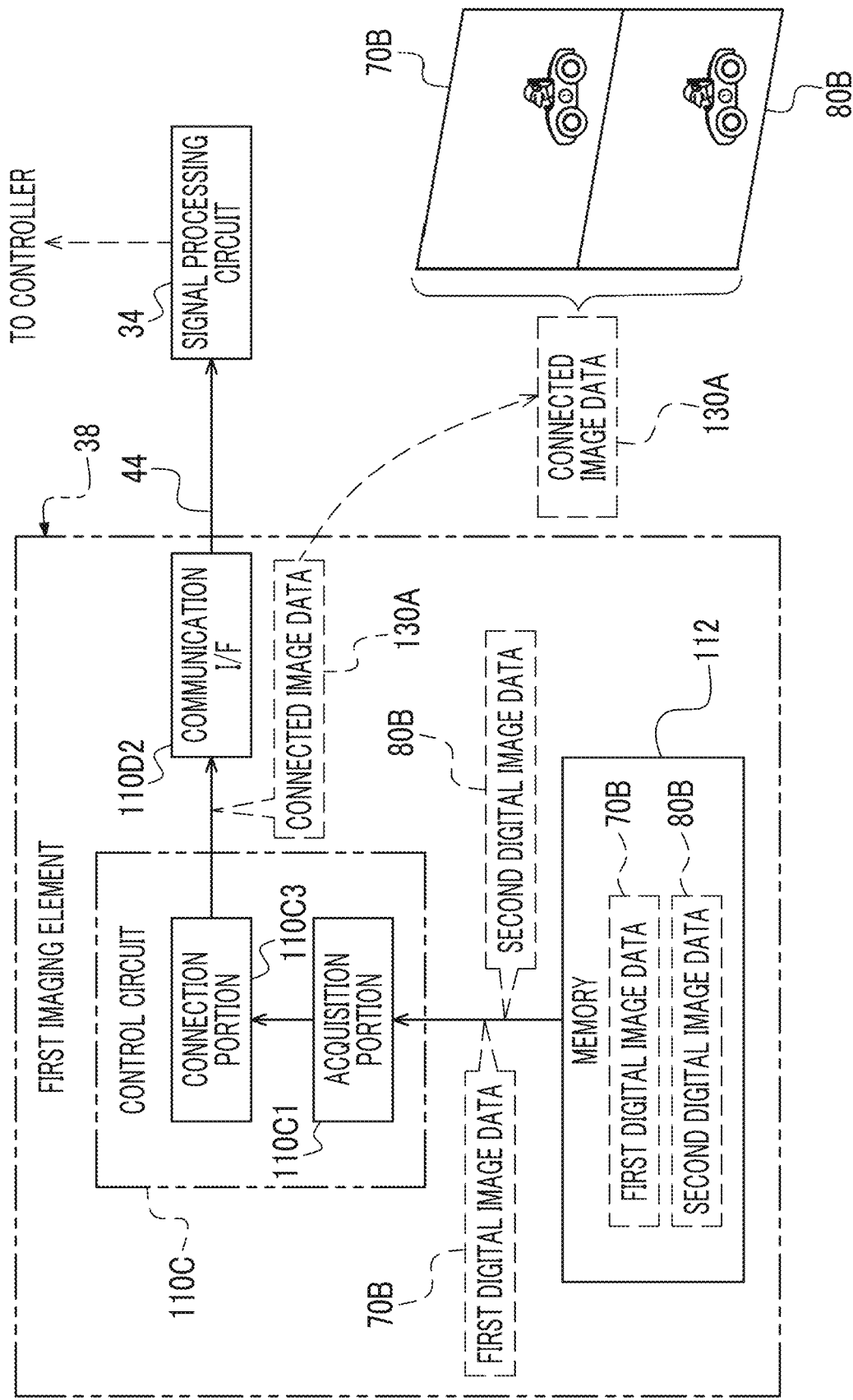
FIG. 15 is a conceptual diagram illustrating a modification example of the configuration of the first imaging element according to the first embodiment.

In addition, in the first embodiment, while a case where the first digital image data 70B and the second digital image data 80B are combined is described, the technology of the present disclosure is not limited thereto. For example, the first digital image data 70B and the second digital image data 80B may be connected. In this case, as illustrated in FIG. 15 as an example, the control circuit 110C includes a connection portion 110C3 instead of the combining portion 110C2. The connection portion 110C3 is an example of a "connection circuit" according to the embodiments of the technology of the present disclosure. The connection portion 110C3 connects the first digital image data 70B and the second digital image data 80B acquired by the acquisition portion 110C1 and generates connected image data 130A obtained by connection. The connected image data 130A generated in such a manner is output to the signal processing circuit 34 through the communication line 44 by the communication I/F 110D2.

In the example illustrated in FIG. 15, an example of a form of connecting the first digital image data 70B and the second digital image data 80B in the vertical direction is illustrated. However, the technology of the present disclosure is not limited thereto, and the first digital image data 70B and the second digital image data 80B may be connected in the horizontal direction. In such a manner, any direction of connection between the first digital image data 70B and the second digital image data 80B may be used. In addition, the first digital image data 70B and the second digital image data 80B may be connected by causing parts of the first digital image data 70B and the second digital image data 80B to overlap with each other. In this case, for example, pixel values of the arithmetic mean of the first digital image data 70B and the second digital image data 80B may be used for an overlapping region.

Figure 16:
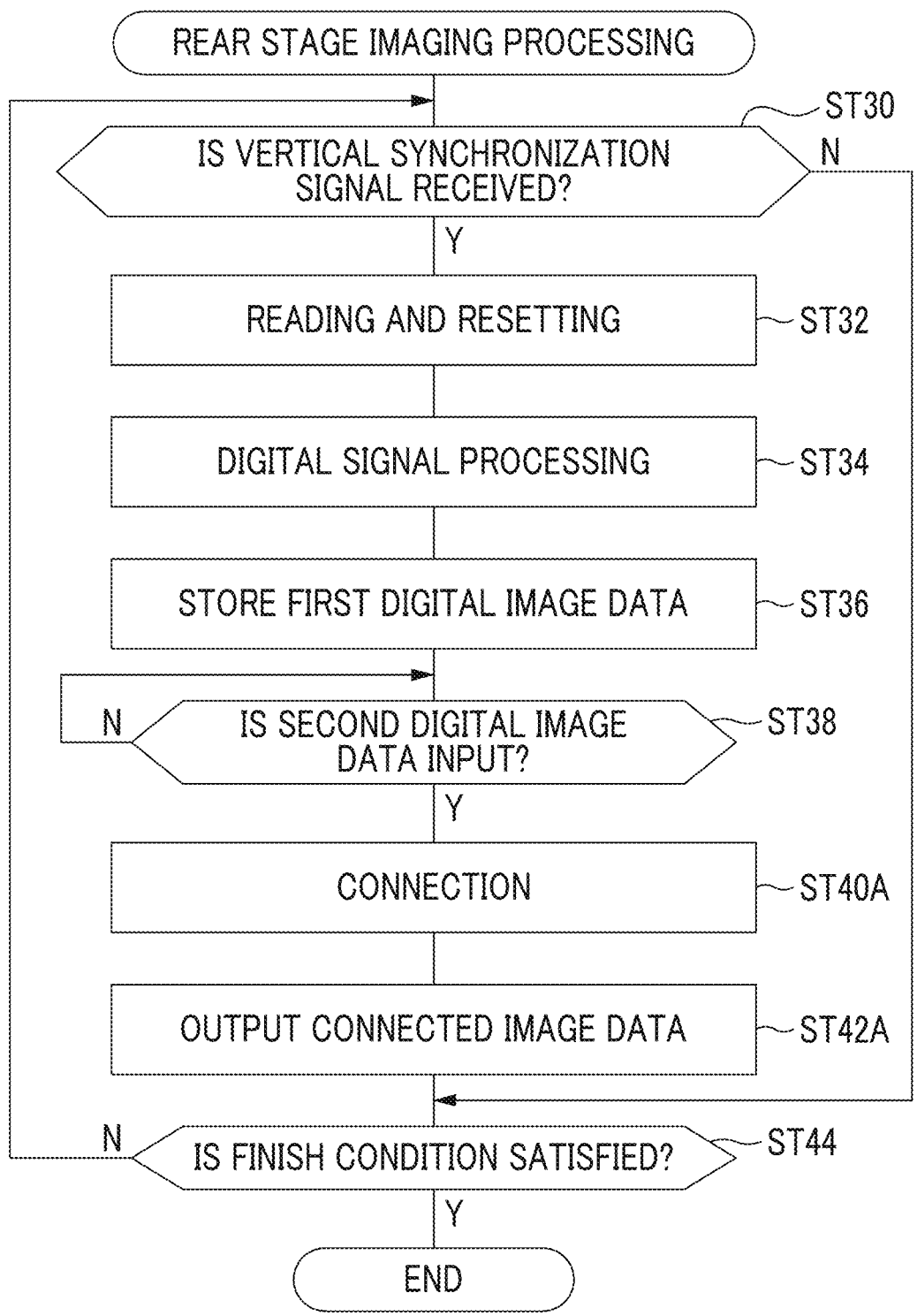
FIG. 16 is a flowchart illustrating a modification example of the flow of rear stage imaging processing according to the first embodiment.

FIG. 16 illustrates an example of a flow of rear stage imaging processing in a case of generating and outputting the connected image data 130A illustrated in FIG. 15. The rear stage imaging processing illustrated in FIG. 16 is different from the rear stage imaging processing illustrated in FIG. 13 in that step ST40A is included instead of step ST40, and that step ST42A is included instead of step ST42.

In the rear stage imaging processing illustrated in FIG. 16, step ST40A, the control circuit 110C generates the connected image data 130A by connecting the first digital image data 70B and the second digital image data 80B. Then, the rear stage imaging processing transitions to step ST42A. In step ST42A, the control circuit 110C outputs the connected image data 130A to the signal processing circuit 34. Then, the rear stage imaging processing transitions to step ST44.

In such a manner, by connecting the first digital image data 70B and the second digital image data 80B, it is not necessary to connect the first digital image data 70B and the second digital image data 80B in the signal processing circuit 34. In addition, an image based on the first digital image data 70B and an image based on the second digital image data 80B can be visually recognized together.

In addition, in the first embodiment, while an example of a form in which the second digital image data 80B acquired from the memory 122 by the control circuit 120C is output to the first imaging element 38 by the communication I/F 120D2 is illustratively described, the technology of the present disclosure is not limited thereto. For example, image data that is obtained by performing any image processing by the control circuit 120C on the second digital image data 80B acquired from the memory 122 by the control circuit 120C may be output to the first imaging element 38 by the communication I/F 120D2. Here, for example, well-known image processing such as thinning processing and addition processing is exemplified as the image processing.

The image data obtained by performing any image processing on the second digital image data 80B is an example of the "output image data" according to the embodiments of the technology of the present disclosure.

In addition, in the first embodiment, the communication I/F 15D1 and the communication I/F 110D1 are connected in accordance with the PCI-e connection standard. In addition, the communication I/F 15D2 and the communication I/F 120D1 are connected in accordance with the PCI-e connection standard. In addition, the communication I/F 34A and the communication I/F 110D2 are connected in accordance with the PCI-e connection standard. Furthermore, the communication I/F 110D3 and the communication I/F 120D2 are connected in accordance with the PCI-e connection standard. However, the technology of the present disclosure is not limited thereto. Instead of the PCI-e connection standard, other connection standards such as LVDS, SATA, SLVS-EC, or MIPI may be employed.

In addition, in the first embodiment, any of communication between the first imaging element 38 and the second imaging element 52, communication between the first imaging element 38 and the signal processing circuit 34, and communication between the controller 15 and the first imaging element 38 and between the controller 15 and the second imaging element 52 is wired communication. However, the technology of the present disclosure is not limited thereto. At least one of communication between the first imaging element 38 and the second imaging element 52, communication between the first imaging element 38 and the signal processing circuit 34, or communication between the controller 15 and the first imaging element 38 and between the controller 15 and the second imaging element 52 may be wireless communication.

In addition, while the imaging element in which the photoelectric conversion element 42, the processing circuit 110, and the memory 112 are formed in one chip is illustrated as the first imaging element 38 in the first embodiment, the technology of the present disclosure is not limited thereto. For example, at least the photoelectric conversion element 42 and the memory 112 among the photoelectric conversion element 42, the processing circuit 110, and the memory 112 may be formed in one chip. The same applies to the second imaging element 52.

Second Embodiment

In the first embodiment, the smart device 10 in which two imaging elements of the first imaging element 38 and the second imaging element 52 are mounted is illustrated. In a second embodiment, a smart device in which three imaging apparatuses are mounted will be described. In the second embodiment, the same constituents as the first embodiment will be designated by the same reference signs and will not be described. Hereinafter, parts different from the first embodiment will be described.

Figure 17:
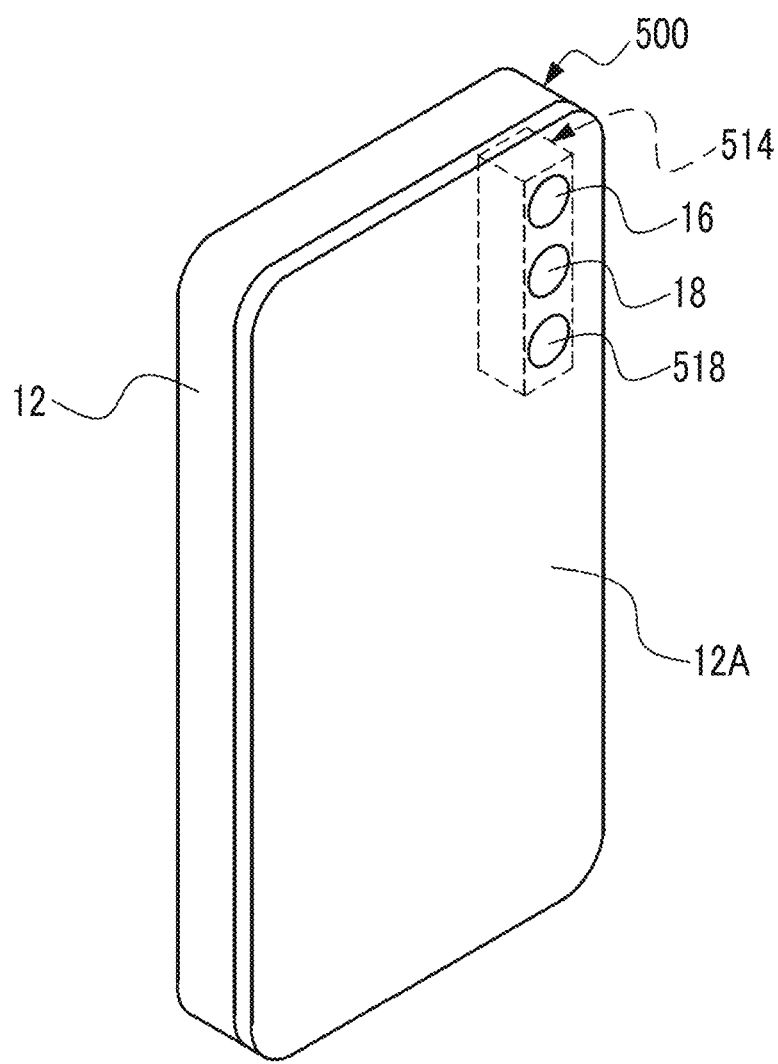
FIG. 17 is a rear perspective view illustrating an example of an exterior on a rear surface side of a smart device according to a second embodiment.

As illustrated in FIG. 17 as an example, a smart device 500 is different from the smart device 10 described in the first embodiment in that an imaging apparatus 514 is included instead of the imaging apparatus 14. The imaging apparatus 514 is different from the imaging apparatus 14 described in the first embodiment in that a third imaging lens 518 is included. In the upper right portion of the rear surface 12A of the casing 12 in a state where the smart device 500 is vertically placed, the first imaging lens 16, the second imaging lens 18, and the third imaging lens 518 are arranged at a predetermined interval (for example, an interval of a few millimeters) in the vertical direction and exposed from the rear surface 12A.

Figure 18:
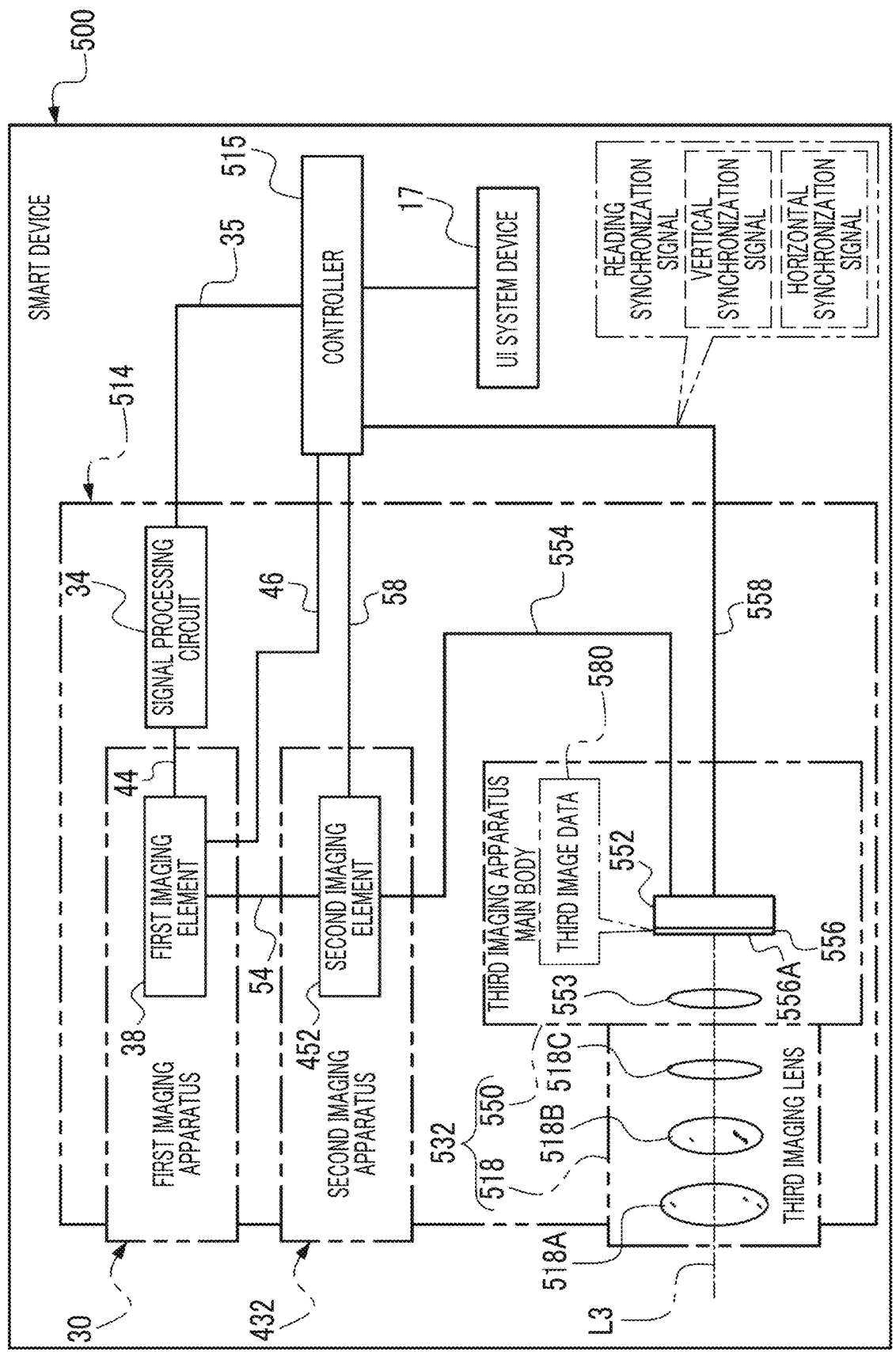
FIG. 18 is a block diagram illustrating an example of a configuration of the smart device according to the second embodiment.

As illustrated in FIG. 18 as an example, the smart device 500 is different from the smart device 10 described in the first embodiment in that a controller 515 is included instead of the controller 15. In addition, the imaging apparatus 514 is different from the imaging apparatus 14 described in the first embodiment in that a third imaging apparatus 532 is included. In addition, the imaging apparatus 514 is different from the imaging apparatus 14 described in the first embodiment in that a second imaging apparatus 432 is included instead of the second imaging apparatus 32.

The third imaging apparatus 532 is an imaging apparatus that is positioned on a front stage of the second imaging apparatus 432. The third imaging apparatus 532 comprises the third imaging lens 518 and a third imaging apparatus main body 550. The third imaging lens 518 comprises an objective lens 518A, a focus lens 518B, and a stop 518C. The objective lens 518A, the focus lens 518B, and the stop 518C are arranged in an order of the objective lens 518A, the focus lens 518B, and the stop 518C along an optical axis L3 from the subject side to a third imaging apparatus main body 550 side. The objective lens 518A, the focus lens 518B, and the stop 518C have the same functions as the objective lens 18A, the focus lens 18B, and the stop 18C described in the first embodiment on the optical axis L3. The focus lens 518B and the stop 518C operate in the same manner as the focus lens 18B and the stop 18C on the optical axis L3.

The third imaging apparatus main body 550 comprises a mechanical shutter 553 and a third imaging element 552. The mechanical shutter 553 has the same function as the mechanical shutter 40 and operates in the same manner as the mechanical shutter 40. The third imaging element 552 has the same laminated structure as the first imaging element 38 and the second imaging element 52 described in the first embodiment (refer to FIG. 6). Thus, the laminated structure of the third imaging element 552 will not be described here.

The first imaging element 38, the second imaging element 452, and the third imaging element 552 are an example of the "plurality of imaging elements" according to the embodiments of the technology of the present disclosure. In addition, the third imaging element 552 is an example of the imaging element included in the "plurality of imaging elements" according to the embodiments of the technology of the present disclosure. In addition, the second imaging element 452 and the third imaging element 552 are an example of the "adjacent imaging elements" of the embodiments of the technology of the present disclosure. In addition, in a positional relationship between the second imaging element 452 and the third imaging element 552, the second imaging element 452 is an example of the "imaging element in the rear stage" and the "rear stage imaging element" according to the embodiments of the technology of the present disclosure, and the third imaging element 552 is an example of an "imaging element in a front stage" and the "front stage imaging element" according to the embodiments of the technology of the present disclosure.

The third imaging element 552 comprises a photoelectric conversion element 556 having a light receiving surface 556A. The subject light showing the subject is transmitted through the third imaging lens 518, and the image of the subject light is formed on the light receiving surface 556A of the third imaging element 552 through the mechanical shutter 553. The photoelectric conversion element 556 generates third image data 580 indicating the image of the subject by photoelectrically converting the subject light of which the image is formed on the light receiving surface 556A.

The third imaging element 552 is connected to the second imaging element 452 through a communication line 554. In addition, the third imaging element 552 is connected to the controller 515 through a communication line 558. The communication line 554 is an example of the "transfer path" according to the embodiments of the technology of the present disclosure.

The third imaging element 552 is controlled by the controller 515 through the communication line 558. The third imaging element 552 images the subject under control of the controller 515. In addition, the third imaging element 552 outputs the third image data 580 obtained by imaging the subject to the second imaging element 452 through the communication line 554.

In such a manner, the second imaging element 452 is positioned on a rear stage of the third imaging element 552, the first imaging element 38 is positioned on a rear stage of the second imaging element 452, and the signal processing circuit 34 is positioned on the rear stage of the first imaging element 38. The third imaging element 552 is connected to the second imaging element 452 through the communication line 554. The second imaging element 452 is connected to the first imaging element 38 through the communication line 54. The first imaging element 38 is connected to the signal processing circuit 34 through the communication line 44. That is, the first imaging element 38, the second imaging element 452, the third imaging element 552, and the signal processing circuit 34 are connected in series through the communication lines 44, 54, and 554.

The second imaging element 452 is positioned on a side farther from the signal processing circuit 34 than the first imaging element 38, and the third imaging element 552 is positioned on a side farther from the signal processing circuit 34 than the second imaging element 452. In other words, the second imaging element 452 is positioned on a side closer to the signal processing circuit 34 than the third imaging element 552, and the first imaging element 38 is positioned on a side closer to the signal processing circuit 34 than the second imaging element 452.

The reading synchronization signal is input into the third imaging element 552 from the controller 515 through the communication line 558. The vertical synchronization signal is a synchronization signal for defining a start timing of reading of the third image data 580 for each frame from the photoelectric conversion element 556. The horizontal synchronization signal is a synchronization signal for defining a start timing of reading of the third image data 580 for each horizontal line from the photoelectric conversion element 556. In the third imaging element 552, the third image data 580 is read out from the photoelectric conversion element 556 in accordance with a frame rate that is decided depending on the vertical synchronization signal input from the controller 515 through the communication line 558.

Figure 19:
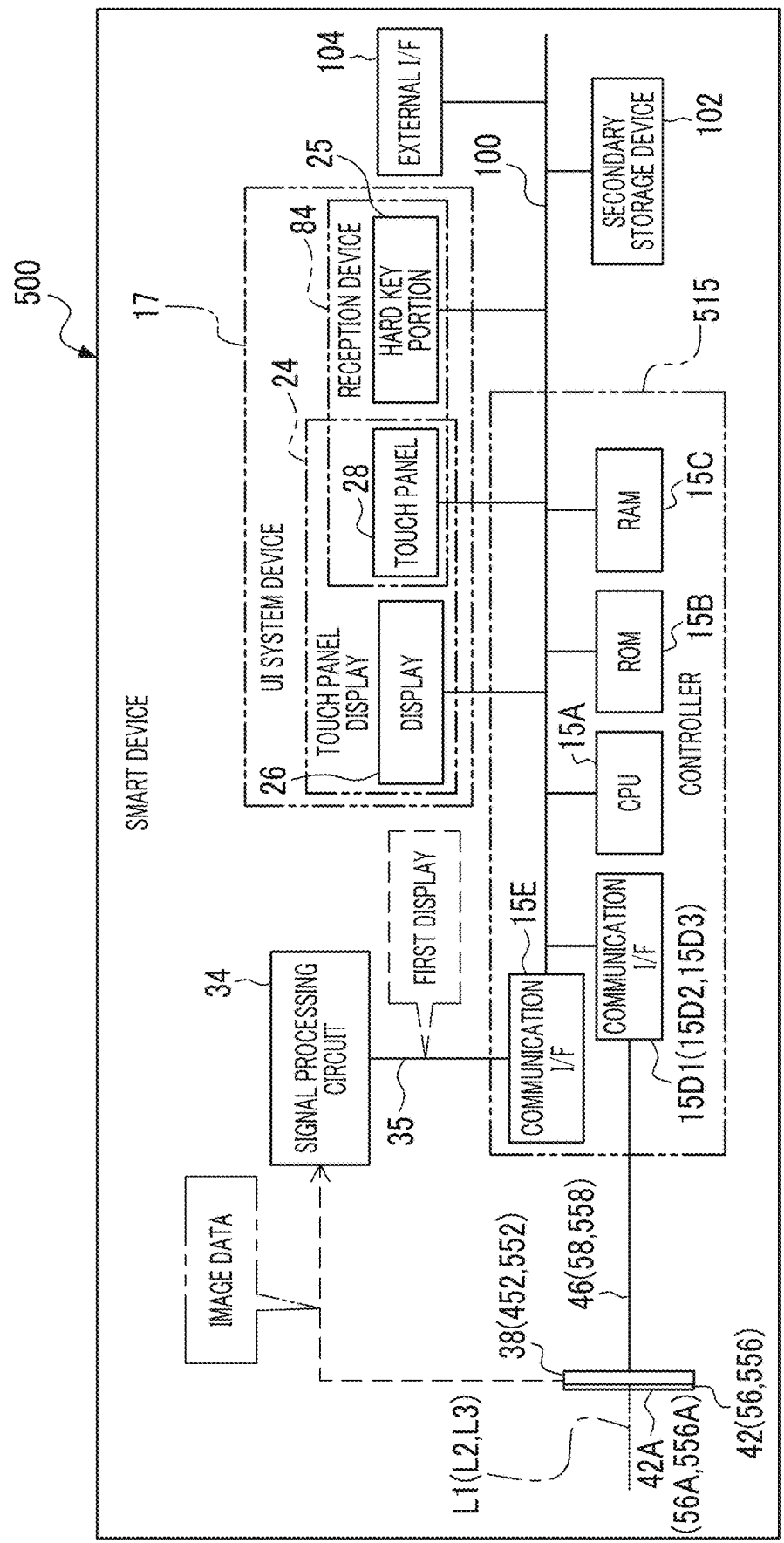
FIG. 19 is a block diagram illustrating an example of a configuration of a controller, a UI system device, and a peripheral electric system included in the smart device according to the second embodiment.

As illustrated in FIG. 19 as an example, the controller 515 is different from the controller 15 described in the first embodiment in that a communication I/F 15D3 is included. The communication I/F 15D3 is connected to the busline 100.

The communication I/F 15D3 is a communication device including an FPGA. Here, the communication device including the FPGA is employed as the communication I/F 15D3 but is merely an example. The communication I/F 15D3 may be a device including an ASIC, an FPGA, and/or a PLD. In addition, the communication I/F 15D3 may be a computer including a CPU, a ROM, and a RAM. The number of CPUs may be singular or plural. In addition, the communication I/F 15D3 may be implemented by a combination of a hardware configuration and a software configuration.

The communication I/F 15D3 is connected to the third imaging element 552 through the communication line 558. The CPU 15A controls the third imaging element 552 through the communication I/F 15D3. For example, the CPU 15A controls a reading timing of the third image data 580 from the photoelectric conversion element 556 by supplying the reading synchronization signal to the third imaging element 552 through the communication I/F 15D3.

Figure 20:
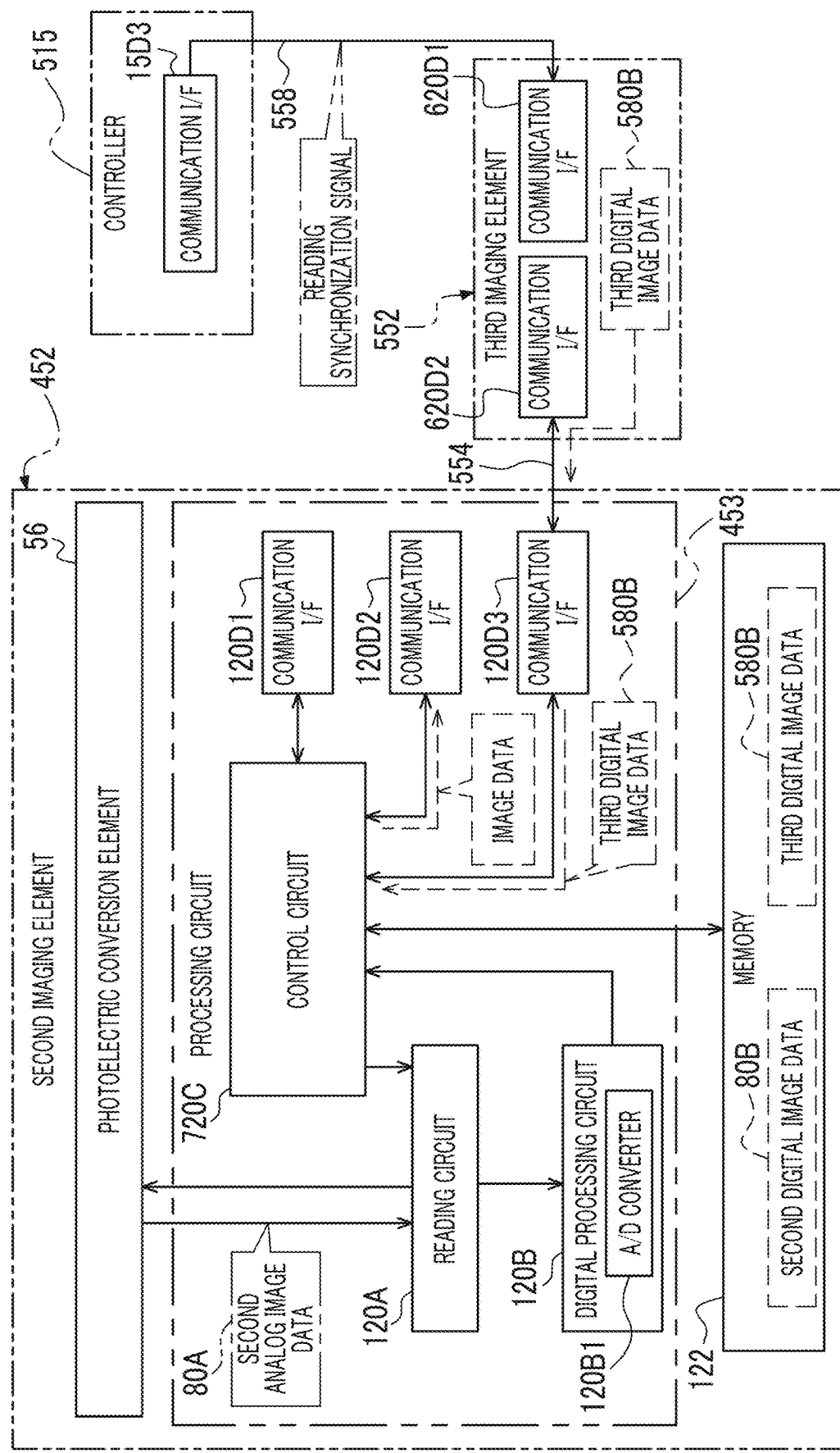
FIG. 20 is a block diagram illustrating an example of a configuration of a second imaging element and a periphery according to the second embodiment.

As illustrated in FIG. 20 as an example, the second imaging element 452 is different from the second imaging element 52 described in the first embodiment in that a processing circuit 453 is included instead of the processing circuit 120. The processing circuit 453 is different from the processing circuit 120 in that a communication I/F 120D3 is included, and that a control circuit 720C is included instead of the control circuit 120C. The communication I/F 120D3 is connected to the control circuit 720C.

The communication I/F 120D3 is a communication device including an FPGA. Here, the communication device including the FPGA is employed as the communication I/F 120D3 but is merely an example. The communication I/F 120D3 may be a device including an ASIC, an FPGA, and/or a PLD. In addition, the communication I/F 120D3 may be a computer including a CPU, a ROM, and a RAM. The number of CPUs may be singular or plural. In addition, the communication I/F 120D3 may be implemented by a combination of a hardware configuration and a software configuration.

Meanwhile, the third imaging element 552 comprises communication I/Fs 620D1 and 620D2. The communication I/F 620D2 is an example of the "output portion (communication interface)" according to the embodiments of the technology of the present disclosure. The communication I/F 620D1 is a communication device including an FPGA and is connected to the communication I/F 15D3 of the controller 515 through the communication line 558. The third imaging element 552 communicates with the controller 15 through the communication I/Fs 15D3 and 620D1. For example, the third imaging element 552 receives, by the communication I/F 620D1, the reading synchronization signal which is output from the communication I/F 15D3 of the controller 15 through the communication line 558.

The communication I/F 620D2 is a communication device including an FPGA and is connected to the communication I/F 120D3 of the second imaging element 452 in accordance with the PCI-e connection standard through the communication line 554. The communication I/F 620D2 controls communication between the third imaging element 552 and the control circuit 720C. Here, the communication device including the FPGA is employed as the communication I/F 620D2 but is merely an example. The communication I/F 620D2 may be a device including an ASIC, an FPGA, and/or a PLD. In addition, the communication I/F 620D2 may be a computer including a CPU, a ROM, and a RAM. The number of CPUs may be singular or plural. In addition, the communication I/F 620D2 may be implemented by a combination of a hardware configuration and a software configuration.

As will be described in detail later, even in the third imaging element 552, third digital image data 580B that indicates the image of the subject is generated using the same method as the first imaging element 38 described in the first embodiment. The third digital image data 580B generated by the third imaging element 552 is output to the communication I/F 120D3 of the processing circuit 453 through the communication line 554 by the communication I/F 620D2. The third digital image data 580B output by the communication I/F 120D3 is received by the communication I/F 120D3 and transferred to the control circuit 720C.

In the second embodiment, the first digital image data 70B, the second digital image data 80B, and the third digital image data 580B will be referred to as the "digital image data" without a reference sign unless otherwise necessary to distinguish therebetween. The "third digital image data 580B" here is an example of the "output image data" according to the embodiments of the technology of the present disclosure.

The control circuit 720C stores the second digital image data 80B input from the digital processing circuit 120B in the memory 122. In addition, the control circuit 720C stores the third digital image data 580B input from the communication I/F 120D3 in the memory 122.

The control circuit 720C can randomly access the memory 122 and acquires the digital image data from the memory 122. The control circuit 720C outputs image data obtained by performing the image processing on the digital image data acquired from the memory 122 to the communication I/F 120D2.

The communication I/F 120D2 outputs the image data input from the control circuit 720C to the communication I/F 110D2 (refer to FIG. 7 and FIG. 8) of the first imaging element 38 through the communication line 44.

Figure 21:
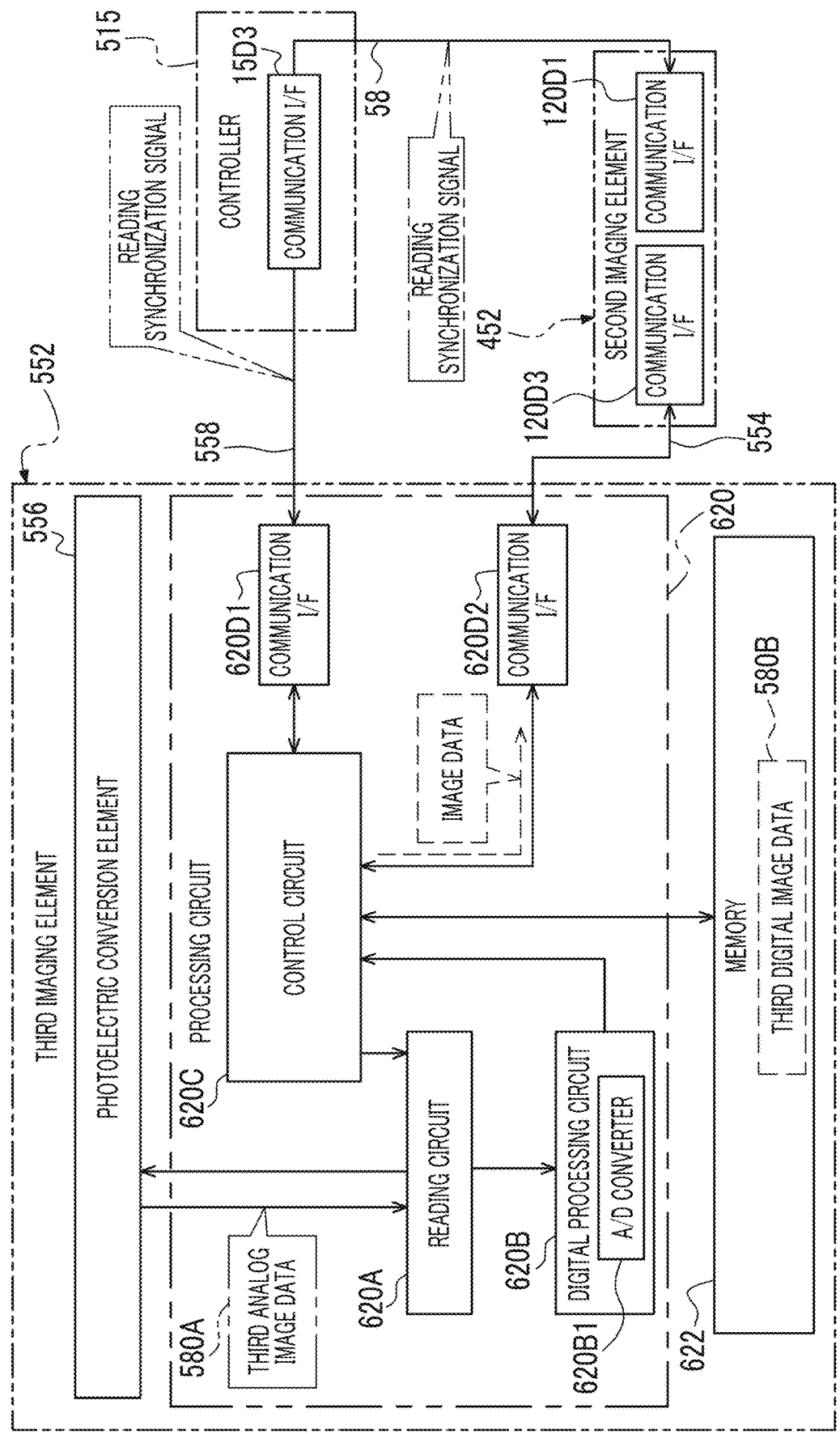
FIG. 21 is a block diagram illustrating an example of a configuration of a third imaging element and a periphery according to the second embodiment.

As illustrated in FIG. 21 as an example, the third imaging element 552 incorporates the photoelectric conversion element 556, a processing circuit 620, and a memory 622. The processing circuit 620 comprises a reading circuit 620A, a digital processing circuit 620B, a control circuit 620C, and communication I/Fs 620D1 and 620D2.

The reading circuit 620A is connected to each of the photoelectric conversion element 556, the digital processing circuit 620B, and the control circuit 620C. The digital processing circuit 620B is connected to the control circuit 620C. The control circuit 620C is connected to each of the memory 622 and the communication I/Fs 620D1 and 620D2.

The third image data 580 is broadly divided into third analog image data 580A and the third digital image data 580B. Hereinafter, for convenience of description, the third analog image data 580A and the third digital image data 580B will be referred to as the "third image data 580" unless otherwise necessary to distinguish therebetween.

The communication I/F 620D1 receives the reading synchronization signal which is output from the communication I/F 15D3 of the controller 15 through the communication line 558, and outputs the received reading synchronization signal to the control circuit 620C.

The reading circuit 620A controls the photoelectric conversion element 556 and reads out the third analog image data 580A from the photoelectric conversion element 556 under control of the control circuit 620C. Reading of the third analog image data 580A from the photoelectric conversion element 556 is performed in accordance with the reading synchronization signal which is input into the processing circuit 620 from the controller 15.

Specifically, first, the communication I/F 620D1 receives the reading synchronization signal from the controller 15 and outputs the received reading synchronization signal to the control circuit 620C. Next, the control circuit 620C transfers the reading synchronization signal input from the communication I/F 620D1 to the reading circuit 620A. That is, the vertical synchronization signal and the horizontal synchronization signal are transferred to the reading circuit 620A. The reading circuit 620A starts reading out the third analog image data 580A in units of frames from the photoelectric conversion element 556 in accordance with the vertical synchronization signal transferred from the control circuit 620C. In addition, the reading circuit 620A starts reading out the third analog image data 580A in units of horizontal lines in accordance with the horizontal synchronization signal transferred from the control circuit 620C.

The reading circuit 620A performs the analog signal processing on the third analog image data 580A read out from the photoelectric conversion element 556. The third analog image data 580A on which the analog signal processing is performed in such a manner is output to the digital processing circuit 620B by the reading circuit 620A.

The digital processing circuit 620B comprises an A/D converter 620B1. The A/D converter 620B1 performs the A/D conversion on the third analog image data 580A.

The digital processing circuit 620B performs the digital signal processing on the third analog image data 580A input from the reading circuit 620A. The digital signal processing for the third analog image data 580A is different from the digital signal processing for the second analog image data 80A in that the A/D conversion by the A/D converter 620B1 is included instead of the A/D conversion by the A/D converter 120B1.

The A/D converter 620B1 performs the A/D conversion on the third analog image data 580A on which signal processing of the correlative double sampling processing is performed. Accordingly, the third analog image data 580A is digitized, and the third digital image data 580B is obtained as the RAW data. The third digital image data 580B obtained by performing the digital signal processing is output to the control circuit 620C by the digital processing circuit 620B.

The memory 622 is a memory that can store the third digital image data 580B of a plurality of frames. The memory 622 has a storage region (not illustrated) in units of pixels. The third digital image data 580B is stored in a corresponding storage region of the memory 622 in units of pixels by the control circuit 620C. The control circuit 620C stores the third digital image data 580B input from the digital processing circuit 620B in the memory 622.

The control circuit 620C can randomly access the memory 622 and acquires the third digital image data 580B from the memory 622. The control circuit 620C outputs the third digital image data 580B acquired from the memory 622 to the communication I/F 620D2. The communication I/F 620D2 outputs the third digital image data 580B input from the control circuit 620C to the communication I/F 120D3 of the second imaging element 452 through the communication line 554.

Here, an example of a transfer path and a processing method of the image data will be described with reference to FIG. 22 to FIG. 24.

Figure 22:
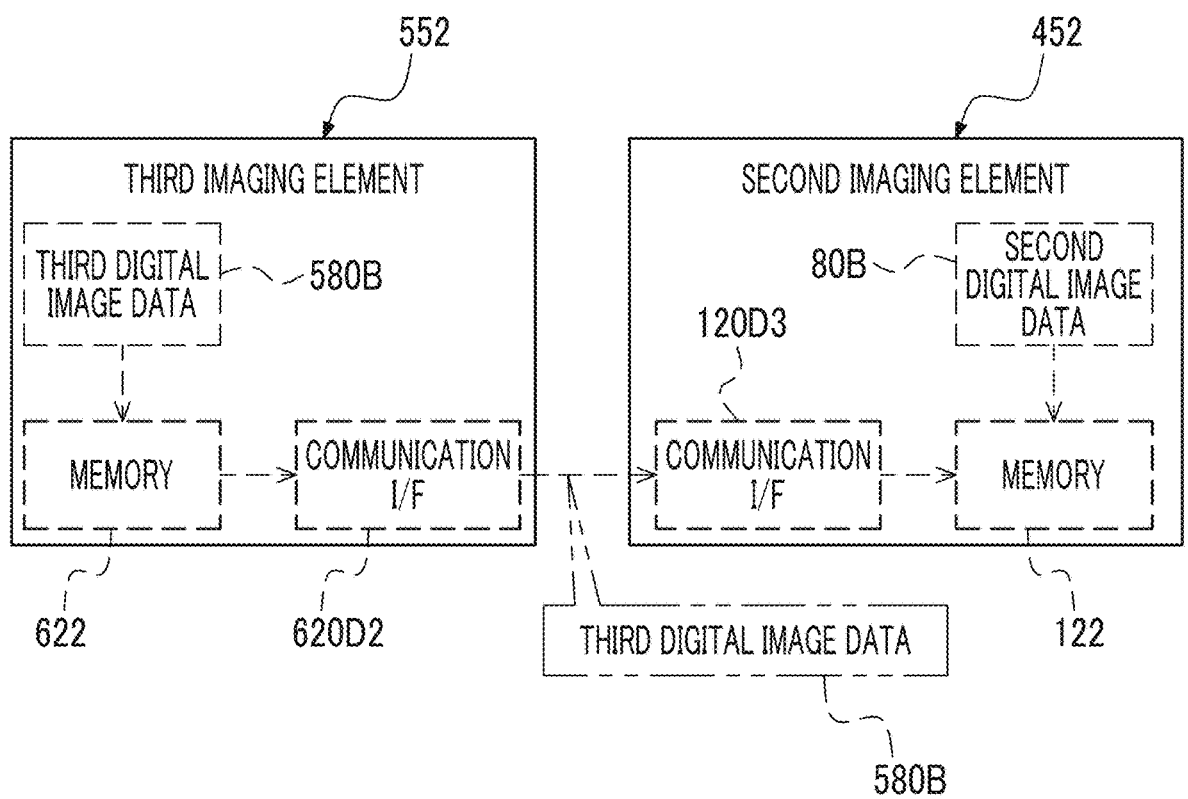
FIG. 22 is a conceptual diagram illustrating an example of a flow of image data between the second imaging element and the third imaging element included in an imaging apparatus according to the second embodiment.

As illustrated in FIG. 22 as an example, the third digital image data 580B obtained by imaging the subject by the third imaging element 552 is stored in the memory 622 and then, is output to the second imaging element 452 through the communication line 554 (refer to FIG. 20 and FIG. 21). That is, the second imaging element 452 and the third imaging element 552 are adjacent imaging elements, and the third digital image data 580B is output by the communication I/F 620D2 of the third imaging element 552 that is an imaging element in a front stage out of the adjacent imaging elements. The third digital image data 580B output by the communication I/F 620D2 is received by the communication I/F 120D3 of the second imaging element 452 that is an imaging element in a rear stage out of the adjacent imaging elements, and the received third digital image data 580B is stored in the memory 122. In addition, the second digital image data 80B obtained by imaging by the second imaging element 452 is stored in the memory 122.

In a relationship between the second digital image data 80B and the third digital image data 580B, the second digital image data 80B is an example of the "rear stage image data" according to the embodiments of the technology of the present disclosure. In addition, in the relationship between the second digital image data 80B and the third digital image data 580B, the third digital image data 580B is an example of the "front stage image data" according to the embodiments of the technology of the present disclosure.

Figure 23:
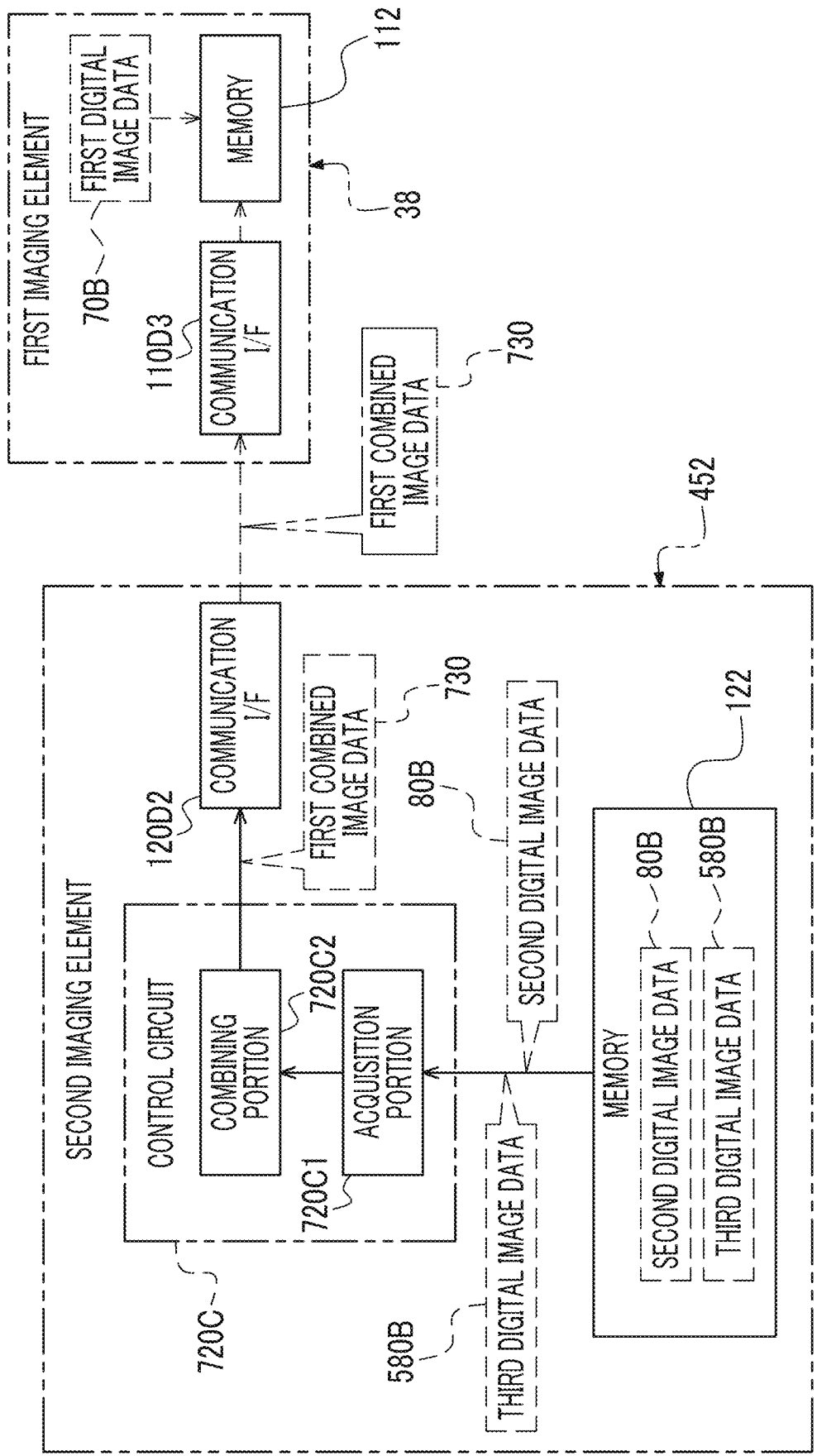
FIG. 23 is a conceptual diagram illustrating an example of a flow of image data between a first imaging element and the second imaging element included in the imaging apparatus according to the second embodiment.

As illustrated in FIG. 23 as an example, in the second imaging element 452, the control circuit 720C includes an acquisition portion 720C1 and a combining portion 720C2. The acquisition portion 720C1 acquires the second digital image data 80B and the third digital image data 580B from the memory 122. Here, while an example of a form of temporarily storing the third digital image data 580B in the memory 122 and then, acquiring the third digital image data 580B from the memory 122 by the acquisition portion 720C1 is illustratively described, the technology of the present disclosure is not limited thereto. The third digital image data 580B may be acquired by the acquisition portion 720C1 without being stored in the memory 122.

The combining portion 720C2 combines the second digital image data 80B and the third digital image data 580B acquired by the acquisition portion 720C1. Specifically, the combining portion 720C2 combines the second digital image data 80B and the third digital image data 580B by calculating an arithmetic mean of the second digital image data 80B and the third digital image data 580B in units of pixels.

Here, while the arithmetic mean is illustratively described as a combining method, the combining method is not limited thereto. For example, alpha blending using the second digital image data 80B and the third digital image data 580B may be performed. In addition, the second digital image data 80B and the third digital image data 580B may be simply added in units of pixels. In such a manner, the technology of the present disclosure is established even in a case where any method of combining the second digital image data 80B and the third digital image data 580B is used.

The combining portion 720C2 outputs first combined image data 730 obtained by combining the second digital image data 80B and the third digital image data 580B to the communication I/F 120D2. The communication I/F 120D2 outputs the first combined image data 730 input from the combining portion 720C2 to the communication I/F 110D3 of the first imaging element 38 through the communication line 54 (refer to FIG. 7). The first combined image data 730 is an example of the "output image data" according to the embodiments of the technology of the present disclosure.

The first combined image data 730 is received by the communication I/F 110D3 of the first imaging element 38. The first combined image data 730 received by the communication I/F 110D3 is stored in the memory 112 of the first imaging element 38.

That is, the first imaging element 38 and the second imaging element 452 are adjacent imaging elements, and the first combined image data 730 is output by the communication I/F 120D2 of the second imaging element 452 that is an imaging element in a front stage out of the adjacent imaging elements. The first combined image data 730 output by the communication I/F 120D2 is received by the communication I/F 110D3 of the first imaging element 38 that is an imaging element in a rear stage out of the adjacent imaging elements, and the received first combined image data 730 is stored in the memory 122. In addition, the first digital image data 70B obtained by imaging by the first imaging element 38 is stored in the memory 112.

In a relationship between the first digital image data 70B and the first combined image data 730, the first digital image data 70B is an example of the "rear stage image data" according to the embodiments of the technology of the present disclosure. In addition, in the relationship between the first digital image data 70B and the first combined image data 730, the first combined image data 730 is an example of the "front stage image data" according to the embodiments of the technology of the present disclosure.

Figure 24:
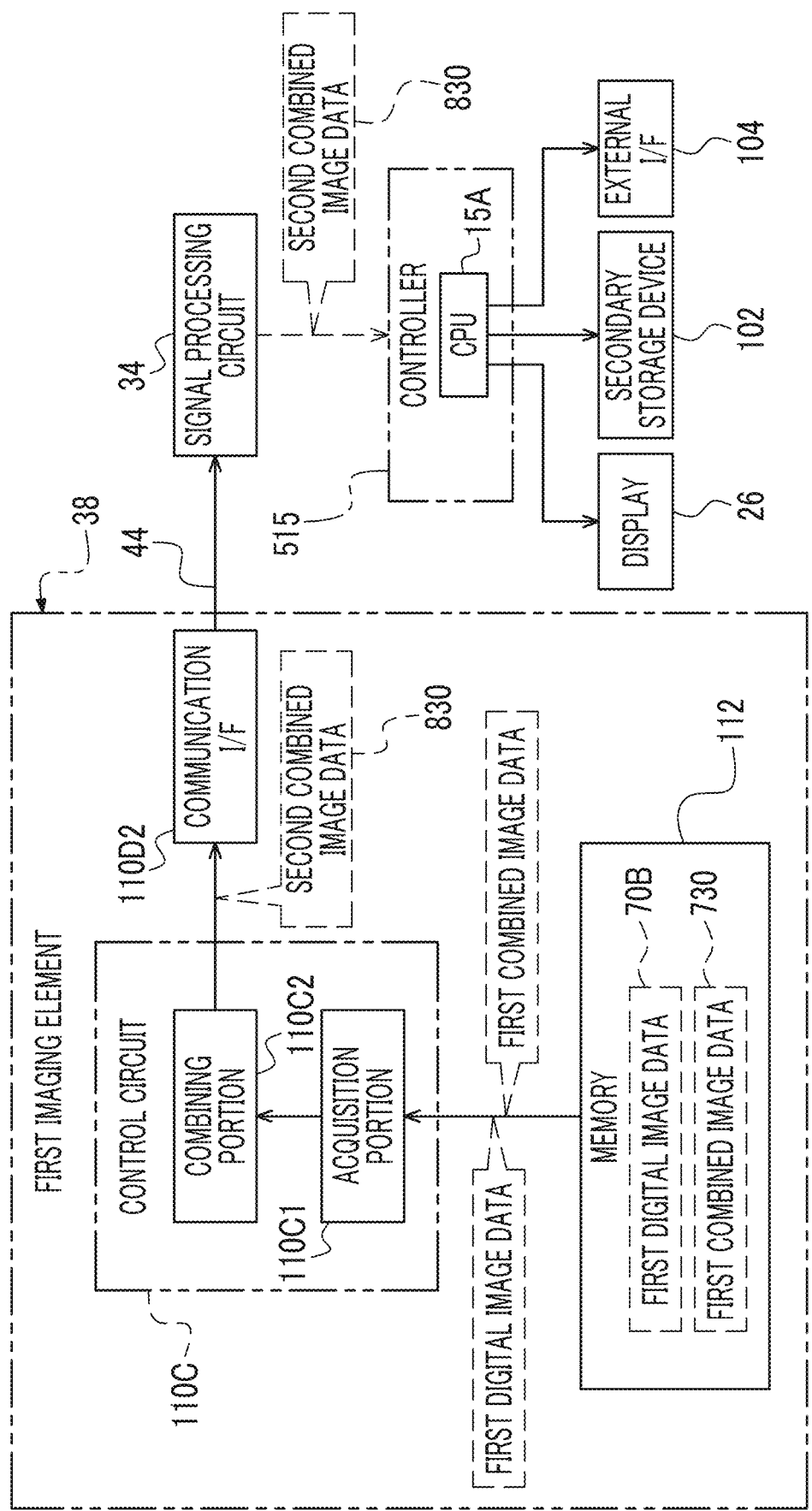
FIG. 24 is a conceptual diagram illustrating an example of a flow of image data among the first imaging element, a signal processing circuit, and the controller included in the imaging apparatus according to the second embodiment.

As illustrated in FIG. 24 as an example, in the first imaging element 38, the acquisition portion 110C1 acquires the first digital image data 70B and the first combined image data 730 from the memory 112. Here, while an example of a form of temporarily storing the first combined image data 730 in the memory 112 and then, acquiring the first combined image data 730 from the memory 112 by the acquisition portion 110C1 is illustratively described, the technology of the present disclosure is not limited thereto. The first combined image data 730 may be acquired by the acquisition portion 110C1 without being stored in the memory 112.

The combining portion 110C2 combines the first digital image data 70B and the first combined image data 730 acquired by the acquisition portion 110C1. Specifically, the combining portion 110C2 combines the first digital image data 70B and the first combined image data 730 by calculating an arithmetic mean of the first digital image data 70B and the first combined image data 730 in units of pixels.

Here, while the arithmetic mean is illustratively described as a combining method, the combining method is not limited thereto. For example, alpha blending using the first digital image data 70B and the first combined image data 730 may be performed. In addition, the first digital image data 70B and the first combined image data 730 may be simply added in units of pixels. In such a manner, the technology of the present disclosure is established even in a case where any method of combining the first digital image data 70B and the first combined image data 730 is used.

The combining portion 110C2 outputs second combined image data 830 obtained by combining the first digital image data 70B and the first combined image data 730 to the communication I/F 110D2. The communication I/F 110D2 outputs the second combined image data 830 input from the combining portion 110C2 to the signal processing circuit 34 through the communication line 44. The second combined image data 830 is an example of the "output image data" according to the embodiments of the technology of the present disclosure.

In the signal processing circuit 34, the various types of signal processing described in the first embodiment are performed on the second combined image data 830, and the second combined image data 830 on which the various types of signal processing are performed is output to the controller 15. In the controller 15, in a case where the second combined image data 830 is input, the second combined image data 830 is stored in the secondary storage device 102 by the CPU 15A or stored in the external apparatus (not illustrated) through the external I/F 104. In addition, in the controller 15, in a case where the second combined image data 830 is input, an image based on the second combined image data 830 is displayed on the display 26 as the still picture image or the live view image by the CPU 15A.

Figure 25:
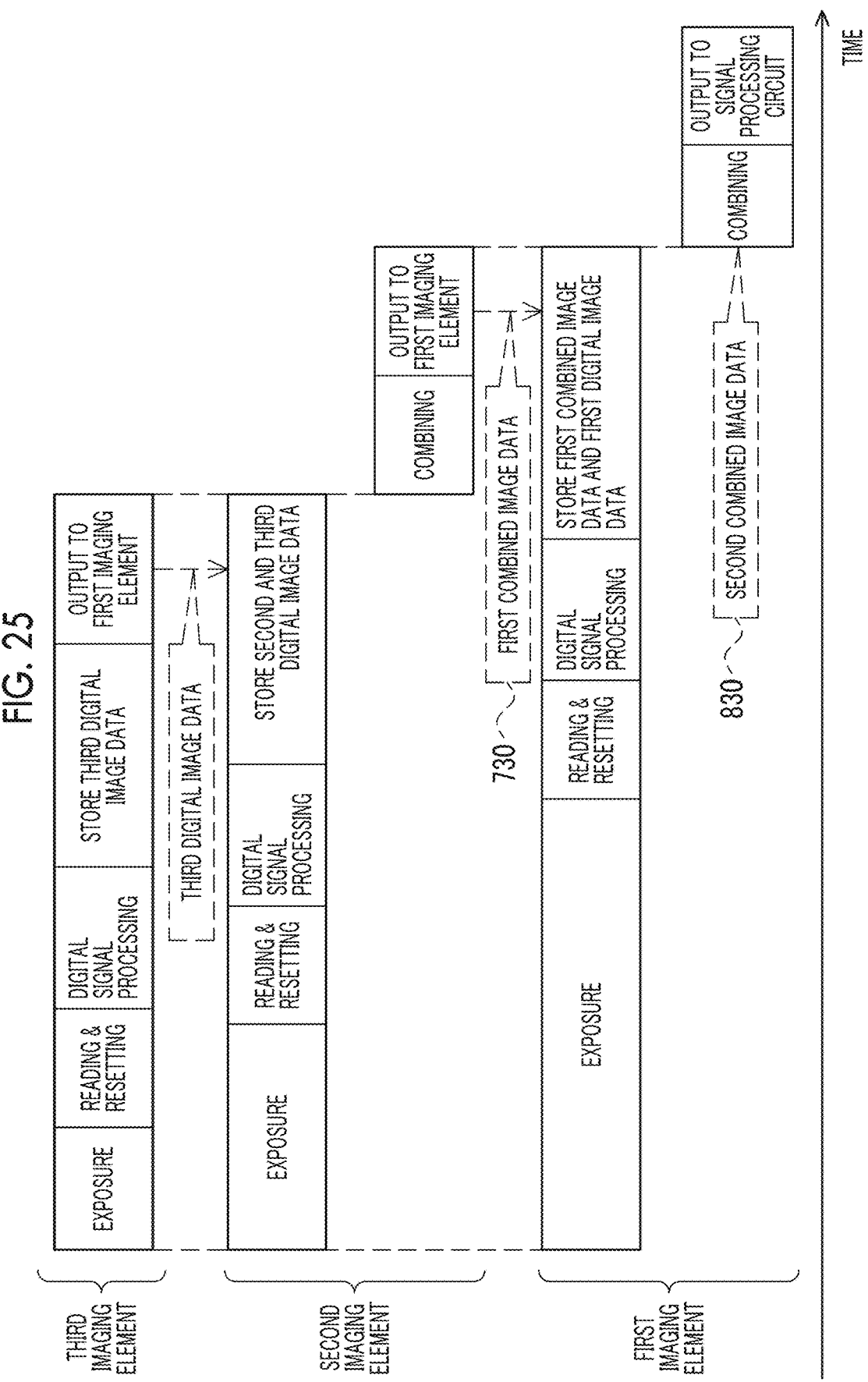
FIG. 25 is a time chart illustrating an example of a processing content in each of the first imaging element, the second imaging element, and the third imaging element included in the imaging apparatus according to the second embodiment.

As illustrated in FIG. 25 as an example, in the third imaging element 552, the third analog image data 580A is generated by exposing the photoelectric conversion element 556. In a case where the vertical synchronization signal is input, reading of the third analog image data 580A from the photoelectric conversion element 556 and resetting of the photoelectric conversion element 556 are performed. Resetting of the photoelectric conversion element 556 refers to an operation of deleting residual electric charges of each pixel in the photoelectric conversion element 556. Exposure performed by the photoelectric conversion element 556 is performed after previous resetting of the photoelectric conversion element 556 by the reading circuit 620A and before reading.

The third digital image data 580B is generated by performing the digital signal processing on the third analog image data 580A, and the generated third digital image data 580B is stored in the memory 622. The third digital image data 580B stored in the memory 622 is output to the second imaging element 452.

In the second imaging element 452, the second analog image data 80A is generated by exposing the photoelectric conversion element 56. In a case where the vertical synchronization signal is input at a later timing than the third imaging element 552, reading of the second analog image data 80A from the photoelectric conversion element 56 and resetting of the photoelectric conversion element 56 are performed. Resetting of the photoelectric conversion element 56 refers to an operation of deleting residual electric charges of each pixel in the photoelectric conversion element 56. Exposure performed by the photoelectric conversion element 56 is performed after previous resetting of the photoelectric conversion element 56 by the reading circuit 120A and before reading.

The second digital image data 80B is generated by performing the digital signal processing on the second analog image data 80A. The second digital image data 80B is temporarily stored in the memory 122 in order to be synchronized with the third digital image data 580B output from the third imaging element 552. In a case where the third digital image data 580B is stored in the memory 122, the first combined image data 730 is generated by combining the second digital image data 80B and the third digital image data 580B stored in the memory 122. The first combined image data 730 is output to the first imaging element 38.

In the first imaging element 38, the first analog image data 70A is generated by exposing the photoelectric conversion element 42. In a case where the vertical synchronization signal is input at a later timing than the second imaging element 452, reading of the first analog image data 70A from the photoelectric conversion element 42 and resetting of the photoelectric conversion element 42 are performed. Resetting of the photoelectric conversion element 42 refers to an operation of deleting residual electric charges of each pixel in the photoelectric conversion element 42. Exposure performed by the photoelectric conversion element 42 is performed after previous resetting of the photoelectric conversion element 42 by the reading circuit 110A and before reading.

The first digital image data 70B is generated by performing the digital signal processing on the first analog image data 70A. The first digital image data 70B is temporarily stored in the memory 112 in order to be synchronized with the first combined image data 730 output from the second imaging element 452. In a case where the first combined image data 730 is stored in the memory 112, the second combined image data 830 is generated by combining the first digital image data 70B and the first combined image data 730 stored in the memory 112. The second combined image data 830 is output to the signal processing circuit 34.

In the example illustrated in FIG. 25, an input timing of the vertical synchronization signal input into the second imaging element 452 is later than an input timing of the vertical synchronization signal input into the third imaging element 552. In addition, the input timing of the vertical synchronization signal input into the first imaging element 38 is later than the input timing of the vertical synchronization signal input into the second imaging element 452.

Accordingly, an exposure time period of the photoelectric conversion element 56 in the second imaging element 452 is longer than an exposure time period of the photoelectric conversion element 556 in the third imaging element 552. In addition, the exposure time period of the photoelectric conversion element 42 in the first imaging element 38 is longer than the exposure time period of the photoelectric conversion element 56 in the second imaging element 452.

Next, actions of parts of the smart device 500 according to the embodiments of the technology of the present disclosure will be described.

First, a flow of front stage imaging processing executed by the processing circuit 620 of the third imaging element 552 will be described with reference to FIG. 26.

Figure 26:
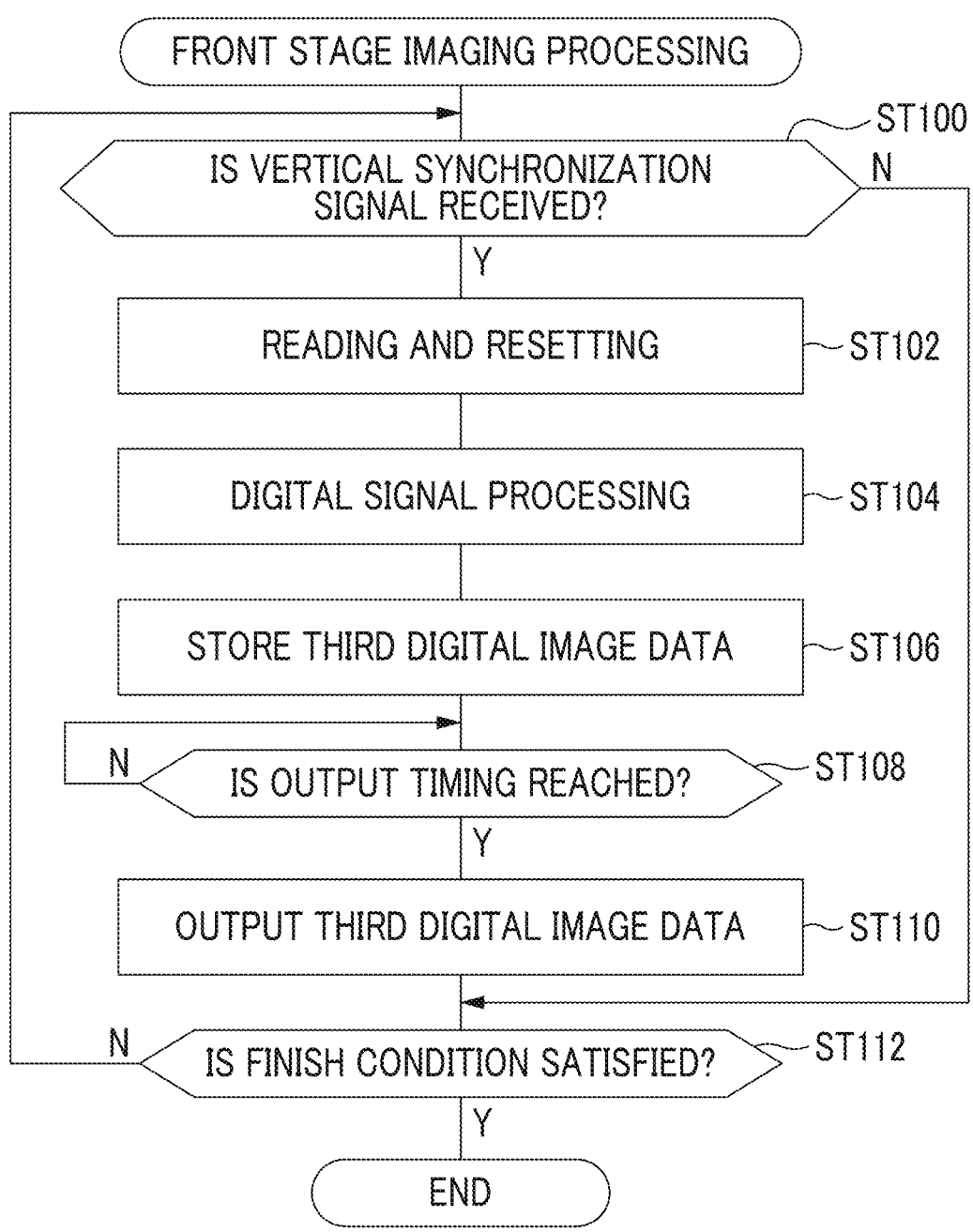
FIG. 26 is a flowchart illustrating a modification example of a flow of front stage imaging processing according to the second embodiment.

In the front stage imaging processing illustrated in FIG. 26, first, in step ST100, the control circuit 620C determines whether or not the vertical synchronization signal from the controller 15 is received by the communication I/F 620D1. In step ST100, in a case where the vertical synchronization signal from the controller 15 is not received by the communication I/F 620D1, a negative determination is made, and the front stage imaging processing transitions to step ST112. In step ST100, in a case where the vertical synchronization signal from the controller 15 is received by the communication I/F 620D1, a positive determination is made, and the front stage imaging processing transitions to step ST102.

In step ST102, the reading circuit 620A reads out the third analog image data 580A and resets the photoelectric conversion element 556. Then, the front stage imaging processing transitions to step ST104.

In step ST104, the digital processing circuit 620B performs the digital signal processing on the third analog image data 580A. Then, the front stage imaging processing transitions to step ST106.

The third digital image data 580B obtained by performing the digital signal processing on the third analog image data 580A in step ST104 is transferred to the control circuit 620C.

In step ST106, the control circuit 620C stores the third digital image data 580B in the memory 622. Then, the front stage imaging processing transitions to step ST108.

In step ST108, the control circuit 620C determines whether or not a timing (output timing according to the second embodiment) at which the third digital image data 580B is output to the second imaging element 452 is reached. A timing at which the control circuit 620C can read out the third digital image data 580B from the memory 622 is exemplified as an example of the output timing according to the second embodiment. The memory 622 is the DRAM, and writing and reading in the memory 622 cannot be performed at the same time. Thus, for example, the timing at which the control circuit 620C can read out the third digital image data 580B from the memory 622 refers to a timing at which storage of the third digital image data 580B of one frame in the memory 622 is completed.

In step ST108, in a case where the output timing according to the second embodiment is not reached, a negative determination is made, and the determination of step ST108 is performed again. In step ST108, in a case where the output timing is reached, a positive determination is made, and the front stage imaging processing transitions to step ST110.

In step ST110, the control circuit 620C acquires the third digital image data 580B from the memory 622 and outputs the acquired third digital image data 580B to the second imaging element 452 through the communication I/F 620D2. Then, the front stage imaging processing transitions to step ST112.

In step ST112, the control circuit 620C determines whether or not the front stage imaging processing finish condition described in the first embodiment is satisfied. In step ST112, in a case where the front stage imaging processing finish condition is not satisfied, a negative determination is made, and the front stage imaging processing transitions to step ST100. In step ST112, in a case where the front stage imaging processing finish condition is satisfied, a positive determination is made, and the front stage imaging processing is finished.

Next, a flow of middle stage imaging processing executed by the processing circuit 453 of the second imaging element 452 will be described with reference to FIG. 27.

Figure 27:
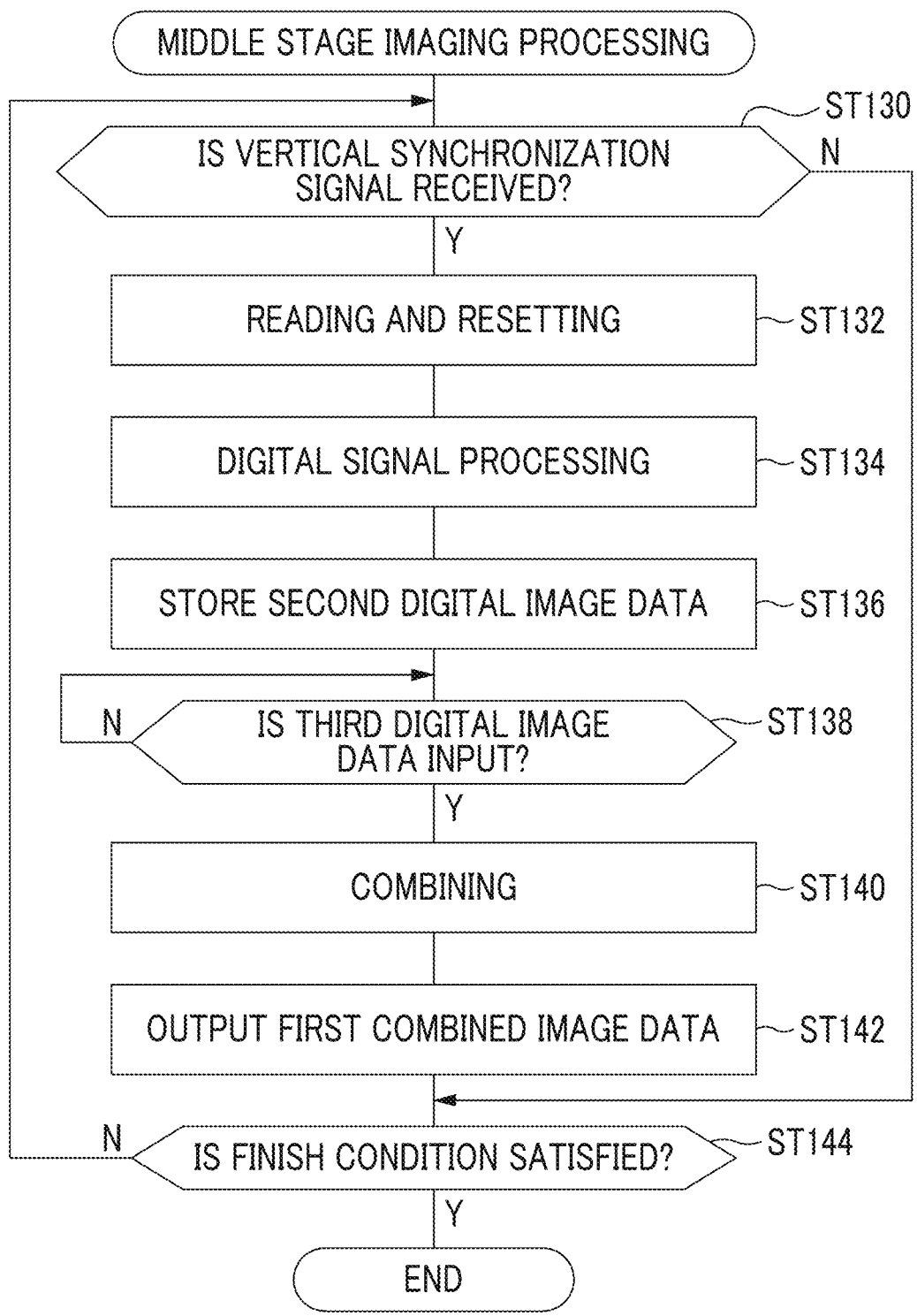
FIG. 27 is a flowchart illustrating a modification example of a flow of middle stage imaging processing according to the second embodiment.

In the middle stage imaging processing illustrated in FIG. 27, first, in step ST130, the control circuit 720C determines whether or not the vertical synchronization signal from the controller 15 is received by the communication I/F 120D1. In step ST130, in a case where the vertical synchronization signal from the controller 15 is not received by the communication I/F 120D1, a negative determination is made, and the middle stage imaging processing transitions to step ST144. In step ST130, in a case where the vertical synchronization signal from the controller 15 is received by the communication I/F 120D1, a positive determination is made, and the middle stage imaging processing transitions to step ST132.

In step ST132, the reading circuit 120A reads out the second analog image data 80A and resets the photoelectric conversion element 56. Then, the middle stage imaging processing transitions to step ST134.

In step ST134, the digital processing circuit 120B performs the digital signal processing on the second analog image data 80A. Then, the middle stage imaging processing transitions to step ST136.

The second digital image data 80B obtained by performing the digital signal processing on the second analog image data 80A in step ST134 is transferred to the control circuit 720C.

In step ST136, the control circuit 720C stores the second digital image data 80B in the memory 122. Then, the middle stage imaging processing transitions to step ST138.

In step ST138, the control circuit 720C determines whether or not the third digital image data 580B is input from the third imaging element 552. In step ST138, in a case where the third digital image data 580B is not input from the third imaging element 552, a negative determination is made, and the determination of step ST138 is performed again. In step ST138, in a case where the third digital image data 580B is input from the third imaging element 552, a positive determination is made, and the middle stage imaging processing transitions to step ST140.

In step ST140, the control circuit 720C generates the first combined image data 730 by combining the second digital image data 80B and the third digital image data 580B. Then, the middle stage imaging processing transitions to step ST142.

In step ST142, the control circuit 720C outputs the first combined image data 730 to the first imaging element 38 through the communication I/F 120D2. Then, the middle stage imaging processing transitions to step ST144.

In step ST144, the control circuit 720C determines whether or not a condition (hereinafter, referred to as a "middle stage imaging processing finish condition") under which the middle stage imaging processing is finished is satisfied. A condition that an instruction to finish the middle stage imaging processing is received by the reception device 84 (refer to FIG. 5) is exemplified as an example of the middle stage imaging processing finish condition. In step ST144, in a case where the middle stage imaging processing finish condition is not satisfied, a negative determination is made, and the middle stage imaging processing transitions to step ST130. In step ST144, in a case where the middle stage imaging processing finish condition is satisfied, a positive determination is made, and the middle stage imaging processing is finished.

Next, a flow of rear stage imaging processing executed by the processing circuit 110 of the first imaging element 38 will be described with reference to FIG. 28.

Figure 28:
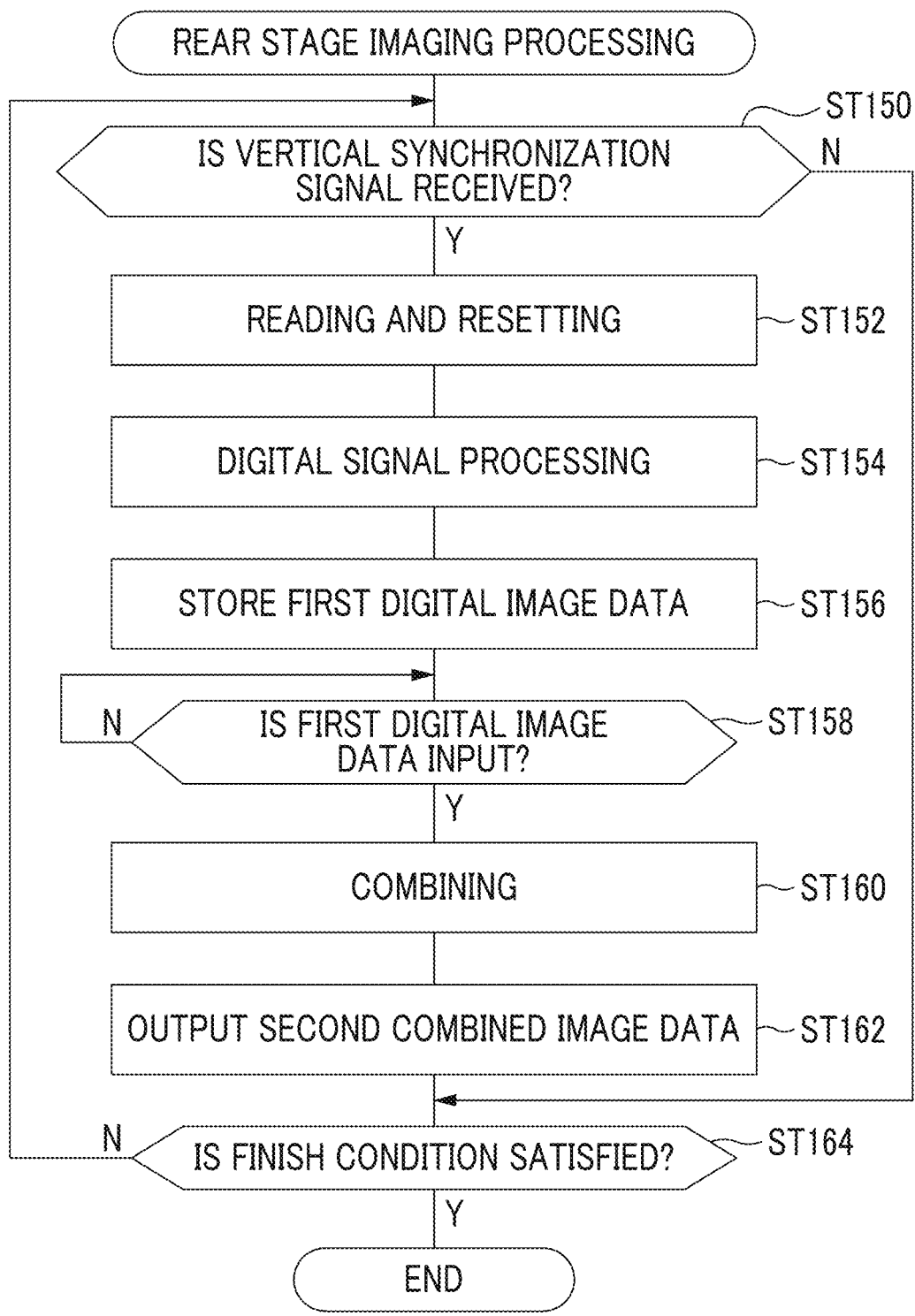
FIG. 28 is a flowchart illustrating a modification example of a flow of rear stage imaging processing according to the second embodiment.

In the rear stage imaging processing illustrated in FIG. 28, first, in step ST150, the control circuit 110C determines whether or not the vertical synchronization signal from the controller 15 is received by the communication I/F 110D1. In step ST150, in a case where the vertical synchronization signal from the controller 15 is not received by the communication I/F 110D1, a negative determination is made, and the rear stage imaging processing transitions to step ST164. In step ST150, in a case where the vertical synchronization signal from the controller 15 is received by the communication I/F 110D1, a positive determination is made, and the rear stage imaging processing transitions to step ST152.

In step ST152, the reading circuit 110A reads out the first analog image data 70A and resets the photoelectric conversion element 42. Then, the rear stage imaging processing transitions to step ST154.

In step ST154, the digital processing circuit 110B performs the digital signal processing on the first analog image data 70A. Then, the rear stage imaging processing transitions to step ST156.

The first digital image data 70B obtained by performing the digital signal processing on the first analog image data 70A in step ST154 is transferred to the control circuit 110C.

In step ST156, the control circuit 110C stores the first digital image data 70B in the memory 112. Then, the rear stage imaging processing transitions to step ST158.

In step ST158, the control circuit 110C determines whether or not the first combined image data 730 is input from the second imaging element 452. In step ST158, in a case where the first combined image data 730 is not input from the second imaging element 452, a negative determination is made, and the determination of step ST158 is performed again. In step ST158, in a case where the first combined image data 730 is input from the second imaging element 452, a positive determination is made, and the rear stage imaging processing transitions to step ST160.

In step ST160, the control circuit 110C generates the second combined image data 830 by combining the first digital image data 70B and the first combined image data 730. Then, the rear stage imaging processing transitions to step ST162.

In step ST162, the control circuit 110C outputs the second combined image data 830 to the signal processing circuit 34 through the communication I/F 110D2. Then, the rear stage imaging processing transitions to step ST164.

In step ST164, the control circuit 110C determines whether or not the rear stage imaging processing finish condition described in the first embodiment is satisfied. In step ST164, in a case where the rear stage imaging processing finish condition is not satisfied, a negative determination is made, and the rear stage imaging processing transitions to step ST150. In step ST164, in a case where the rear stage imaging processing finish condition is satisfied, a positive determination is made, and the rear stage imaging processing is finished.

As described above, the signal processing circuit 34, the first imaging element 38, the second imaging element 452, and the third imaging element 552 are disposed in the imaging apparatus 514. The third imaging element 552 is connected to the second imaging element 452 through the communication line 554. In addition, the second imaging element 452 is connected to the first imaging element 38 through the communication line 54. Furthermore, the first imaging element 38 is connected to the signal processing circuit 34 through the communication line 44. That is, the signal processing circuit 34, the first imaging element 38, the second imaging element 452, and the third imaging element 552 are connected in series through the communication lines 44, 54, and 554.

The third digital image data 580B obtained by imaging the subject by the third imaging element 552 is output to the second imaging element 452 through the communication line 554 by the communication I/F 620D2. The second digital image data 80B obtained by imaging the subject by the second imaging element 452 is combined with the third digital image data 580B. The first combined image data 730 obtained by combining the second digital image data 80B and the third digital image data 580B is output to the first imaging element 38 through the communication line 54 by the communication I/F 120D2.

The first digital image data 70B obtained by imaging the subject by the first imaging element 38 is combined with the first combined image data 730. The second combined image data 830 obtained by combining the first digital image data 70B and the first combined image data 730 is output to the signal processing circuit 34 through the communication line 44 by the communication I/F 110D2. Accordingly, the number of wires required for connecting the first imaging element 38, the second imaging element 452, and the third imaging element 552 to the signal processing circuit 34 can be reduced, compared to a case of directly connecting each of the first imaging element 38, the second imaging element 452, and the third imaging element 552 to the signal processing circuit 34.

In addition, in the imaging apparatus 514, the second digital image data 80B and the third digital image data 580B are combined by the combining portion 720C2, and the first combined image data 730 obtained by combining is output to the first imaging element 38. The first digital image data 70B and the first combined image data 730 are combined by the combining portion 110C2, and the second combined image data 830 obtained by combining is output to the signal processing circuit 34 through the communication line 44 by the communication I/F 110D2 of the first imaging element 38. Accordingly, it is not necessary to combine the first digital image data 70B, the second digital image data 80B, and the third digital image data 580B in the signal processing circuit 34.

In addition, in the imaging apparatus 514, the exposure time period of the photoelectric conversion element 56 in the second imaging element 452 is longer than an exposure time period of the photoelectric conversion element 556 in the third imaging element 552. In addition, the exposure time period of the photoelectric conversion element 42 in the first imaging element 38 is longer than the exposure time period of the photoelectric conversion element 56 in the second imaging element 452. Accordingly, a dynamic range of the second combined image data 830 obtained by combining the first digital image data 70B, the second digital image data 80B, and the third digital image data 580B is larger than the dynamic range of the single digital image data. That is, the second combined image data 830 is image data of which brightness can be expressed in more detail than the single digital image data.

In addition, in the imaging apparatus 514, the signal processing circuit 34 is connected in series to the first imaging element 38, the second imaging element 452, and the third imaging element 552 and is positioned in the rear stages of the first imaging element 38, the second imaging element 452, and the third imaging element 552. Specifically, the third imaging element 552, the second imaging element 452, the first imaging element 38, and the signal processing circuit 34 are arranged in this order from a front stage side to a rear stage side. Accordingly, the signal processing circuit 34 can receive every image data obtained by imaging by each of the first imaging element 38, the second imaging element 452, and the third imaging element 552.

In addition, even in the imaging apparatus 514, in the same manner as the first imaging element 38 and the second imaging element 52 described in the first embodiment, an imaging element in which the photoelectric conversion element 556, the processing circuit 620, and the memory 622 are formed in one chip is employed as the third imaging element 552. Accordingly, the same effects as the first imaging element 38 and the second imaging element 52 described in the first embodiment are obtained.

In addition, even in the imaging apparatus 514, in the same manner as the first imaging element 38 and the second imaging element 52 described in the first embodiment, a laminated imaging element in which the photoelectric conversion element 556 is laminated with the memory 622 is employed as the third imaging element 552. Accordingly, the same effects as the first imaging element 38 and the second imaging element 52 described in the first embodiment are obtained.

In addition, in the imaging apparatus 514, the live view image or the like based on the second combined image data 830 is displayed on the display 26. Accordingly, the user can visually recognize the image indicated by the second combined image data 830.

Furthermore, in the imaging apparatus 514, the second combined image data 830 input into the signal processing circuit 34 is stored in the secondary storage device 102, the USB memory, and/or the memory card or the like by the CPU 15A. Accordingly, the second combined image data 830 input into the signal processing circuit 34 can be appropriately managed.

In the second embodiment, while an example of a form of combining the first digital image data 70B, the second digital image data 80B, and the third digital image data 580B is illustratively described, the technology of the present disclosure is not limited thereto. For example, the first digital image data 70B, the second digital image data 80B, and the third digital image data 580B may be output to the signal processing circuit 34 without combining. In this case, the digital image data may be delivered in order from an imaging element on a side far from the signal processing circuit 34 to an imaging element on a side close to the signal processing circuit 34, and the digital image data delivered to an imaging element in a last stage may be output to the signal processing circuit 34 by a communication I/F of the imaging element in the last stage.

Figure 29:
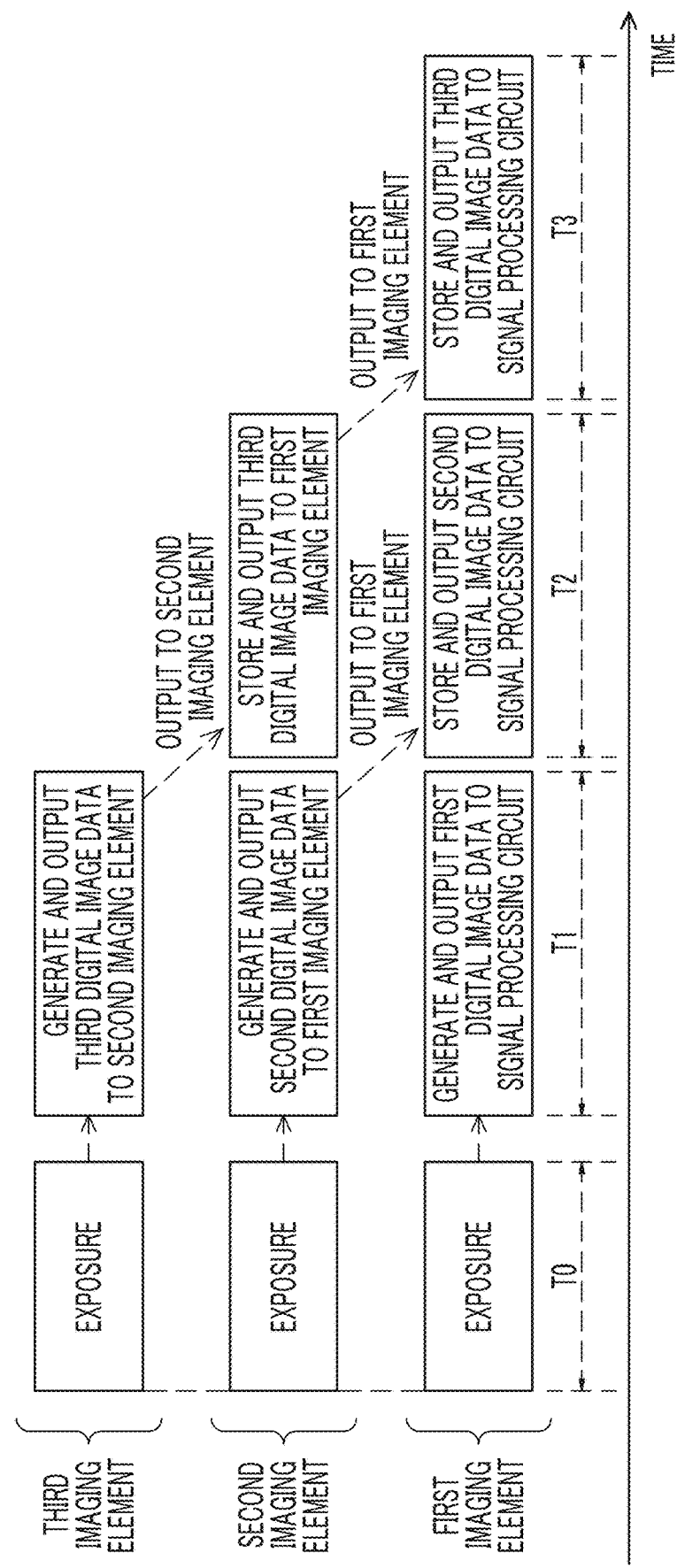
FIG. 29 is a time chart illustrating an example of processing contents in the first imaging element, the second imaging element, and the third imaging element in a case of transferring digital image data to the signal processing circuit from each of the first to third imaging elements connected in series.

For example, as illustrated in FIG. 29, first, in a time range T0, exposure is performed by each of the first imaging element 38, the second imaging element 452, and the third imaging element 552. Next, in a time range T1, the first digital image data 70B obtained by imaging by the first imaging element 38 is output to the signal processing circuit 34 by the communication I/F 110D2 of the first imaging element 38. In addition, in the time range T1, the second digital image data 80B obtained by imaging by the second imaging element 452 is output to the first imaging element 38 by the communication I/F 120D2 of the second imaging element 452. Furthermore, in the time range T1, the third digital image data 580B obtained by imaging by the third imaging element 552 is output to the second imaging element 452 by the communication I/F 620D2 of the third imaging element 552.

Next, in a time range T2, the second digital image data 80B input into the first imaging element 38 from the second imaging element 452 in the time range T1 is output to the signal processing circuit 34 by the communication I/F 110D2 of the first imaging element 38. In addition, in the time range T2, the third digital image data 580B input into the second imaging element 452 from the third imaging element 552 in the time range T1 is output to the first imaging element 38 by the communication I/F 120D2 of the second imaging element 452.

In a time range T3, the third digital image data 580B input into the first imaging element 38 from the second imaging element 452 in the time range T2 is output to the signal processing circuit 34 by the communication I/F 110D2 of the first imaging element 38. Accordingly, even in a case where the first imaging element 38, the second imaging element 452, and the third imaging element 552 are not directly connected to the signal processing circuit 34, the signal processing circuit 34 can receive the first digital image data 70B, the second digital image data 80B, and the third digital image data 580B from a single path.

In addition, in the time range T1, output of the first digital image data 70B, output of the second digital image data 80B, and output of the third digital image data 580B are performed in synchronization with each other. In addition, in the time range T2, output of the second digital image data 80B and output of the third digital image data 580B are performed in synchronization with each other. Accordingly, staying of the image data in one imaging element of the first imaging element 38, the second imaging element 452, and the third imaging element 552 can be avoided.

In the example illustrated in FIG. 29, each digital image data output by each of the communication I/F 110D2 of the first imaging element 38, the communication I/F 120D2 of the second imaging element 452, and the communication I/F 620D2 of the third imaging element 552 is received by the signal processing circuit 34 in a time-division manner. That is, the first digital image data 70B, the second digital image data 80B, and the third digital image data 580B are received by the signal processing circuit 34 in a time-division manner.

Accordingly, even in a case where each of all imaging elements is not directly connected to the signal processing circuit 34, the signal processing circuit 34 can receive image data obtained by imaging by each imaging element with a minimum number of wires. The signal processing circuit 34 can sequentially perform various types of signal processing on the digital image data sequentially received from the first imaging element 38.

Figure 30:
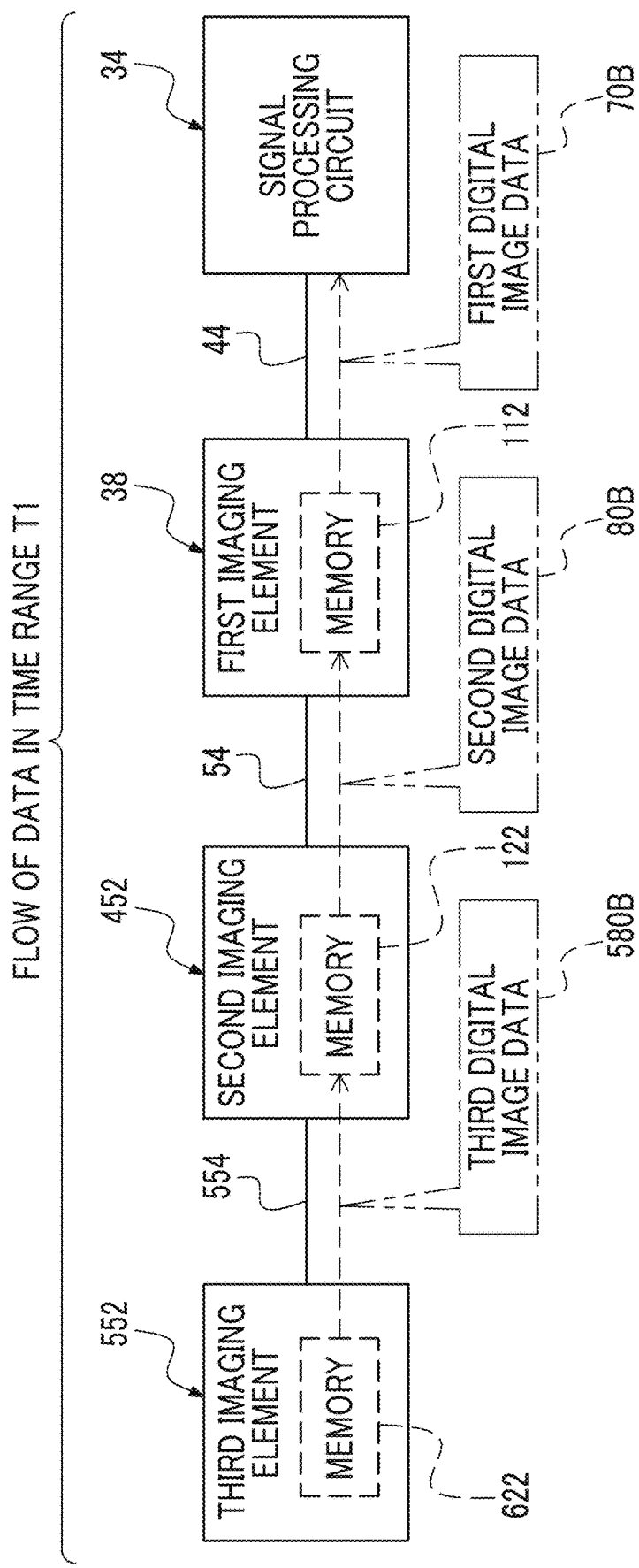
FIG. 30 is a conceptual diagram illustrating an example of a delivery state of the digital image data in a time range T1 illustrated in FIG. 29.

As illustrated in FIG. 30 as an example, in the time range T1 (refer to FIG. 29), the third digital image data 580B is moved from the memory 622 of the third imaging element 552 to the memory 122 of the second imaging element 452. In addition, in the time range T1, the second digital image data 80B is moved from the memory 122 of the second imaging element 452 to the memory 112 of the first imaging element 38. Furthermore, in the time range T1, the first digital image data 70B is moved from the memory 112 of the first imaging element 38 to the signal processing circuit 34.

That is, in the time range T1, the first digital image data 70B generated by the first imaging element 38 which is positioned closest to the signal processing circuit 34 among the first imaging element 38, the second imaging element 452, and the third imaging element 552 is received by the signal processing circuit 34.

Figure 31:
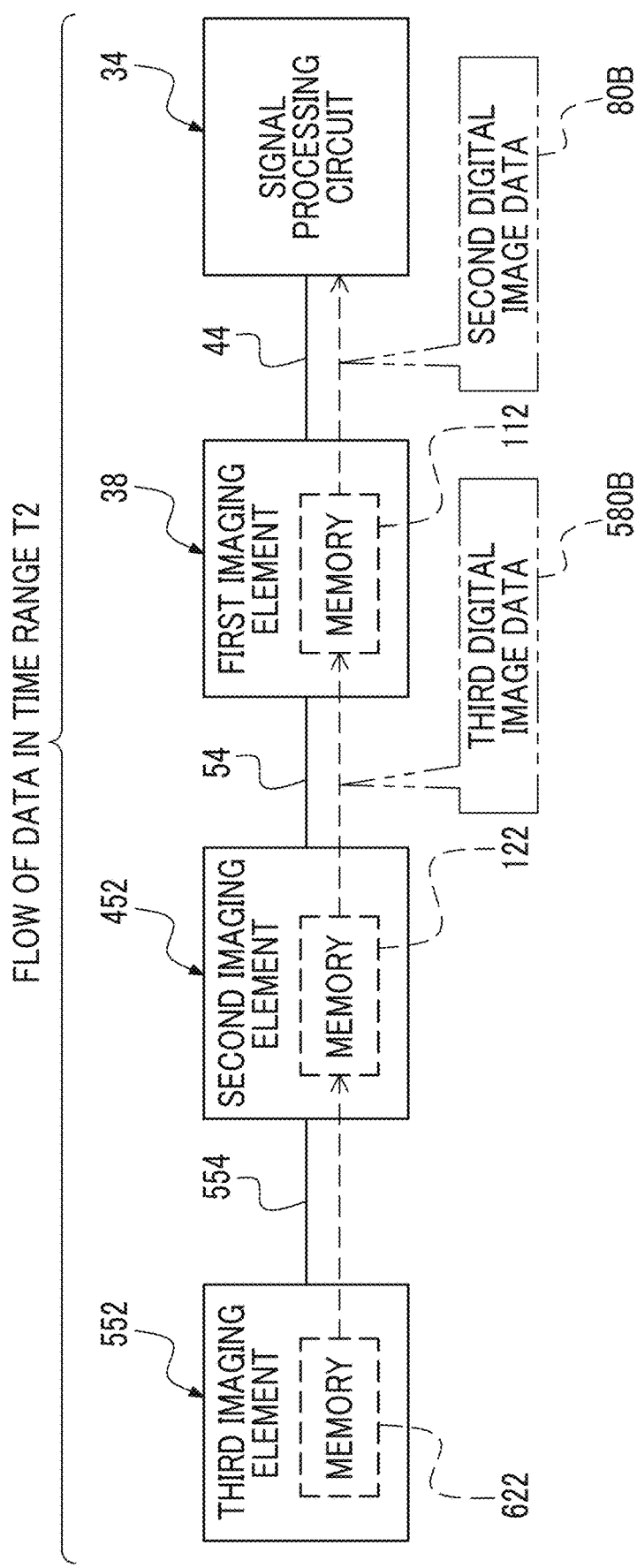
FIG. 31 is a conceptual diagram illustrating an example of the delivery state of the digital image data in a time range T2 illustrated in FIG. 29.

As illustrated in FIG. 31 as an example, in the time range T2 (refer to FIG. 29), the third digital image data 580B is moved from the memory 122 of the second imaging element 452 to the memory 112 of the first imaging element 38. In addition, in the time range T2, the second digital image data 80B is moved from the memory 112 of the first imaging element 38 to the signal processing circuit 34.

That is, in the time range T2, the second digital image data 80B generated by the second imaging element 452 which is positioned second closest to the signal processing circuit 34 after the first imaging element 38 among the first imaging element 38, the second imaging element 452, and the third imaging element 552 is received by the signal processing circuit 34.

Figure 32:
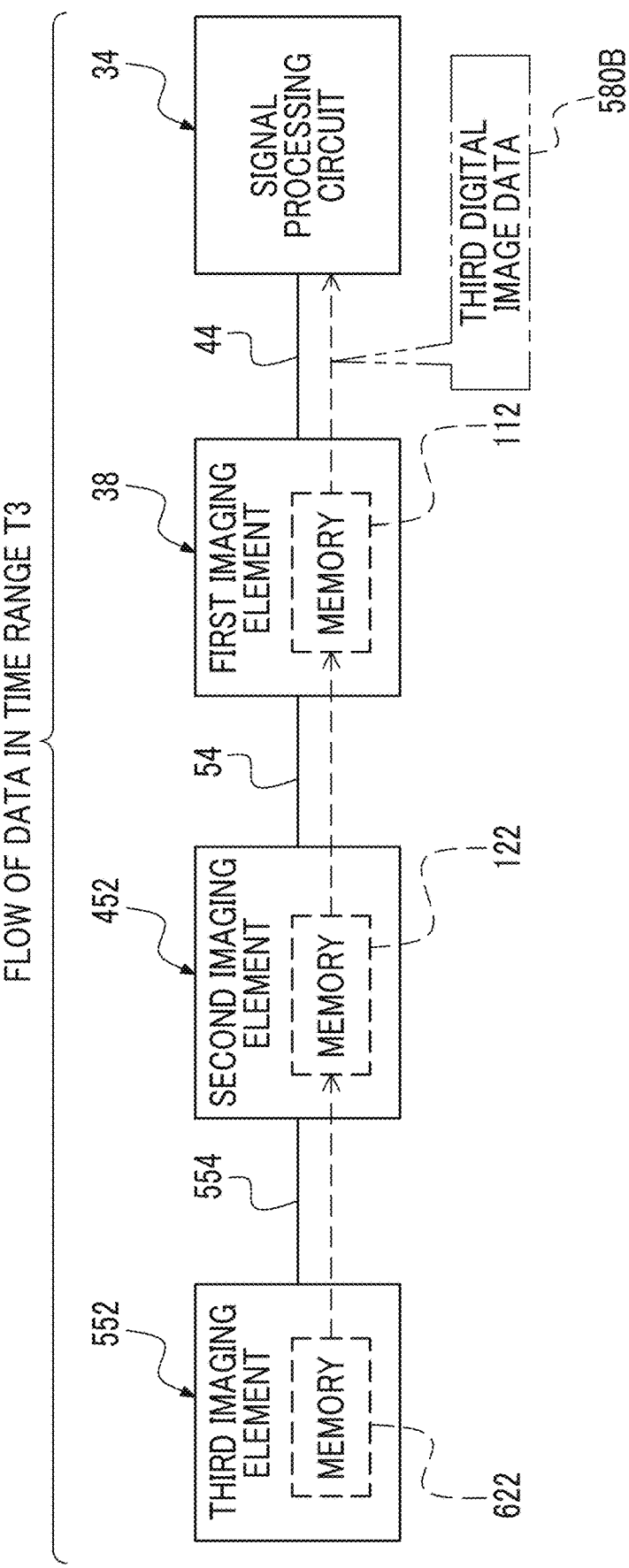
FIG. 32 is a conceptual diagram illustrating an example of the delivery state of the digital image data in a time range T3 illustrated in FIG. 29.

As illustrated in FIG. 32 as an example, in the time range T3 (refer to FIG. 29), the third digital image data 580B is moved from the memory 112 of the first imaging element 38 to the signal processing circuit 34.

That is, in the time range T3, the third digital image data 580B generated by the third imaging element 552 which is positioned farthest from the signal processing circuit 34 among the first imaging element 38, the second imaging element 452, and the third imaging element 552 is received by the signal processing circuit 34.

Accordingly, the second imaging element 452 can output the third digital image data 580B received from the third imaging element 552 at an appropriate output timing, compared to a case of outputting the third digital image data 580B without storing the third digital image data 580B in the memory 122. In addition, the first imaging element 38 can output the second digital image data 80B received from the second imaging element 452 at an appropriate output timing, compared to a case of outputting the second digital image data 80B without storing the second digital image data 80B in the memory 112. In addition, the first imaging element 38 can output the third digital image data 580B received from the second imaging element 452 at an appropriate timing, compared to a case of outputting the third digital image data 580B without storing the third digital image data 580B in the memory 112.

In addition, as illustrated in FIG. 30 to FIG. 32 as an example, each digital image data is received by the signal processing circuit 34 in a time-division manner in order from the imaging element on the side close to the signal processing circuit 34 to the imaging element on the side far from the signal processing circuit 34 among the plurality of imaging elements. Accordingly, each digital image data generated by each of the plurality of imaging elements can be quickly received by the signal processing circuit 34, compared to a case of temporarily gathering each digital image data generated by each of the plurality of imaging elements in an imaging element on a side closest to the signal processing circuit 34 and then, outputting the digital image data to the signal processing circuit 34.

Figure 33:
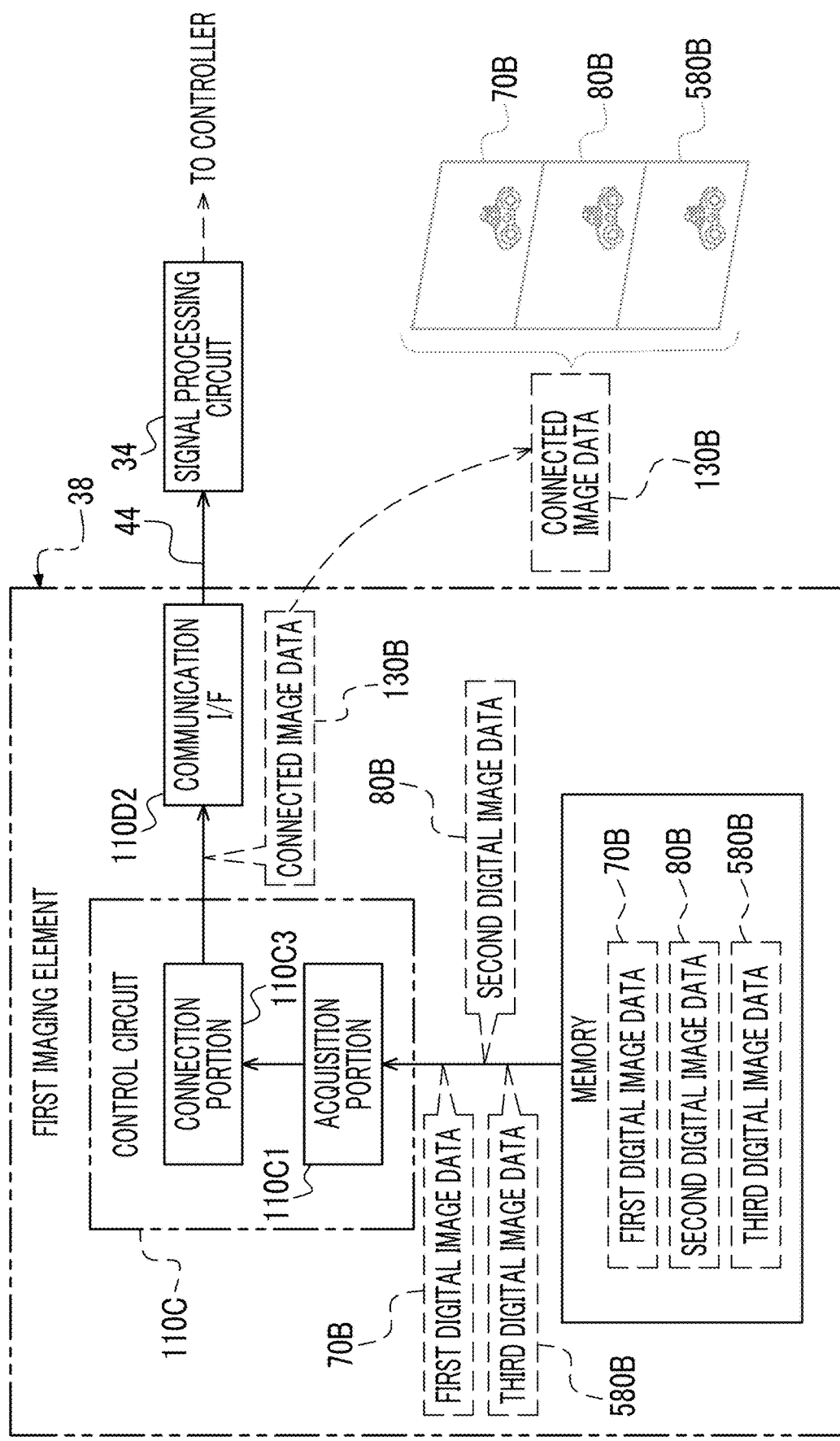
FIG. 33 is a conceptual diagram illustrating a modification example of a configuration of the first imaging element according to the second embodiment.

In addition, in the second embodiment, while a case of combining the first digital image data 70B, the second digital image data 80B, and the third digital image data 580B is described, the technology of the present disclosure is not limited thereto. For example, the first digital image data 70B, the second digital image data 80B, and the third digital image data 580B may be connected. In this case, as illustrated in FIG. 33 as an example, the control circuit 110C includes the connection portion 110C3 instead of the combining portion 110C2. The connection portion 110C3 connects the first digital image data 70B, the second digital image data 80B, and the third digital image data 580B acquired by the acquisition portion 110C1 and generates connected image data 130B obtained by connection. The connected image data 130B generated in such a manner is output to the signal processing circuit 34 through the communication line 44 by the communication I/F 110D2.

In the example illustrated in FIG. 33, an example of a form of connecting the first digital image data 70B, the second digital image data 80B, and the third digital image data 580B in the vertical direction is illustrated. However, the technology of the present disclosure is not limited thereto, and the first digital image data 70B, the second digital image data 80B, and the third digital image data 580B may be connected in the horizontal direction. In such a manner, any direction of connection between the first digital image data 70B, the second digital image data 80B, and the third digital image data 580B may be used. In addition, the first digital image data 70B, the second digital image data 80B, and the third digital image data 580B may be connected by causing parts among adjacent pieces of digital image data to overlap among the first digital image data 70B, the second digital image data 80B, and the third digital image data 580B.

In addition, in the second embodiment, while an example of a form in which the third digital image data 580B acquired from the memory 622 by the control circuit 620C is output to the second imaging element 452 by the communication I/F 620D2 is illustratively described, the technology of the present disclosure is not limited thereto. For example, image data that is obtained by performing any image processing by the control circuit 620C on the third digital image data 580B acquired from the memory 622 by the control circuit 620C may be output to the second imaging element 452 by the communication I/F 620D2. Here, for example, well-known image processing such as thinning processing and addition processing is exemplified as the image processing. The image data obtained by performing any image processing on the third digital image data 580B is an example of the "output image data" according to the embodiments of the technology of the present disclosure.

In addition, in the second embodiment, the communication I/F 15D3 and the communication I/F 620D1 are connected in accordance with the PCI-e connection standard. In addition, the communication I/F 120D3 and the communication I/F 620D2 are connected in accordance with the PCI-e connection standard. However, the technology of the present disclosure is not limited thereto. Instead of the PCI-e connection standard, other connection standards such as LVDS, SATA, SLVS-EC, and MIPI may be employed.

In addition, in the second embodiment, any of communication between the second imaging element 452 and the third imaging element 552 and communication between the controller 15 and the third imaging element 552 is wired communication. However, the technology of the present disclosure is not limited thereto. Communication of at least one of communication between the second imaging element 452 and the third imaging element 552 or communication between the controller 15 and the third imaging element 452 may be wireless communication.

In addition, while the imaging element in which the photoelectric conversion element 556, the processing circuit 620, and the memory 622 are formed in one chip is illustrated as the third imaging element 552 in the second embodiment, the technology of the present disclosure is not limited thereto. For example, at least the photoelectric conversion element 556 and the memory 622 among the photoelectric conversion element 556, the processing circuit 620, and the memory 622 may be formed in one chip. The same applies to the second imaging element 452.

Figure 34:
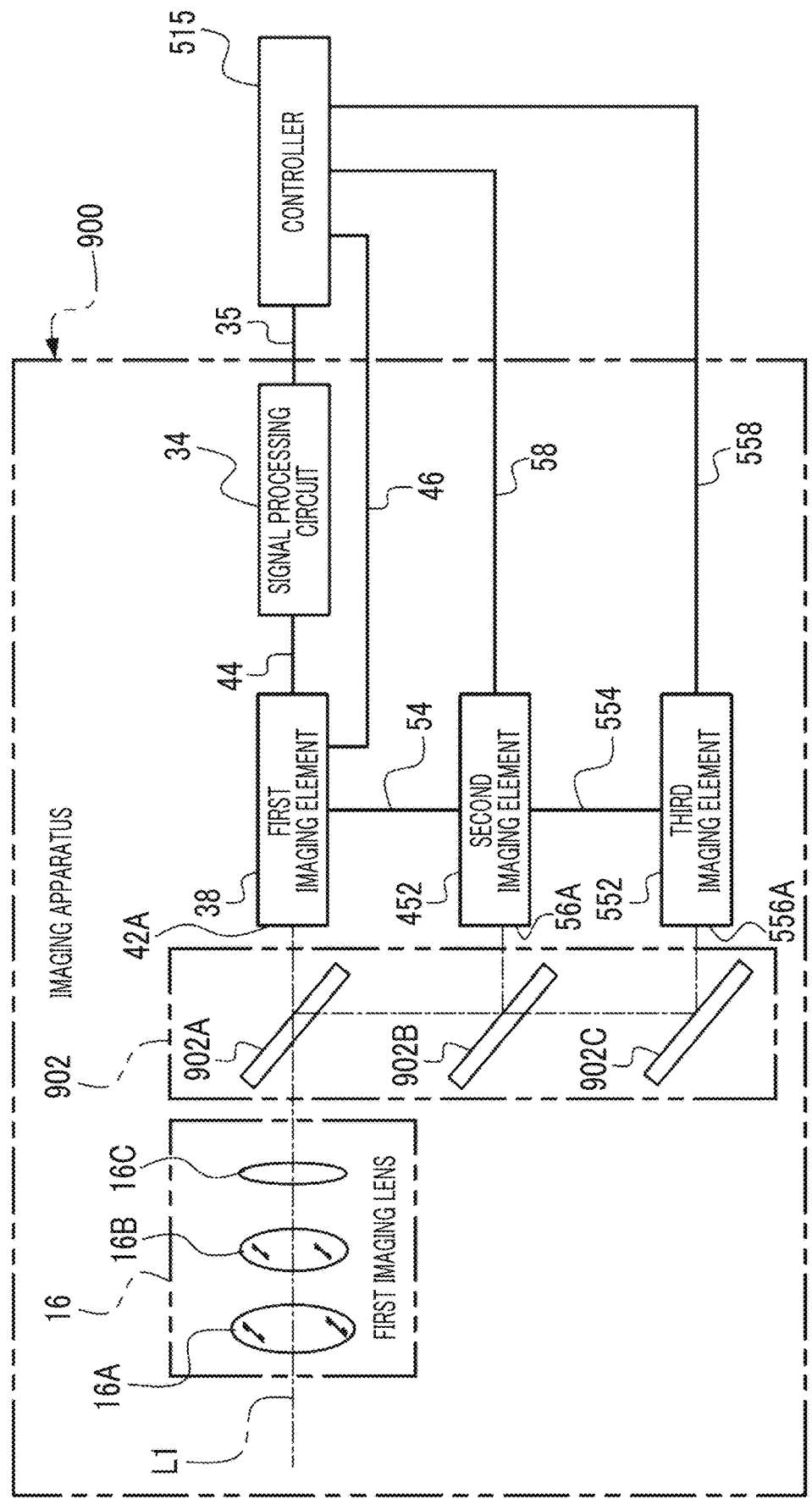
FIG. 34 is a conceptual diagram illustrating a modification example of the imaging apparatus according to the second embodiment.

In addition, in the second embodiment, while an example of a form of incorporating the subject light from each of three imaging lenses of the first imaging lens 16, the second imaging lens 18, and the third imaging lens 518 into the imaging apparatus 514 is illustratively described, the technology of the present disclosure is not limited thereto. For example, the technology of the present disclosure is also established in a case where an imaging apparatus 900 is used instead of the imaging apparatus 514 as illustrated in FIG. 34.

The imaging apparatus 900 is different from the imaging apparatus 514 in that only the first imaging lens 16 among the first imaging lens 16, the second imaging lens 18, and the third imaging lens 518 is included. In addition, the imaging apparatus 900 is different from the imaging apparatus 514 in that an optical path separator 902 is included. The optical path separator 902 comprises beam splitters 902A and 902B and a reflective mirror 902C. The optical path separator 902 separates an optical path of the subject light incident on the first imaging lens 16 and guides the subject light to each of the light receiving surface 42A of the first imaging element 38, the light receiving surface 56A of the second imaging element 452, and the light receiving surface 556A of the third imaging element 552.

The optical path separator 902 is arranged between the first imaging lens 16 and the light receiving surfaces 42A, 56A, and 556A. The beam splitter 902A is disposed at a position facing to the light receiving surface 42A. The beam splitter 902B is disposed at a position facing the light receiving surface 56A. The reflective mirror 902C is disposed at a position facing the light receiving surface 556A.

The beam splitter 902A guides the subject light incident from the first imaging lens 16 to the light receiving surface 42A by transmitting the subject light and guides the subject light incident from the first imaging lens 16 to the beam splitter 902B by reflecting the subject light. The beam splitter 902B guides the subject light guided by the beam splitter 902A to the light receiving surface 56A by reflecting the subject light and guides the subject light guided by the beam splitter 902A to the reflective mirror 902C by transmitting the subject light. The reflective mirror 902C guides the subject light guided by the beam splitter 902B to the light receiving surface 556A by reflecting the subject light. Accordingly, the subject light is received by each of the light receiving surfaces 42A, 56A, and 556A, and the subject is imaged by the first imaging element 38, the second imaging element 452, and the third imaging element 552.

In addition, in the examples illustrated in FIG. 17 to FIG. 34, three imaging elements of the first imaging element 38, the second imaging element 452, and the third imaging element 552 are illustrated but are merely an example. The technology of the present disclosure is not limited thereto. For example, the technology of the present disclosure is also established with two imaging elements or four or more imaging elements. In a case of using four or more imaging elements, one or more imaging elements having the same configuration as the second imaging element 452 are interposed between the first imaging element 38 and the third imaging element 552. The plurality of imaging elements may be connected in series such that the image data is sequentially transferred from an imaging element farthest from the signal processing circuit 34 to an imaging element closest to the signal processing circuit 34.

In addition, while the signal processing circuit 34 is illustrated in each of the embodiments, the technology of the present disclosure is not limited thereto. One or more signal processing circuits may be used in addition to the signal processing circuit 34. In this case, the first imaging element 38 may be directly connected to each of a plurality of signal processing circuits.

In addition, while an example of a form of implementing the processing circuits 110, 120, 453, and 620 by the device including an ASIC and an FPGA is illustratively described in each of the embodiments, the technology of the present disclosure is not limited thereto. For example, at least the control circuit 110C of a plurality of devices included in the processing circuit 110 may be implemented by a software configuration using a computer. In addition, at least the control circuit 120C of a plurality of devices included in the processing circuit 120 may be implemented by a software configuration using a computer. In addition, at least the control circuit 720C of a plurality of devices included in the processing circuit 453 may be implemented by a software configuration using a computer. Furthermore, at least the control circuit 620C of a plurality of devices included in the processing circuit 620 may be implemented by a software configuration using a computer.

In this case, for example, as illustrated in FIG. 35A, a computer 1852 is incorporated in the first imaging element 38, and a rear stage imaging program 1902A causing the computer 1852 to execute the rear stage imaging processing according to the first or second embodiment is stored in a storage medium 1900A. The computer 1852 comprises a CPU 1852A, a ROM 1852B, and a RAM 1852C. The rear stage imaging program 1902A stored in the storage medium 1900A is installed on the computer 1852. The CPU 1852A executes the rear stage imaging processing according to the first or second embodiment in accordance with the rear stage imaging program 1902A.

The rear stage imaging program 1902A may be stored in the ROM 1852B instead of the storage medium 1900A. In this case, the CPU 1852A reads out the rear stage imaging program 1902A from the ROM 1852B and loads the read rear stage imaging program 1902A into the RAM 1852C. The CPU 1852A executes the rear stage imaging processing according to the first or second embodiment in accordance with the rear stage imaging program 1902A loaded in the RAM 1852C.

Figure 35B:
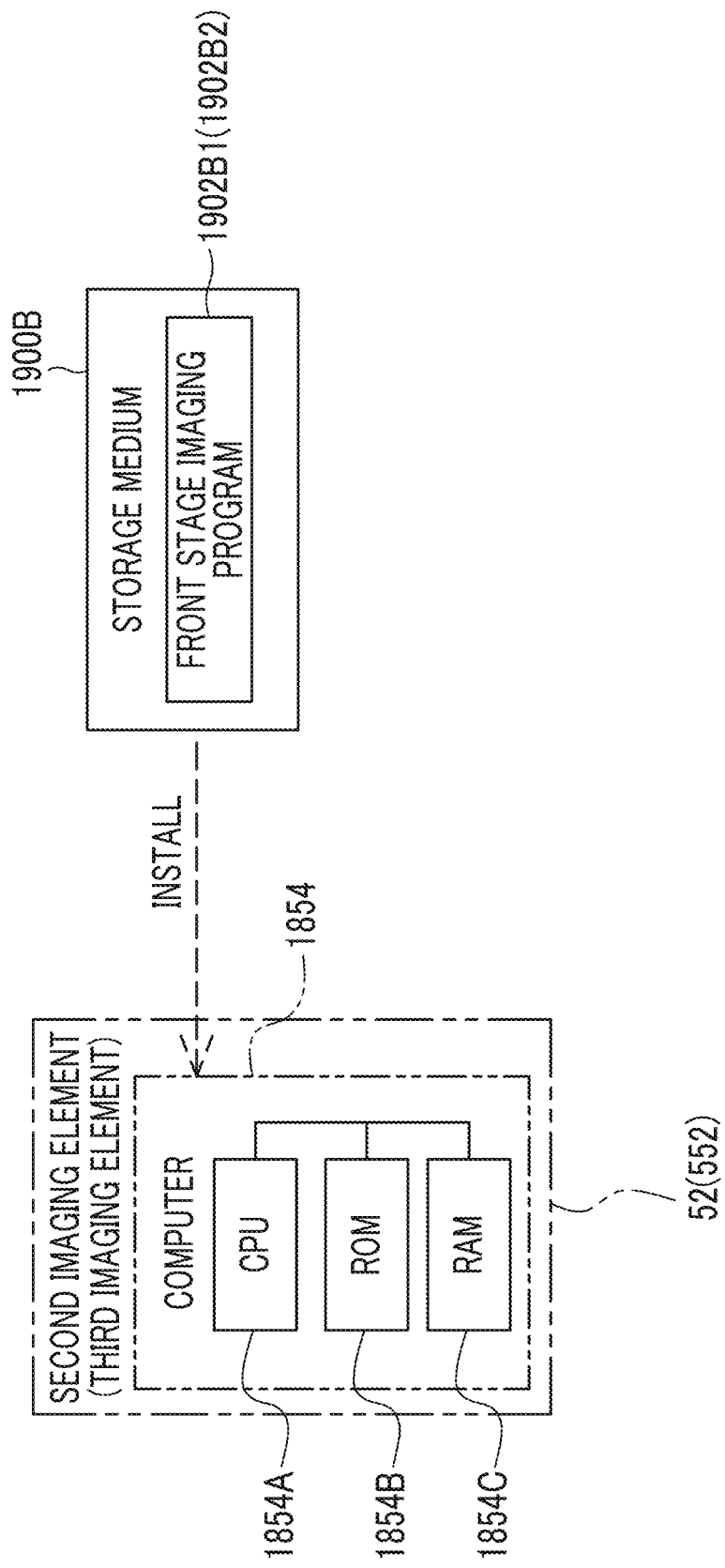
FIG. 35B is a conceptual diagram illustrating an example of an aspect in which a front stage imaging program is installed on a computer within the second imaging element (third imaging element) from a storage medium storing the front stage imaging program.

In addition, as illustrated in FIG. 35B as an example, a computer 1854 is incorporated in each of the second imaging element 52 and the third imaging element 552. A front stage imaging program 1902B1 causing the computer 1854 of the second imaging element 52 to execute the front stage imaging processing according to the first embodiment is stored in a storage medium 1900B. In addition, a front stage imaging program 1902B2 causing the computer 1854 of the third imaging element 552 to execute the front stage imaging processing according to the second embodiment is stored in the storage medium 1900B.

Hereinafter, for convenience of description, the computer 1854 of the second imaging element 52 and the computer 1854 of the third imaging element 552 will be referred to as the "computer 1854" unless otherwise necessary to distinguish therebetween. In addition, hereinafter, for convenience of description, the front stage imaging programs 1902B1 and 1902B2 will be referred to as a "front stage imaging program 1902B" unless otherwise necessary to distinguish therebetween.

The computer 1854 comprises a CPU 1854A, a ROM 1854B, and a RAM 1854C. The front stage imaging program 1902B stored in the storage medium 1900B is installed on the computer 1854. The CPU 1854A executes the front stage imaging processing according to the first or second embodiment in accordance with the front stage imaging program 1902B.

The front stage imaging program 1902B may be stored in the ROM 1854B instead of the storage medium 1900B. In this case, the CPU 1854A reads out the front stage imaging program 1902B from the ROM 1854B and loads the read front stage imaging program 1902B into the RAM 1854C. In a case of the second imaging element 52, the CPU 1854A executes the front stage imaging processing according to the first embodiment in accordance with the front stage imaging program 1902B loaded in the RAM 1854C. In addition, in a case of the third imaging element 552, the CPU 1854A executes the front stage imaging processing according to the second embodiment in accordance with the front stage imaging program 1902B loaded in the RAM 1854C.

Figure 35C:
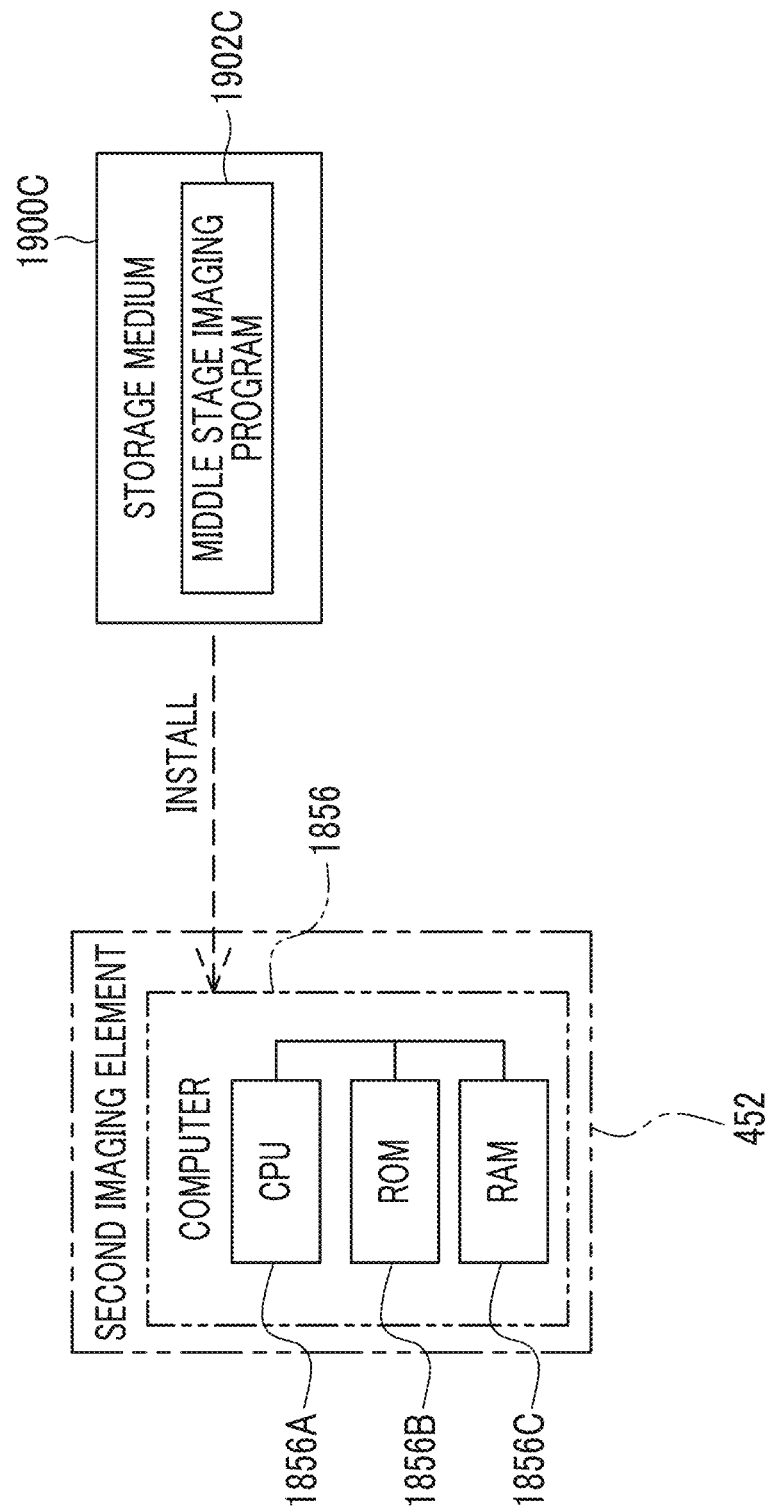
FIG. 35C is a conceptual diagram illustrating an example of an aspect in which a middle stage imaging program is installed on the computer within the second imaging element from a storage medium storing the middle stage imaging program.
Figure 36:
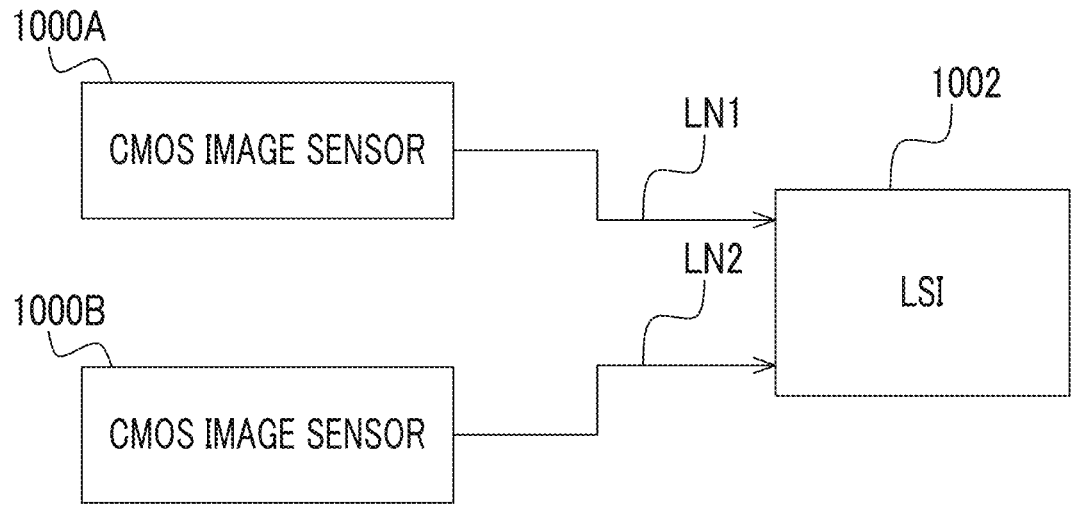
FIG. 36 is a conceptual diagram illustrating an example of a connection aspect based on a first connection method according to a technology in the related art.
Figure 37:
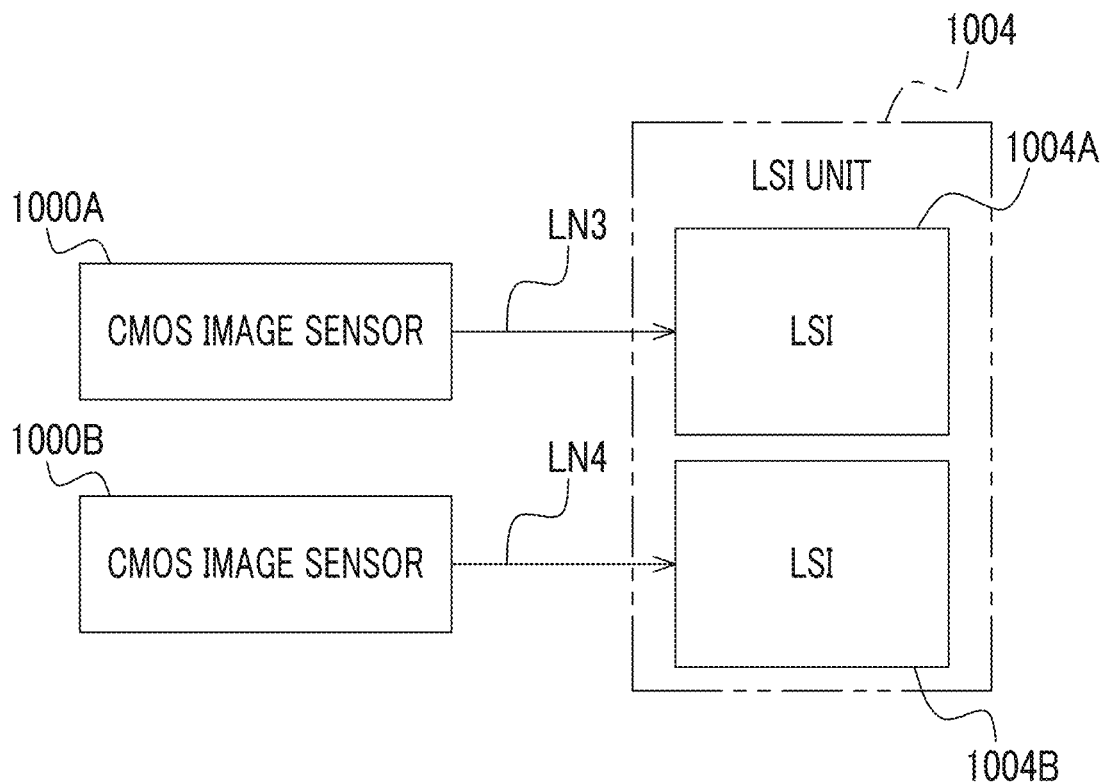
FIG. 37 is a conceptual diagram illustrating an example of a connection aspect based on a second connection method according to the technology in the related art.
Figure 38:
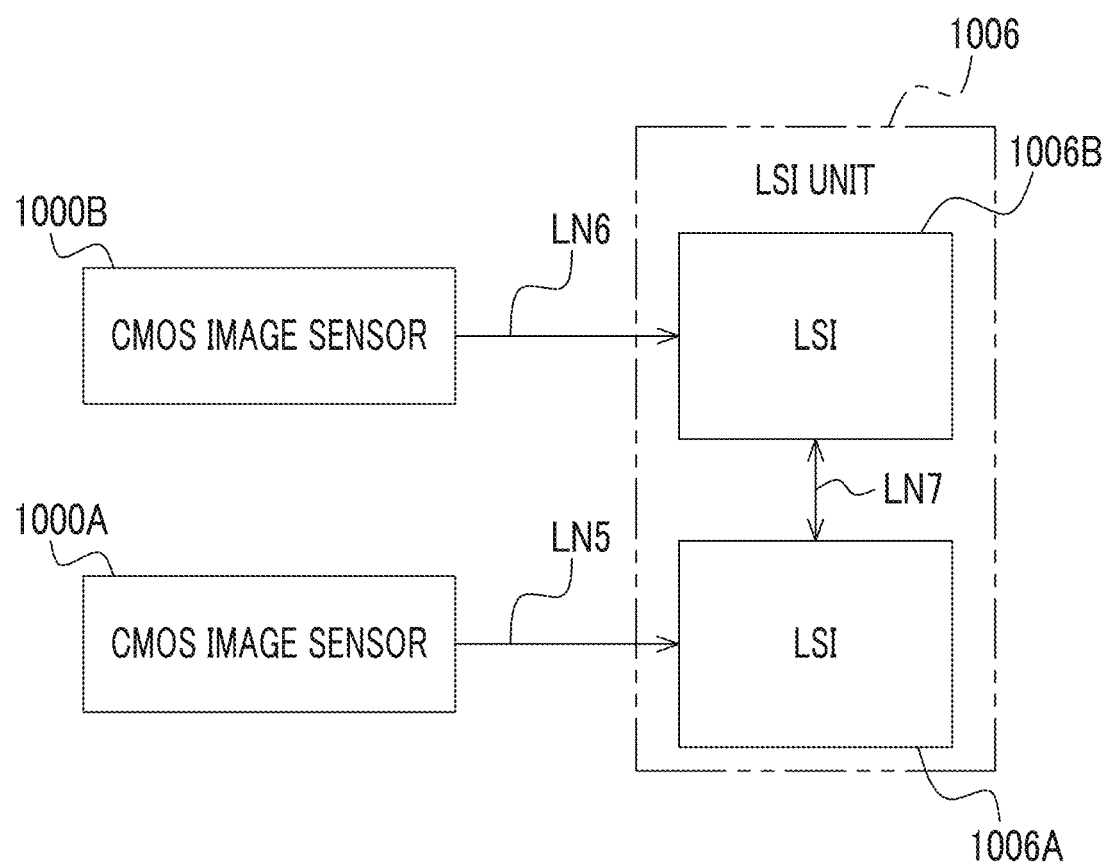
FIG. 38 is a conceptual diagram illustrating an example of a connection aspect based on a third connection method according to the technology in the related art.

As illustrated in FIG. 35C as an example, a computer 1856 is incorporated in the second imaging element 452, and a middle stage imaging program 1902C causing the computer 1856 to execute the middle stage imaging processing is stored in a storage medium 1900C. The computer 1856 comprises a CPU 1856A, a ROM 1856B, and a RAM 1856C. The middle stage imaging program 1902C stored in the storage medium 1900C is installed on the computer 1856. The CPU 1856A executes the middle stage imaging processing in accordance with the middle stage imaging program 1902C.

The middle stage imaging program 1902C may be stored in the ROM 1856B instead of the storage medium 1900C. In this case, the CPU 1856A reads out the middle stage imaging program 1902C from the ROM 1856B and loads the read middle stage imaging program 1902C into the RAM 1856C. The CPU 1856A executes the middle stage imaging processing in accordance with the middle stage imaging program 1902C loaded in the RAM 1856C.

In the examples illustrated in FIG. 35A to FIG. 35C, each of the CPUs 1852A, 1854A, and 1856A is a single CPU. However, the technology of the present disclosure is not limited thereto, and a plurality of CPUs may be employed for at least one of the CPUs 1852A, 1854A, and 1856A. Any of the storage media 1900A, 1900B, and 1900C is a non-temporary storage medium. Any portable storage medium such as an SSD or a USB memory is exemplified as an example of the storage media 1900A, 1900B, and 1900C.

In addition, various programs (the rear stage imaging program 1902A, the front stage imaging program 1902B, and the middle stage imaging program 1902C) may be stored in a storage portion of another computer, a server apparatus, or the like connected to each of the computers 1852, 1854, and 1856 (hereinafter, referred to as the "computer" without a reference sign) through a communication network (not illustrated). The various programs may be downloaded to the computer in response to a request of the imaging apparatuses 14 and 514 (hereinafter, referred to as the "imaging apparatus" without a reference sign). In this case, the downloaded various programs are executed by the CPU of the computer.

In addition, the computer may be disposed on an outside of the first imaging element 38, the second imaging elements 52 and 452, and the third imaging element 552 (hereinafter, simply referred to as the "imaging element"). In this case, the computer may control the imaging element in accordance with the various programs.

The following various processors can be used as a hardware resource for executing the front stage imaging processing and the rear stage imaging processing described in the first embodiment and the front stage imaging processing, the middle stage imaging processing, and the rear stage imaging processing described in the second embodiment (hereinafter, referred to as "various types of processing"). For example, as described above, a CPU that is a general-purpose processor functioning as the hardware resource for executing the various types of processing by executing software, that is, the programs, is exemplified as a processor. In addition, a dedicated electric circuit such as an FPGA, a PLD, or an ASIC that is a processor having a circuit configuration dedicatedly designed to execute a specific type of processing is exemplified as a processor.

The hardware resource for executing the various types of processing may be configured with one of those various processors or may be configured with a combination of two or more processors of the same type or different types (for example, a combination of a plurality of FPGAs or a combination of a CPU and an FPGA). In addition, the hardware resource for executing the various types of processing may be one processor.

As an example of a configuration with one processor, first, as represented by a computer such as a client and a server, a form in which one processor is configured with a combination of one or more CPUs and software, and in which this processor functions as a hardware resource for executing in-imaging element processing is available. Second, as represented by a system-on-a-chip (SoC) or the like, a form of using a processor that implements, by one IC chip, a function of the entire system including a plurality of hardware resources for executing the various types of processing is available. In such a manner, the in-imaging element processing is implemented using one or more of the various processors as the hardware resource.

Furthermore, as a hardware structure of those various processors, more specifically, an electric circuit in which circuit elements such as semiconductor elements are combined can be used.

In addition, while the smart devices 10 and 500 are illustrated as a device incorporating the imaging apparatus in each of the embodiments, the technology of the present disclosure is not limited thereto. For example, the technology of the present disclosure can be applied to various electronic apparatuses such as an interchangeable lens camera, a fixed lens camera, a personal computer, or a wearable terminal apparatus incorporating the imaging apparatus. Even with these electronic apparatuses, the same actions and effects as the imaging apparatus described in each of the embodiments are obtained.

In addition, while the display 26 is illustrated in each of the embodiments, the technology of the present disclosure is not limited thereto. For example, a separate display that is retrofit into the imaging apparatus may be used as the "display portion (display)" according to the embodiments of the technology of the present disclosure.

In addition, the various types of processing are merely an example. Accordingly, unnecessary steps may be deleted, new steps may be added, or a processing order may be rearranged without departing from a gist of the present disclosure.

Above described contents and illustrated contents are detailed description for parts according to the embodiments of the technology of the present disclosure and are merely an example of the technology of the present disclosure. For example, description related to the above configurations, functions, actions, and effects is description related to an example of configurations, functions, actions, and effects of the parts according to the embodiments of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiments of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

What is claimed is:

1. An imaging apparatus comprising:
   a plurality of image sensors;
   at least one signal processing circuit;
   a controller; and
   a transfer path,
   wherein each of the plurality of image sensors includes a memory that is incorporated in the image sensor and stores image data obtained by imaging a subject, and a communication interface that is incorporated in the image sensor and outputs output image data based on the image data stored in the memory,
   the transfer path connects the plurality of image sensors and a single signal processing circuit in series,
   the communication interface of each of the plurality of image sensors outputs the output image data to an image sensor in a rear stage or the signal processing circuit through the transfer path,
   the plurality of image sensors are connected in parallel to the controller, and
   the controller individually controls the plurality of image sensors.

2. The imaging apparatus according to claim 1,
   wherein the output image data output by the communication interface of a front stage image sensor that is an image sensor in a front stage among adjacent image sensors included in the plurality of image sensors is stored in the memory of a rear stage image sensor that is an image sensor in a rear stage among the adjacent image sensors, and then, is output by the communication interface of the image sensor in the rear stage.

3. The imaging apparatus according to claim 2,
   wherein the output image data is delivered in order from an image sensor on a side far from the signal processing circuit to an image sensor on a side close to the signal processing circuit among the plurality of image sensors, and the output image data delivered to an image sensor in a last stage among the plurality of image sensors is output to the signal processing circuit by the communication interface of the image sensor in the last stage.

4. The imaging apparatus according to claim 3,
   wherein the signal processing circuit receives each piece of the output image data output by the communication interface of each of the plurality of image sensors in a time-division manner.

5. The imaging apparatus according to claim 4,
   wherein the signal processing circuit receives each piece of the output image data output by the communication interface of each of the plurality of image sensors in a time-division manner in order from the image sensor on the side close to the signal processing circuit to the image sensor on the side far from the signal processing circuit among the plurality of image sensors.

6. The imaging apparatus according to claim 2,
   wherein rear stage image data obtained as the image data by imaging by the rear stage image sensor is stored in the memory of the rear stage image sensor,
   the rear stage image sensor further includes a combining circuit that combines front stage image data output to the rear stage image sensor as the output image data by the communication interface of the front stage image sensor, and the rear stage image data stored in the memory, and
   the communication interface of the rear stage image sensor outputs combined image data obtained by combining the front stage image data and the rear stage image data by the combining circuit as the output image data.

7. The imaging apparatus according to claim 2,
   wherein rear stage image data obtained as the image data by imaging by the rear stage image sensor is stored in the memory of the rear stage image sensor,
   the rear stage image sensor further includes a connection circuit that connects front stage image data output to the rear stage image sensor as the output image data by the communication interface of the front stage image sensor, and the rear stage image data stored in the memory, and
   the communication interface of the rear stage image sensor outputs connected image data obtained by connecting the front stage image data and the rear stage image data by the connection circuit as the output image data.

8. The imaging apparatus according to claim 2,
   wherein an exposure time period of the rear stage image sensor is longer than an exposure time period of the front stage image sensor.

9. The imaging apparatus according to claim 1,
   wherein the signal processing circuit is positioned on a rear stage of the plurality of image sensors on the transfer path.

10. The imaging apparatus according to claim 1,
    wherein the communication interfaces of the plurality of image sensors output the output image data in synchronization with each other.

11. The imaging apparatus according to claim 1,
    wherein at least a photoelectric conversion element and the memory are formed in one chip.

12. The imaging apparatus according to claim 11,
wherein the image sensor is a laminated image sensor in which the photoelectric conversion element is laminated with the memory.

13. The imaging apparatus according to claim 1, further comprising:
a display processor configured to perform a control for displaying an image based on the output image data input into the signal processing circuit on a display.

14. The imaging apparatus according to claim 1, further comprising:
a storage processor configured to perform a control for storing the output image data input into the signal processing circuit in a storage device.

15. The imaging apparatus according to claim 1,
wherein the controller individually controls each exposure time period of the plurality of image sensors.

16. An image data processing method of an imaging apparatus including a plurality of image sensors, at least one signal processing circuit, a controller, and a transfer path, each of the plurality of image sensors including a memory that is incorporated in the image sensor and stores image data obtained by imaging a subject, and a communication interface that is incorporated in the image sensor and outputs output image data based on the image data stored in the memory, the image data processing method comprising:
connecting the plurality of image sensors and a single signal processing circuit in series through the transfer path; and
outputting the output image data to an image sensor in a rear stage or the signal processing circuit through the transfer path by the communication interface of each of the plurality of image sensors; wherein
the plurality of image sensors are connected in parallel to the controller, and
the controller individually controls the plurality of image sensors.

17. A non-transitory computer-readable storage medium storing a program causing a computer to function as a communication interface included in an imaging apparatus including a plurality of image sensors, at least one signal processing circuit, a controller, and a transfer path, each of the plurality of image sensors including a memory that is incorporated in the image sensor and stores image data obtained by imaging a subject, and the communication interface that is incorporated in the image sensor and outputs output image data based on the image data stored in the memory,
wherein the plurality of image sensors and a single signal processing circuit are connected in series through the transfer path, and
the communication interface of each of the plurality of image sensors outputs the output image data to an image sensor in a rear stage or the signal processing circuit through the transfer path; wherein
the plurality of image sensors are connected in parallel to the controller, and
the controller individually controls the plurality of image sensors.

* * * * *